United States Patent
Igarashi

(10) Patent No.: US 8,316,082 B2
(45) Date of Patent: Nov. 20, 2012

(54) CONTENT PROVIDING SYSTEM, INFORMATION PROCESSING APPARATUS, INFORMATION PROCESSING METHOD, AND COMPUTER PROGRAM

(75) Inventor: Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 12/281,922

(22) PCT Filed: Mar. 7, 2007

(86) PCT No.: PCT/JP2007/054464
§ 371 (c)(1),
(2), (4) Date: Feb. 6, 2009

(87) PCT Pub. No.: WO2007/102550

PCT Pub. Date: Sep. 13, 2007

(65) Prior Publication Data
US 2009/0307307 A1 Dec. 10, 2009

(30) Foreign Application Priority Data
Mar. 7, 2006 (JP) .................... 2006-061230

(51) Int. Cl.
*G06F 15/16* (2006.01)
(52) U.S. Cl. .................... 709/203; 709/204; 709/224
(58) Field of Classification Search .................. 709/203, 709/204, 224
See application file for complete search history.

(56) References Cited

U.S. PATENT DOCUMENTS

| 7,548,960 B2 * | 6/2009 | Kang et al. .................... 709/218 |
| 2002/0075844 A1 * | 6/2002 | Hagen .......................... 370/351 |
| 2004/0045036 A1 | 3/2004 | Terasaki |

FOREIGN PATENT DOCUMENTS

| JP | 2000-174797 | 6/2000 |
| JP | 2001-7861 | 1/2001 |
| JP | 2001 251341 | 9/2001 |
| JP | 2001-251341 | 9/2001 |
| JP | 2003-134142 | 5/2003 |
| JP | 2003 134142 | 9/2003 |
| JP | 2004-88466 | 3/2004 |
| JP | 2005-102240 | 4/2005 |
| JP | 2005-107728 | 4/2005 |

(Continued)

OTHER PUBLICATIONS

Supplementary European Search Report in a Communication issued by the European Patent Office in European Patent Application No. 07737973.3223, dated Sep. 22, 2011 (2 pages).

(Continued)

*Primary Examiner* — Adnan Mirza
(74) *Attorney, Agent, or Firm* — Finnegan, Henderson, Farabow, Garrett & Dunner, L.L.P.

(57) ABSTRACT

A configuration is provided in which a client in a home network receives content from a server outside the home network and plays the content. A home IMS gateway maps an external server outside the home network as a virtual home network device, and executes a process of receiving a content providing service provided by the external server by using mapping information. Furthermore, device information of the client is obtained and registered in a database existing outside the home network, and a content providing server executes a process of obtaining the device information and providing the client with content matching the device.

13 Claims, 26 Drawing Sheets

FOREIGN PATENT DOCUMENTS

| JP | 2005-244705 | 9/2005 |
| JP | 2005-295585 | 10/2005 |
| JP | 2005-301449 | 10/2005 |
| JP | 2006-53767 | 2/2006 |
| JP | 2006-507758 | 3/2006 |
| WO | WO 2004/095293 | 4/2004 |
| WO | WO 2004/095293 A1 | 11/2004 |
| WO | WO 2007/102547 | 9/2007 |
| WO | WO 2007/102548 | 9/2007 |

OTHER PUBLICATIONS

Supplementary European Search Report in a Communication issued by the European Patent Office in European Patent Application No. 07737973.3223, dated Sep. 23, 2011 (6 pages).

Communication issued by the European Patent Office in European Patent Application No. 07737973.3223, dated Oct. 11, 2011 (4 pages).

Digital Living Network Alliance , "Overview and Vision White Paper", Jun. 2004 (15 pages).

Dong-Oh Kang et al., "UPnP AV Architectual Multimedia system with a home gateway powered by the OSGi platform," 2005 Digest of Technical Papers International Conference on Consumer Electronics, vol. 51, Issue. 1, pp. 405-406, (2 pages).

Decision of Refusal issued by the Japanese Patent Office in Japanese Patent Application No. 2007-004540, dated Dec. 6, 2011 (3 pages).

Attachment to Decision of Refusal issued by the Japanese Patent Office in Japanese Patent Application No. 2007-004540, dated Dec. 6, 2011 (11 pages).

Decision of Refusal issued by the Japanese Patent Office in Japanese Patent Application No. 2008-503893, dated Dec. 6, 2011 (2 pages).

Decision of Refusal issued by the Japanese Patent Office in Japanese Patent Application No. 2008-503894, dated Dec. 6, 2011 (2 pages).

Decision of Refusal issued by the Japanese Patent Office in Japanese Patent Application No. 2008-503891, dated Dec. 6, 2011 (2 pages).

Decision of Refusal issued by the Japanese Patent Office in Japanese Patent Application No. 2008-503892, dated Dec. 6, 2011 (2 pages).

Decision of Refusal issued by the Japanese Patent Office in Japanese Patent Application No. 2008-505082, dated Dec. 6, 2011 (2 pages).

Notification of Reasons for Refusal issued by the Japanese Patent in copendiing Japanese Patent Application No. 2008-503894, dated Jul. 26, 2011 (6 pages including translation).

International Search Report issued in International Application No. PCT/JP2004/005676, dated Aug. 24, 2004 (7 pages including translation).

Shigeki Yamada and Kamioki Eiji, "Environment-Adaptive Personal Communication (EAPEC) Architecture for Ubiquitous Computing Networks," National Institute of Informatics, Tokyo, Japan, Sep. 3, 2001, pp. 367-374.

Rolf Johansson, "Converging Requirements on the Residential Gateway," Oct. 6, 2005, (20 pages).

* cited by examiner

CONTENT PROVIDING SYSTEM, INFORMATION PROCESSING APPARATUS, INFORMATION PROCESSING METHOD, AND COMPUTER PROGRAM

TECHNICAL FIELD

The present invention relates to content providing systems, information processing apparatuses, information processing methods, and computer programs. Particularly, the present invention relates to a content providing system, an information processing apparatus, an information processing method, and a computer program for implementing use of data supplied from outside a home network at a device in the home network.

BACKGROUND ART

With the spread of PCs and digital home appliances, it is becoming a reality to interconnect these devices via a home IP (Internet Protocol) network and to share and enjoy digital content, such as video, audio, and pictures. For example, DLNA (Digital Living Network Alliance) defines technical specification and implementing guideline needed for sharing digital content among these digital devices so that it is possible to interconnect devices of different vendors with each other, and DLNA has become an industry standard of home IP networks.

FIG. 1 shows an example of a home network 100 proposed by DLNA. A DVR (Digital Video Recorder) 101 and a PC 102 with a built-in TV tuner, as digital video content recording apparatuses, are capable of receiving satellite and terrestrial analog broadcasting and digital broadcasting, and record and save broadcast programs on built-in hard disk recorders. In DLNA, a device that stores content and that provides the content to devices in a home network is called a digital media server (DMS). In FIG. 1, the DVR 101 and the PC 102 are DMSs.

A DMS is capable of performing streaming transmission of, for example, video content of a TV program recorded on a hard disk to a digital media player (DMP) connected via a home IP network. The digital media player (DMP) is a device that receives content from a DMS and plays the content.

In the example shown in FIG. 1, a DMP is implemented on a TV 103, and, for example, by using an infrared remote controller or the like of the TV 103, a user can operate the TV 103 to play video content stored on the PC 102 or the DVR 101 placed in a remote room. Note that a residential gateway (RG) 104, which is used as a network connecting device in a case where a device in a home is connected to an IP broadband network 120 as the Internet, is used as a bridge for IP connection of a device in a home in the example of use of DLNA.

Meanwhile, a revolution is seen in broadcasting systems, and IPTV services, VOD (Video On Demand) services, and so forth that transmit video content via IP broadband networks, which has hitherto been broadcast using terrestrial waves or satellites, are coming to be commercialized. FIG. 2 shows a schematic diagram of IPTV and VOD services.

In a home, an STB (Set Top Box) 105 is installed so that it is possible to receive via the RG (Residential Gateway) 104 and via the IP broadband network 120 content based on services from various IPTV service providing servers 121 a1 to an and VOD service providing servers 122 b1 to bn. The STB (Set Top Box) 105 has a function of receiving video information, application executing functions needed for command transmission and reception, for MPEG decoding, and also for playing of received data, and so forth.

The residential gateway (RG) 104, in some cases, receives services (content) provided by a plurality of IPTV service providing servers 121 or VOD service providing servers 122 via the same agent, for example, an access line providing company such as a telephone company or a CableTV company, and in other cases, receives individual services separately. However, it is necessary that the STB (Set Top Box) 105 itself, used by the user, is configured as a system supporting an IPTV service of a connection destination.

As such IPTV services and VOD services become common in the future, similarly to the conventional sharing and viewing by DLNA devices of TV broadcast content as ordinary broadcast broadcasting, user's need arises for using video content provided from IPTV services on DLNA devices.

As proposed solutions for meeting such demand, a method in which a device having a large-capacity hard disk, such as a home server, downloads video content from an IPTV service and shares the video content in a home network, or a method in which a protocol, media format, and so forth of an IPTV service are converted at a residential gateway (RG) into a protocol and media format of a DLNA device and the IPTV service is provided to a home network connecting device, is conceivable. Note that a home-network embedded module that executes a format converting process is described in Patent Document 1.

However, in the former case, a time for downloading is needed for temporary storage at a home server, so that it is difficult to enjoy video when desired, which is possible with a video on demand service, and it is not suitable for live viewing. In the latter configuration, in which processing is executed by a residential gateway (RG), it is necessary that the residential gateway (RG) executes protocol conversion and media format conversion, so that high-performance hardware is needed and software becomes complex, and the RG becomes expensive.

Generally, in many cases, an RG is supplied from an access line providing company (telephone company or the like) of a broadband network, and this becomes an obstacle in a case where IPTV services are provided on the open Internet, for example, IPTV services available for the user are limited to the vendor provided by the access line. Although it is possible to provide a new gateway device in a home IP network separately from the residential gateway (RG), in this case, depending on the network topology, content streaming data is transmitted in duplicates in the home network, so that such a situation occurs that a band in the home network is used in vain.

Note that an example of connection between a DLNA device in a home network and a content distribution service on the Internet is the Viiv (registered trademark) technology of the U.S. Intel Corporation. Viiv is considered as a platform of PC hardware and software, and is intended for stream viewing of content on a PC from the Internet by a Dual Core high-performance CPU. At the same time, Viiv has a DLNA function, and serves as a DLNA media server that performs streaming of content temporarily downloaded from the Internet to the PC to another DLNA device connected to the home network.

Patent Document 1: Japanese Unexamined Patent Application Publication (Translation of PCT Application) No. 2005-531231

DISCLOSURE OF INVENTION

Technical Problem

As described above, in a case where content provided by IPTV services or VOD services is also to be used by a DLNA device similarly to TV broadcasting content as ordinary broadcast broadcasting, in existing home network configurations, it is necessary to download content in advance at a digital media server (DMS), such as a PC, a DVR, or the like in a home network, or to provide a residential gateway (RG) with protocol and media format conversion functions. The former case lacks real-time characteristics, so that it is unsuitable for a streaming playing process or the like, and the latter case leads to the problem of increased cost.

The present invention has been made in view of the problems described above, and it is an object thereof to provide a content providing system, an information processing apparatus, an information processing method, and a computer program with which it is possible to view content provided by an external server outside a home network, such as an IPTV service, by using an existing DLNA device in, for example, an open Internet connection environment that does not depend on infrastructure such as an access line and gateway to the Internet.

Technical Solution

A first aspect of the present invention is a content providing system comprising a content providing server and a content receiving client, characterized in that:
the content receiving client includes:
a communication unit that executes a communication process via a home network; and
a data processing unit that executes a process of receiving a content providing service provided by an external server existing outside the home network, by using mapping information in which the external server is set as a virtual home network device,
the data processing unit is configured to:
execute a process of obtaining device information of the client and registering the device information in a database existing outside the home network, and
the content providing server is configured to:
execute a process of obtaining the device information of the client, registered in the database, and providing the client with content matching the device.

Furthermore, an embodiment of the content providing system according to the present invention is characterized in that the device information includes device information regarding at least one of a screen size, a screen resolution, a size of available memory, and a supported codec type of the client, and the content providing server is configured to execute a process of obtaining the device information and providing the client with content that can be played by the device.

Furthermore, an embodiment of the content providing system according to the present invention is characterized in that the data processing unit of the content receiving client is configured to execute a process of sending the device information of the client to a home subscriber subsystem (HSS) defined in an IP multimedia system (IMS) and registering the device information, and the content providing server is configured to execute a process of obtaining the device information of the client, registered in the home subscriber subsystem (HSS), and providing the client with content matching the device.

Furthermore, a second aspect of the present invention is an information processing apparatus characterized by comprising:
a communication unit that executes a communication process via a home network; and
a data processing unit that executes a process of receiving a content providing service provided by an external server existing outside the home network, by using mapping information in which the external server is set as a virtual home network device,
and characterized in that the data processing unit is configured to:
execute a process of obtaining device information of the information processing apparatus and registering the device information in a database existing outside the home network.

Furthermore, an embodiment of the information processing apparatus according to the present invention is characterized in that the data processing unit is configured to execute a process of obtaining device information regarding at least one of a screen size, a screen resolution, a size of available memory, and a supported codec type of the information processing apparatus, and registering the device information in the database existing outside the home network.

Furthermore, an embodiment of the information processing apparatus according to the present invention is characterized in that the data processing unit is configured to execute a process of sending the device information of the information processing apparatus to a home subscriber subsystem (HSS) defined in an IP multimedia system (IMS) and registering the device information.

Furthermore, a third aspect of the present invention is an information processing method executed in a content providing system including a content providing server and a content receiving client, characterized in that:
the content receiving client executes:
a communication step in which a communication unit executes a communication process via a home network;
a content receiving step in which a data processing unit executes a process of receiving content provided by an external server existing outside the home network, by using mapping information in which the external server is set as a virtual home network device; and
a device information registering step in which the data processing unit executes a process of obtaining device information of the client and registering the device information in a database existing outside the home network, and
the content providing server executes a process of obtaining the device information of the client, registered in the database, and providing the client with content matching the device.

Furthermore, an embodiment of the information processing method according to the present invention is characterized in that the device information includes:
device information regarding at least one of a screen size, a screen resolution, a size of available memory, and a supported codec type of the client, and the content providing server executes a process of obtaining the device information and providing the client with content that can be played by the device.

Furthermore, an embodiment of the information processing method according to the present invention is characterized in that the data processing unit of the content receiving client executes a process of sending the device information of the client to a home subscriber subsystem (HSS) defined in an IP multimedia system (IMS) and registering the device information, and the content providing server executes a process of obtaining the device information of the client, registered in the home subscriber subsystem (HSS), and providing the client with content matching the device.

Furthermore, a fourth aspect of the present invention is an information processing method executed at an information processing apparatus, characterized by executing:
a communication step in which a communication unit executes a communication process via a home network;

a content receiving step in which a data processing unit executes a process of receiving content provided by an external server existing outside the home network, by using mapping information in which the external server is set as a virtual home network device; and a device information registering step in which the data processing unit executes a process of obtaining device information of the information processing apparatus and registering the device information in a database existing outside the home network.

Furthermore, an embodiment of the information processing method according to the present invention is characterized in that the device information registering step is a step of executing a process of obtaining device information regarding at least one of a screen size, a screen resolution, a size of available memory, and a supported codec type of the information processing apparatus, and registering the device information in the database existing outside the home network.

Furthermore, an embodiment of the information processing method according to the present invention is characterized in that the device information registering step is a step of executing a process of sending the device information of the information processing apparatus to a home subscriber subsystem (HSS) defined in an IP multimedia system (IMS) and registering the device information.

Furthermore, a fifth aspect of the present invention is a computer program for causing execution of information processing, executed at an information processing apparatus, characterized by causing execution of:

a communication step of causing a communication unit to execute a communication process via a home network;

a content receiving step of causing a data processing unit to execute a process of receiving content provided by an external server existing outside the home network, by using mapping information in which the external server is set as a virtual home network device; and a device information registering step of causing the data processing unit to execute a process of obtaining device information of the information processing apparatus and registering the device information in a database existing outside the home network.

Note that the computer program according to the present invention is a computer program that can be provided, for example, to a general-purpose computer system capable of executing various program codes via a storage medium or communication medium that provides the program in a computer-readable format. By providing such a program in a computer-readable format, a process according to the program is implemented on the computer system.

Other objects, features, and advantages of the present invention will become apparent from more detailed description based on embodiments of the present invention described later and the accompanying drawings. Note that in this specification, a system is a logically combined configuration of a plurality of apparatuses, and is not limited to one in which the constituent apparatuses exist within the same case.

Advantageous Effects

According to the configuration of the present invention, it becomes possible for a DMP as a content playing apparatus, which is a client device in a home network, to receive content from a content providing server outside the home network and to play the content. That is, a home IMS gateway, which is an information processing apparatus according to the present invention, executes communication with a content providing server to map the content providing server as a virtual home network device, and in response to reception of a device discovery request from a content playing apparatus in a home network, the home IMS gateway provides the content playing device with server information of the content providing server as information of a device from which a service can be received. Furthermore, it becomes possible to execute a process in which device information of the client is obtained and registered in a database existing outside the home network, and the content providing server obtains the device information and provides the client with content matching the device.

BEST MODE FOR CARRYING OUT THE INVENTION

Hereinafter, with reference to the drawings, a content providing system, an information processing apparatus, an information processing method, and a computer program according to the present invention will be described in detail. The description will be given in order regarding the following items.

1. Configuration for receiving an IPTV service by a device in a home network
2. Description of functions applied to an IPTV service
3. Regarding specific process examples of an IPTV service
3-1. Regarding specific process example of a communication process
3-2. Regarding specific process examples of various types of services

[1. Configuration for Receiving an IPTV Service by a Device in a Home Network]

First, with reference to FIG. 3, an example configuration of an information communication system according to the present invention will be described. IPTV service systems have been developed and commercialized by various vendors, such as U.S. Microsoft Corporation. In this embodiment, description will be given regarding an example where an IPTV service architecture that uses an IP multimedia subsystem (IMS) is used.

IMS has originally been developed by 3GPP (3rd Generation Partnership Project), which is a project for standardizing 3rd generation mobile communication systems, as base technologies for providing, for example, push to talk conference systems, which enable conversation by three or more cellular phones, communication such as instant messages, and multimedia additional services in voice telephony services on wireless communication infrastructure for cellular phones.

IMS is based on IP technologies, and is highly compatible with Internet infrastructure for fixed communication systems. In the midst of movement for integrating wired and wireless communication network infrastructure by IP, called FMC (Fixed Mobile Convergence), attention is being given to IPTV systems that use IMS.

IMS is composed of functional elements such as a home subscriber subsystem (HSS) and an application server (AS), with a functional component called CSCF (Call Session Control Function) as a core, which is based on SIP (Session Initiation Protocol) defined by RFC-3261 of IETF (The Internet Engineering Task Force).

Figure 3:
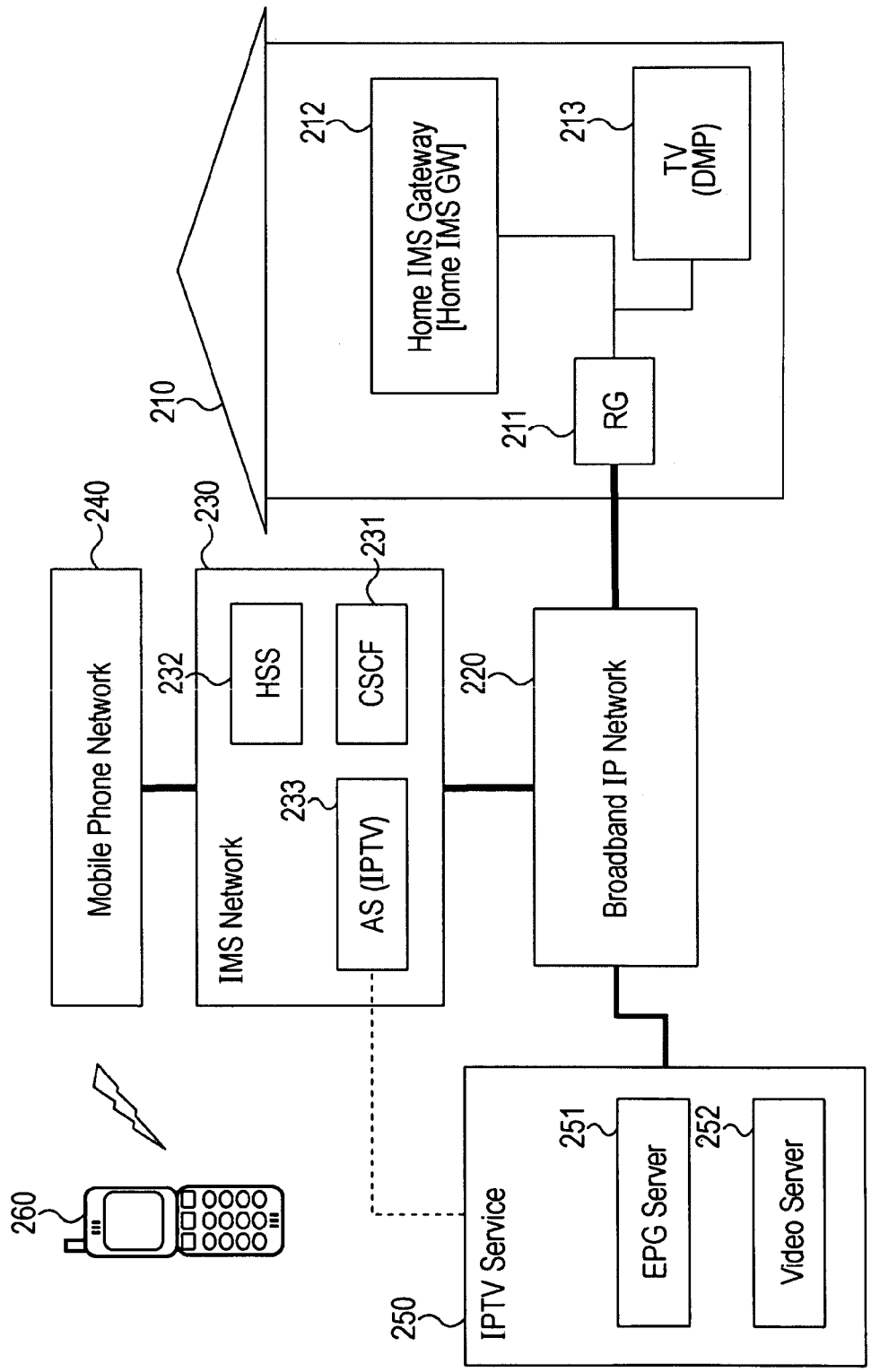
FIG. 3 is a diagram for explaining an example configuration of an information communication system according to the present invention.

An IMS network 230 shown in FIG. 3 includes a CSCF 231, an HSS 232, and an AS (IPTV) 233 as these individual functional elements, and it provides services to a cellular phone 260 via a mobile phone network 240.

The CSCF 231 performs user registration and session setting control on the basis of SIP (Session Initiation Protocol). Furthermore, it executes activation of service processes needed according to setting of a user profile registered in the HSS 232. The HSS 232 includes databases for management of user IDs used in IMS, management of profiles of services that each user subscribes to, management of authentication information, management as to whether use of each IMS service is allowed, and management of user movement. The AS 233 is a server that executes processes of individual services, and it is activated by the CSCF 231 in accordance with the service subscription status of each user to provide services to the user.

As described above, in IMS, a terminal for which a user ID has been set accesses the CSCF 231 to perform terminal registration and session setting control, services needed are activated according to setting of a user profile registered in the HSS 232, and the AS 233 actually executes processes of individual services.

For example, a representative example of a service that uses IMS is "Push To Talk". In "Push To Talk", a user terminal is configured to connect to an application server (AS) AS that executes a "Push To Talk" service in the IMS network 230, establish sessions with a plurality of members from the AS with registered group members, and perform conversation among the members via a relaying server using VoIP (Voice over IP).

In an IPTV viewing service, an AS for an IPTV service, set in the IMS network 230, is used. The AS (IPTV) 233 shown in FIG. 3 corresponds to an AS that executes the IPTV service. The AS (IPTV) 233 actually executes a service for the user terminal in cooperation with an IPTV service 250 as an entity that executes the IPTV service, i.e., an entity that provides content.

The IPTV service 250 includes an EPG server 251, which is a server that provides an EPG (Electronic Program Guide), i.e., a program information guide such as a content list, and a video server 252, which is a server that provides video content, and it implements a service of providing a content list and a service of providing content to the user terminal by cooperation between the respective servers and the AS (IPTV) 233 of the IMS network 230.

Figure 1:
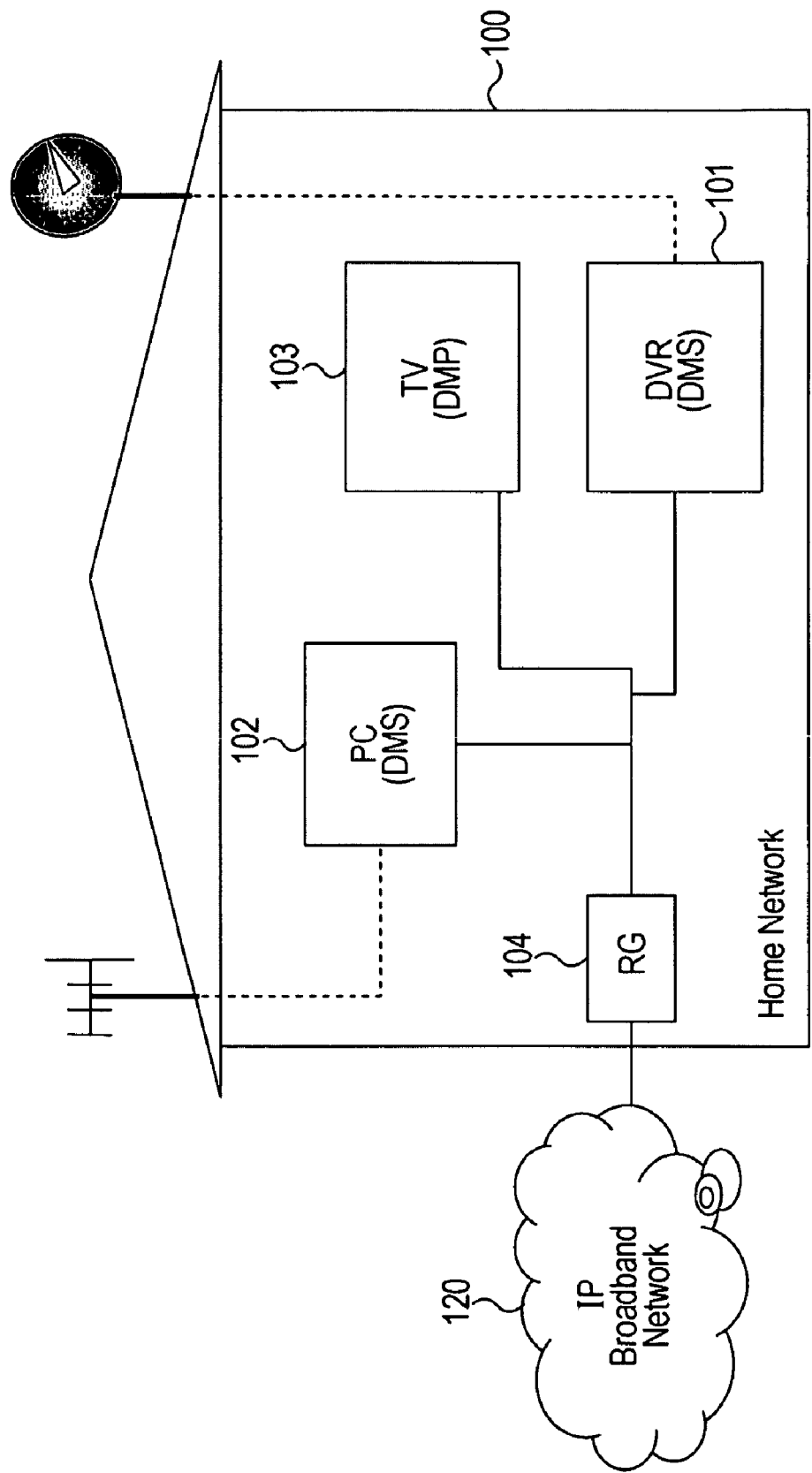
FIG. 1 is a diagram showing an example of a home network proposed by DLNA.
Figure 2:
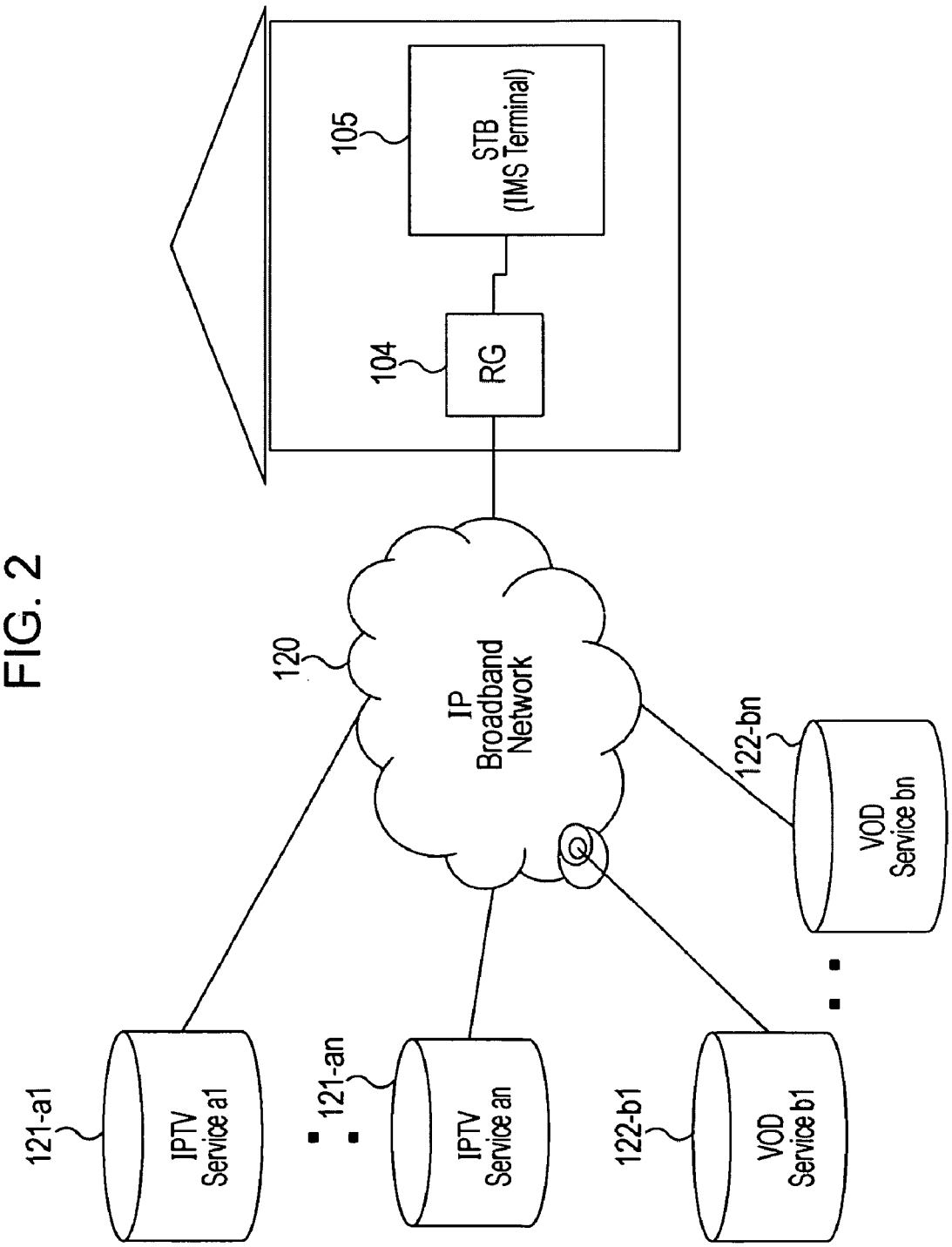
FIG. 2 is a diagram showing a schematic diagram of IPTV and VOD services.

In the system of the present invention, a home network 210, as its basic configuration, is configured by a conventional-type home network described earlier with reference to FIGS. 1 and 2, i.e., by existing DLNA (Digital Living Network Alliance) devices. FIG. 3 shows a residential gateway (RG) 211 used as a bridge, which is a network connecting device for connecting a device in the home network to an IP broadband network 221, a home IMS gateway 212 that executes a process for allowing a device in the home network 210 (e.g., a content playing device such as a TV (DMP) 213) to use a service provided by a server outside the home network, and the TV 213 as a digital media player (DMP), which is a client device that receives and plays content.

A broadband IP network 220 is a network, such as the Internet, that allows mutual communication among the IPTV service 250, the IMS network 230, and the home network 210.

Note that in the system of the present invention, the home IMS gateway 212 is set as a terminal that receives an IMS network service. In the home IMS gateway 212, an IMS user ID is set. That is, a user ID and a user profile of the home IMS gateway 212 are registered in the home subscriber subsystem (HSS) 232 of the IMS network 230.

The home IMS gateway 212 receives an IPTV service by executing a process similarly to a case where the cellular phone 260 executes an IPTV service. That is, it accesses the CSCF 231 and performs terminal registration and session setting control, activates services needed according to setting of the user profile registered in the HSS 232, and receives a service using the AS (IPTV) 233. In addition to the function of connecting to an IMS service as described above, the home IMS gateway 212 executes a gateway function for access by a DLNA device, such as the TV (DMP) 213 shown in the figure, to video content provided by the IPTV service 250. That is, the home IMS gateway 212 has the following functions:

(a) Function for connecting to an IMS service
(b) Gateway function

These functions are implemented using a network communication function, a basic configuration of an information processing apparatus, and software. The home IMS gateway 212 can be implemented on various devices connected to an existing home IP network having a network communication function.

Note that in a case where the home IMS gateway 212 executes a process of relaying video content or the like provided by the IPTV service 250 to a DLNA device, such as the TV (DMP) 213 shown in the figure, the following function is further provided:

(c) DMS function as a function for executing a content providing process

However, this function is not necessarily needed, and such a configuration is possible that transmission and reception of content are executed by communication between a DMP as a DLNA device and an external server without the home IMS gateway 212 intervening therebetween. In this case, the home IMS gateway 212 need not have the DMS function. Specific process configurations of these will be described later.

By setting the home IMS gateway 212 having a function for receiving an IMS network service in the home network, it becomes possible for an existing DLNA device (e.g., the TV (DMP) 213 shown in the figure) to receive IPTV video content by a process substantially similar to receiving content provided from a DMS in the home network, i.e., the home IMS gateway 212.

It becomes possible for the TV (DMP) 213, which is a client device in the home network, to execute an IPTV service executed as a process of providing content from a device outside the home network, by a content using process similar to receiving content provided from a DMS in the home network, i.e., the home IMS gateway 212.

The home IMS gateway 212 implements a DMS (Digital Media Server) function as a content providing server of a DLNA device. An access is made from the TV 213 on which a DMP (Digital Media Player) is implemented to the home IMS gateway 212, so that the IMS gateway 212 can provide an IPTV service received via the IMS network 230 to the TV 213.

As described earlier, the home IMS gateway 212 can be implemented on various devices having a network communication function and connected to an existing home IP network. For example, it is possible to implement an IMS network service receiving function on a residential gateway (RG: Residential) supplied from an access line vendor that provides a network circuit, such as a telephone company or a cable TV company. In this case, the RG 211 and the home IMS gateway 212 shown in FIG. 3 are integrated.

Alternatively, in the conventional-type home network configuration described earlier with reference to FIG. 1, it is possible to implement an IMS network service receiving function on a DVR (Digital Video Recorder) or a PC that functions as a digital media server (DMS) as a device that provides content.

As described above, in the configuration of the present invention, since devices on which an IMS network service receiving function can be implemented are not limited, it becomes possible to support an IPTV service using the open Internet, and it also becomes possible to support an arbitrary home network configuration without limitation regarding network topology.

Hereinafter, an example configuration of the home IMS gateway and a process of receiving an IPTV service using the home IMS gateway will be described in detail. First, before describing the home IMS gateway, functional components of the DLNA guideline, to which DLNA devices conform, will be described with reference to FIG. 4.

Figure 4:
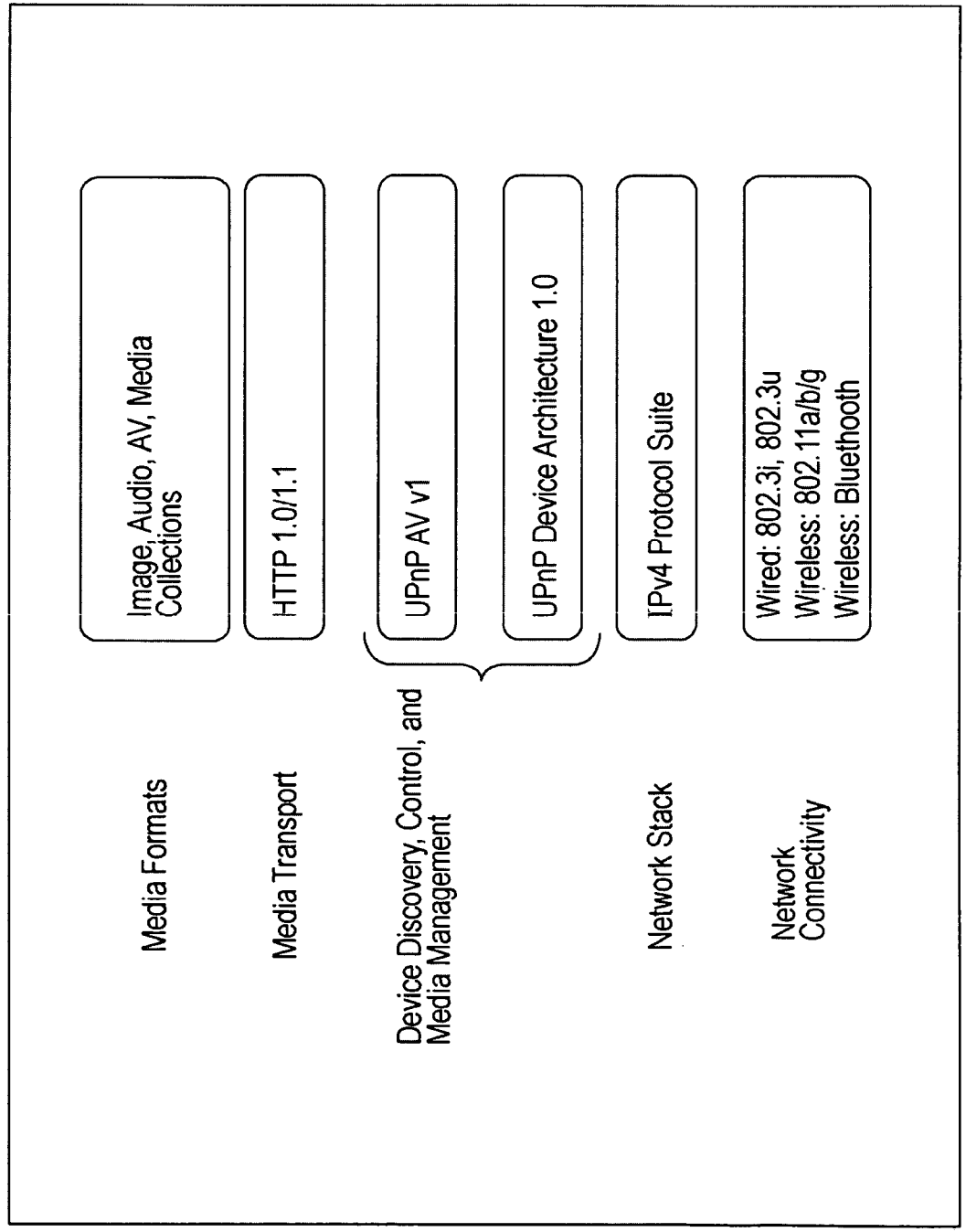
FIG. 4 is a diagram for explaining functional components according to the DLNA guideline, to which DLNA devices conform.

FIG. 4 shows functional components of the DLNA guideline. From the top row, configurations of a media format layer (Media Format), a media transport layer (Media Transport), a device discovery control and media control layer (Device Discovery, Control, and Media Management), a network layer (Network Stack), and a network connectivity layer (Network Connectivity) are defined. A home network device (DLNA device) executes data communication according to network protocols compliant with the DLNA (Digital Living Network Alliance) guideline according to the basic components shown in FIG. 4.

First, the network connectivity on the lowermost layer is a definition of a physical layer and a link layer of a home network. On a DLNA device, communication functions conforming to the IEEE 802.3u and 802.211a/b/g are implemented. However, the communication standard regarding home network infrastructure is not limited as long as IP connection is allowed, such as PLC (Power line communication).

In the network layer, the IPv4 protocol is used, and each DLNA device performs communication using TCP or UDP. In UPnP (registered trademark) Device Architecture 1.0 defined in the device discovery control and media control layer, SSDP (Simple Service Discovery Protocol) for device discovery, SOAP (Simple Object Access Protocol) for performing control, and so forth are defined, and UPnP AV is implemented over UPnP DA (UPnP Device Architecture). UPnP AV version 1 defines UPnP Media Server and UPnP Media Renderer. A DMS, which is a content providing server defined in DLNA, implements UPnP Media Server, and a DMP, which is a content playing device defined in DLNA, implements a controller of UPnP Media Server.

On UPnP Media Server, a main content directory service is implemented, so that a method of obtaining a content list and metadata is provided. By using the content directory service, the DMP, which is a content playing device defined in DLNA, obtains a content list streamed by the DMS, which is a content providing server defined in DLNA.

As a definition of the media transport layer, which is a next upper layer, it is defined that HTTP 1.0/1.1 is used for streaming playing. As a media format, in the case of video content, it is defined that content of Media Formats conforming to the MPEG2-PS profile defined by DLNA is transferred by streaming from the DMS to the DMP. For example, the DMP, which is a content playing device defined by DLNA, sequentially decodes and plays MPEG2-PS data received by streaming transmission, whereby the user can view the content.

Figure 5:
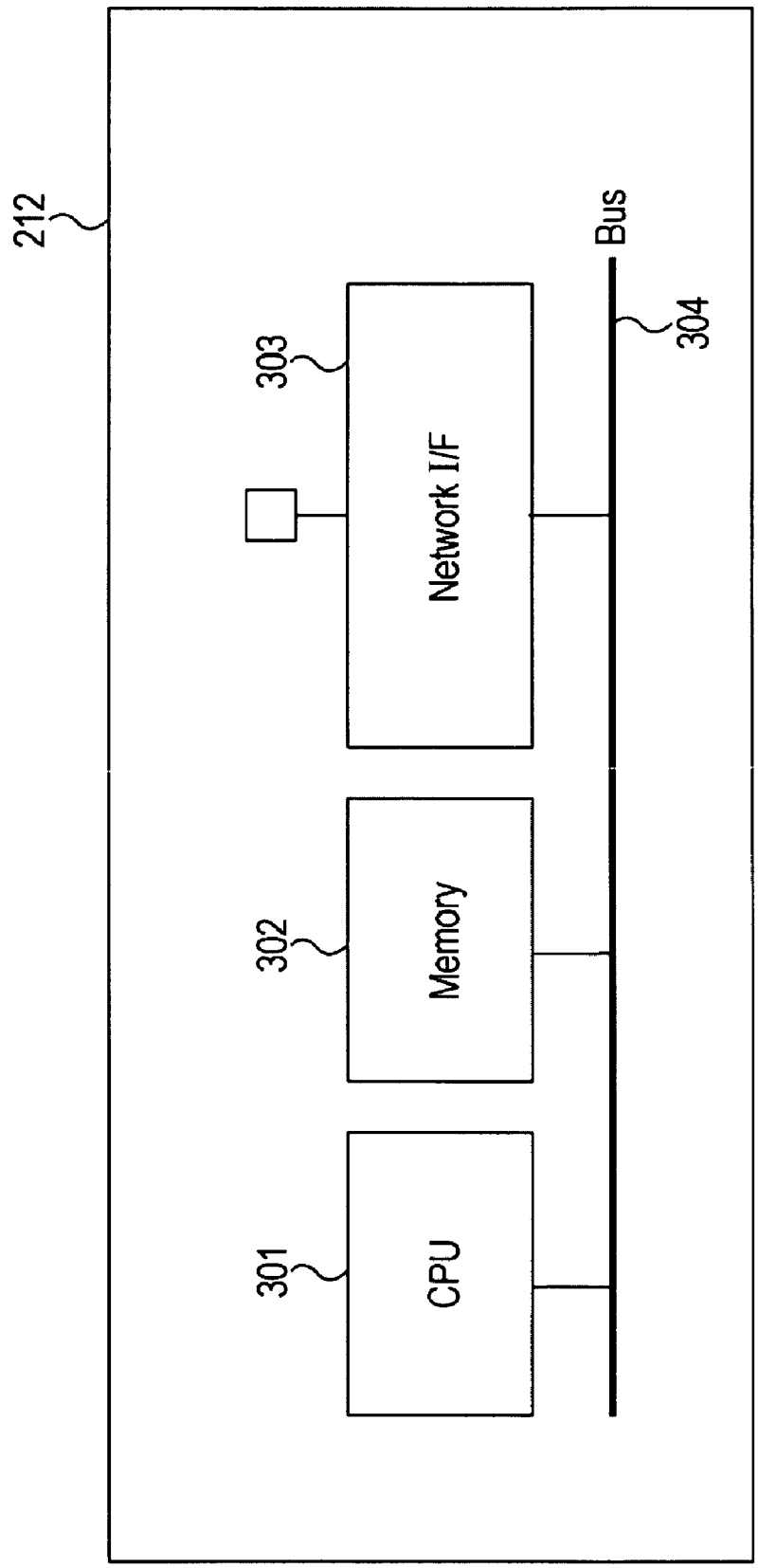
FIG. 5 is a diagram showing an example hardware configuration of a home IMS gateway.

FIG. 5 shows an example hardware configuration of the home IMS gateway 212 described with reference to FIG. 3. As described earlier, the home IMS gateway 212 has the following functions:

(a) Function for connecting to an IMS service
(b) Gateway function

These functions are implemented by a network communication function, a basic configuration of an information processing apparatus, and software. The hardware shown in FIG. 5 shows an example hardware configuration for implementing these functions (a) to (b).

As shown in FIG. 5, the home IMS gateway 212 is configured by a CPU 301 as a data processing unit that executes various types of software (computer programs), a memory 302 formed of a ROM as a program storage area, a RAM used as a work area or the like during execution of data processing, and so forth, a network I/F 303 as a network connecting unit, and furthermore, a bus 304 for transferring commands and data between these components.

The network I/F 303 is, for example, a network I/F for a wired LAN, such as IEEE 802.3u. An OS and other software programs are stored in a flash-ROM constituting the memory 302, and these programs are copied to a RAM constituting the memory 302 and executed. Furthermore, a user ID and various types of setting information needed in a process of establishing an IMS session are also saved in the flash-ROM constituting the memory 302.

Next, an example configuration of software modules of the home IMS gateway 212 will be described with reference to FIG. 6. As shown in the figure, the software modules can be classified into three types:

(1) Network modules
(2) Protocol modules
(3) Application modules (1) The network modules are modules in charge of controlling communication in an IP network.

(2) The protocol modules are modules in charge of protocol control that controls the individual functions of IMS and DLNA, i.e., performing control so that the IMS side executes communication according to a protocol defined on the IMS side and so that the DLNA side executes communication according to a protocol defined on the DLNA side. Since communication according to different protocols is executed on the IMS side and on the DLNA side, configurations supporting different protocols are provided.

(3) The application modules are modules that implement an actual gateway function using the protocol modules, i.e., that implements relaying between the DLNA side on the home network side and the IMS network, which is a network outside the home network.

In the figure, in order to clarify the distinction between functions used on the DLNA side on the home network side and functions used in the IMS network, which is a network outside the home network, areas are separated by a broken line, with software modules applied to the IMS/IPTV side shown on the left side of the broken line, and software modules applied to the DLNA side shown on the right side. Note, however, that the network modules are commonly used in both networks. Hereinafter, each of the modules will be described in detail.

First, in the network modules, an IPv4 TCP IP stack, and an Auto IP/DHCP (Dynamic Host Configuration Protocol) Client module for executing a process of setting an IP address, defined in UPnP DA, are implemented. The same network modules can be used by both IMS and DLNA.

Basically, it suffices for the home IMS gateway 212 to be connected to a home IP network, so that it is not absolutely necessary to separately set network I/Fs. Note, however, that in a case where it is configured as integrated with a residential gateway, a home network connection I/F and an external network connection I/F may be configured separately.

Since protocols that are used on the DLNA side on the home network side and protocols used in the IMS network, which is a network outside the home network, are currently different, the protocol modules are set individually in accordance with the individual protocols.

The DLNA side is composed of SOAP, GENA (Generic Event Notification Architecture), Presentation Page and Device Description modules by an HTTP (Hyper Text Transfer Protocol) server, SSDP in charge of Device Discovery as a device discovery process, and an AKE module that executes authentication and key exchange (AKE) of DTCP-IP (Digital Transmission Content Protection—Internet Protocol) needed for implementing content in a home network, as defined in UPnP DA.

The IMS side is composed of SIP/Module that establishes a session with an AS (Application Server), which is a server that provides an IMS service, and SOAP and GENA modules that perform message communication with the AS. Furthermore, on the IMS side, since communication over the open Internet is assumed, communication executing protocols, such as SIP and SOAP, are implemented over the TLS (Transport Layer Security) protocol defined in IETF RFC 2246 for security, so that the protocol setting is such that communication is executed under a secure environment.

One of the features of the home IMS gateway 212, which is an information processing apparatus of the present invention, is that it has such a configuration that a process of mapping an AS (IPTV service) of IMS as a UPnP device is executed using a function called Device Discovery Control as a device discovery process function used on a DLNA-side device. That is, the home IMS gateway 212 maps a server outside the home network as a virtual home network device. Specifically, by using UPnP Device Proxy Manager (refer to FIG. 6) or the like that is set as an application module on the home IMS gateway 212, the home IMS gateway 212 generates a UPnP Media Server instance corresponding to an AS (IPTV), which is an external server, and records it on a memory.

As described above, the home IMS gateway 212 maps and sets an AS (IPTV service) of IMS, which is an external device not existing in the home network, as a DMS of DLNA. This process is a process of making setting as if an AS (IPTV service) of IMS were a content providing server (DMS) existing in the home network.

In a case where a device discovery process according to UPnP is executed through the mapping process by a DLNA device in the home network, e.g., a DMP as a content playing executing device such as a TV, it becomes possible for the home IMS gateway 212 to notify the DMP that it has a service providing function based on the UPnP Media Server instance corresponding to the AS (IPTV). This makes it possible for the DMP to recognize, on the basis of this notification, the AS (IPTV service) of IMS as a device similar to a content providing server (DMS) in the home network. This makes it possible to receive a service of the AS (IPTV service) of IMS, which is an external network, by a process similar to reception of a service based on providing of content from within the home network.

Note that regarding the home IMS gateway 212, which is an information processing apparatus of the present invention, it is possible to make arbitrary setting as to whether a process of relaying content provided by the AS (IPTV service) of IMS to a DMP as a content playing executing device in the home network is to be executed. It is possible to make setting such that, without performing relaying of content, a DMP directly obtains content data from an external network by communication between a DLNA device (DMP as a content playing executing device) and a backend Video Server of the AS (IMS) of IMS. Specific process examples of these will be described later.

In a case where the home IMS gateway 212 performs relaying of content provided by the AS (IPTV service) of IMS, functions called Media Management, for example, a Content Directory service that obtains metadata of a content list, and a protocol for transferring video content, called Media Transport of DLNA, are implemented. In a configuration where the home IMS gateway 212 does not perform relaying of content provided by the AS (IPTV service) of IMS, it is not necessary to implement these functions, i.e., the Media Management functions, on the home IMS gateway 212.

Furthermore, it is also possible to make setting such that the home IMS gateway 212 does not perform a relaying process either for a content list request from a client device in the home network, i.e., a DMP as a content playing executing device, and such that a client device (DMP) is caused to issue a content list request directly to an external server such as an AS (IPTV service). In this configuration, it suffices for the home IMS gateway 212 to be configured to be capable of responding to a device discovery request from a client. Note that direct sending of a request from a client to an external server without passing it through the home IMS gateway 212 is implemented by setting the URL of the external server, not the home IMS gateway, as a URL specified in [ControlURL] and [eventSubURL] of device information [Device Description] defined in Device Architecture of UPnP. By the home IMS gateway 212 providing device information [Device Description] having such setting to a client device, an external server, such as an AS (IPTV service), is set as a counterparty to which the client subsequently issues a content list request or various types of requests with reference to the device information. In this case, the model is such that the home IMS gateway is in charge of only device discovery, so that the load is further reduced. Note that it is possible to set a URL of an external server instead of the home IMS gateway 212 also in URL [SCPDURL] for obtaining device information, defined in Device Architecture of UPnP.

The application modules, by using the protocol modules, execute a gateway function, i.e., a function of setting a communication environment between a DLNA device in the home network and a server outside the home network. The application modules are broadly classified into a set of modules that perform a mapping process for setting an AS (IPTV) service of IMS as a DMS of DLNA, and a set of modules that pass requests sent to a mapped DLNA DMS (which is actually an AS (IPTV) service of IMS) from, for example, a DMP, which is a content playing device in the home network, to the AS (IPTV) service of IMS.

The former set of modules, which perform the mapping process, are AS Discovery, ServiceManager, and UPnP Device Proxy Manager, and the latter modules, which execute the request transferring process, are UPnP Message Proxy and AKE Proxy.

As described above, the home IMS gateway 212, which is an information processing apparatus of the present invention, performs a process of mapping an AS (IPTV service) of IMS, which is an external device not existing in the home network, as a DMS of DLNA. Furthermore, the home IMS gateway 212 has a function of selectively mapping only a service entity [AS(IPTV)] selected by a user at the time of the mapping process.

That is, in a configuration where a plurality of ASs (IPTVs) of IMS/IPTV exist in the external network and each provides content, only an AS (IPTV) that a user has purchased and selected using an IMS charging system is selected and mapped to a DMS of DLNA.

Figure 6:
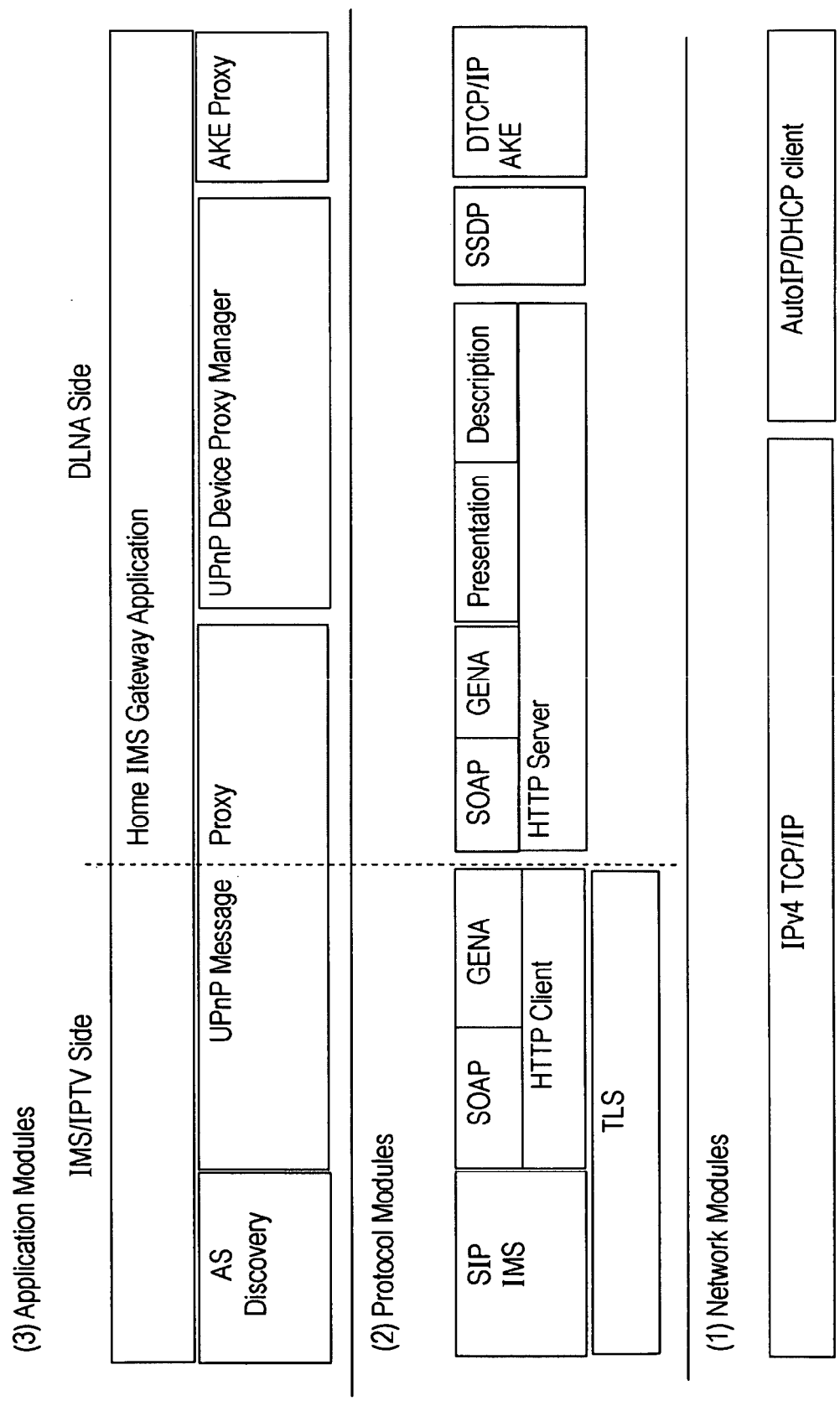
FIG. 6 is a diagram for explaining an example configuration of software modules of a home IMS gateway.

Among the application modules that perform the mapping process, AS Discovery shown in FIG. 6, which is a module on the IMS/IPTV side, executes a process of discovering an IPTV service provided by an IMS system, and UPnP Device Proxy Manager, which is a DLNA-side module, manages a list of ASs discovered and obtained by AS Discovery, and presents the user with this list to allow the user to execute a process of purchasing or selecting an AS (IPTV).

Specifically, the home IMS gateway 212, which is an information processing apparatus of the present invention, becomes an HTTP server, and connects to a UPnP Control Point having an HTML browser thereon by using the scheme of Presentation defined in UPnP DA, the user selects a desired IPTV service from a displayed HTML screen using a browser function, and performs a procedure of subscribing to the service. Specifically, for example, by using a PC or TV having a browser function, set as a DLNA device in the home network, it is possible to present a list owned by the home IMS gateway 212 on a display and to select an IPTV service.

Furthermore, in the procedure of receiving the IPTV service, by using UPnP Message Proxy as an executing module, it is possible to cause the request transferring process described earlier to cooperate with the charging system provided by the IMS system, and charging on the user is performed on the basis of customer information of the IMS user ID that has been set as an ID corresponding to the home IMS gateway 212.

As described above, on condition of the procedure of subscribing to the AS (IPTV) by the user, it becomes possible for the home IMS gateway 212 to perform selective mapping such as selecting an IPTV service for which the subscription procedure has been executed by the process of UPnP Device Proxy Manager, which is an application module, and mapping the IPTV service to a DLNA DMS. Note, however, that in a case where an AS (IPTV) or the like exists for which it is not necessary to perform a subscription procedure, such as an AS (IPTV) that provides content free of charge, the process of subscription procedure by the user is not necessary, and user's selection is not a necessary condition for mapping.

The DMP as a content playing device, which is a DLNA device in the home network, interprets the AS (IPTV) for which the mapping process has been completed at the home IMS gateway 212 as a content providing server (DMS) in the home network, so that it becomes possible to receive the AS (IPTV) service.

UPnP Message Proxy, which is an application module, relays a message supplied from the DLNA DMP to the AS (IPTV). As protocols for this purpose, SOAP and GENA, equivalent to UPnP, are used, and the AS tries to achieve mutual compatibility by directly processing messages of UPnP Media Server and Content Directory services defined in UPnP AV, by performing protocol conversion for AS (IPTV) at UPnP Message Proxy, or the like.

Note that the example configuration of software modules of the home IMS gateway 212, shown in FIG. 6, is a configuration of software modules in a case where the home IMS gateway is allowed to execute both communication according to communication protocols on the IMS/IPTV side and communication according to communication protocols on the side of DLNA in the home network, and the home IMS gateway 212 executes protocol conversion as needed in communication between the IMS/IPTV side and the DLNA side.

The configuration for the process of conversion of communication protocols may be such that it is executed by the home IMS gateway 212, or, for example, the configuration may be such that it is executed by an external server that executes communication directly with the side of the home IMS gateway 212, for example, an AS on the IMS side or a server that executes an IPTV service. As described above, in the configuration where necessary protocol conversion is executed at the external server, it suffices for the home IMS gateway 212 to have DLNA-side protocol modules and application modules. Note that in the case of such a configuration, the process of mapping the external server is executed by executing a device discovery process according to the SSDP protocol defined by DLNA.

Furthermore, in the process of obtaining a content list and metadata, executed by a client device in the home network, i.e., a DMP as a content playing executing device, in the embodiment described below, a method is employed in which an AS directly processes a UPnP Content Directory service. In the embodiment, a procedure for subscription to a service is executed by UPnP Control Point on which an HTML browser is implemented. Although this may be a DMP of DLNA, it need not necessarily be a DMP of DLNA, and a similar process can also be executed by a third party, for example, an HTML browser of a personal computer. Also, in a case where an HTML browser is implemented on a cellular phone or the like, a purchase procedure can be executed similarly.

Furthermore, by making setting such that the home IMS gateway 212 itself has a user interface such as a display apparatus and an input unit, it is possible to input information input by the user by directly presenting a list obtained from an AS (IPTV) on the user interface, so that it is possible to execute a procedure for service subscription without depending on control by an HTML browser.

Note that various modes are possible as modes of the procedure for subscribing to an AS (IPTV). That is, various setting is possible, such as selection on the basis of each service as selection of an AS (IPTV) itself, or selection on the basis of each content provided by an AS (IPTV). In these cases, a scheme for selecting purchase by each content on the basis of setting of AS (IPTV) is provided by Presentation Page, selection information is registered on the IMS side as configuration data of user profile information, and the AS (IPTV) side provides content according to the registered information.

As described above, for the home IMS gateway 212, setting is possible both for a case where it is configured to execute a process of relaying content provided by an AS (IPTV service) of IMS to a DMP as a content playing executing device in the home network, and for a case where the process is not executed. In the latter case, processing of service logic at an application level, for example, data processing corresponding to each service, such as interpretation of a service provided by an AS (IPTV) service, or a process of conversion into a format understandable by a DMP, is not necessary. Furthermore, a process of temporary saving of content data or conversion is not necessary, either, so that it is possible to implement a home IMS gateway by an apparatus with very inexpensive software and hardware configurations.

By making service logic processing by the gateway apparatus unnecessary, compared with a configuration in which these processes are executed, flexibility of extension of services can be improved. For example, there are cases where an AS (IPTV), which is an entity that provides content, performs addition of metadata of content or the like. In a configuration where a gateway apparatus executes processing of service logic, in order to make it possible for the gateway to interpret and process the added metadata, for example, updating of a program becomes necessary. However, in a home IMS gateway of the present invention, it is possible to make setting that such processing is not executed, so that it becomes possible to make various changes in service logic only by changes on the distribution service side without making changes at the gateway itself.

As described earlier, the following two configurations exist as modes of processing by the home IMS gateway 212:

(1) Configuration in which a process of relaying content provided by an AS (IPTV service) of IMS to a content playing executing device (DMP) in the home network is executed.

(2) Configuration in which a process of relaying content provided by an AS (IPTV service) of IMS to a content playing executing device (DMP) in the home network is not executed, and content is played by communication between DMP and AS (IPTV service).

In the above configuration (2) where content is played by communication between DMP and AS (IPTV service), content is transmitted directly from a content distribution service on the Internet to a DMP, which is a playing device. Thus, as opposed to a method in which content is temporarily downloaded to a home server and is then redistributed into a home, since it is possible to play content on demand, convenience for the user is also high. Furthermore, in the method in which transmission of content is not relayed, since duplicate transmission of content data does not occur in the home network, it is possible to prevent using a band in vain. Furthermore, limitation regarding the topology of the home network becomes absent, so that there exists an advantage that the variety of products on which a gateway function is implemented increases.

Hereinafter, a process sequence in a case where content is played by the process of the above (2), i.e., communication between DMP and AS (IPTV service), will be described with reference to sequence diagrams in FIGS. 7 to 10. The sequence diagrams in FIGS. 7 to 10 are diagrams for explaining sequences of the following processes.

Figure 7:
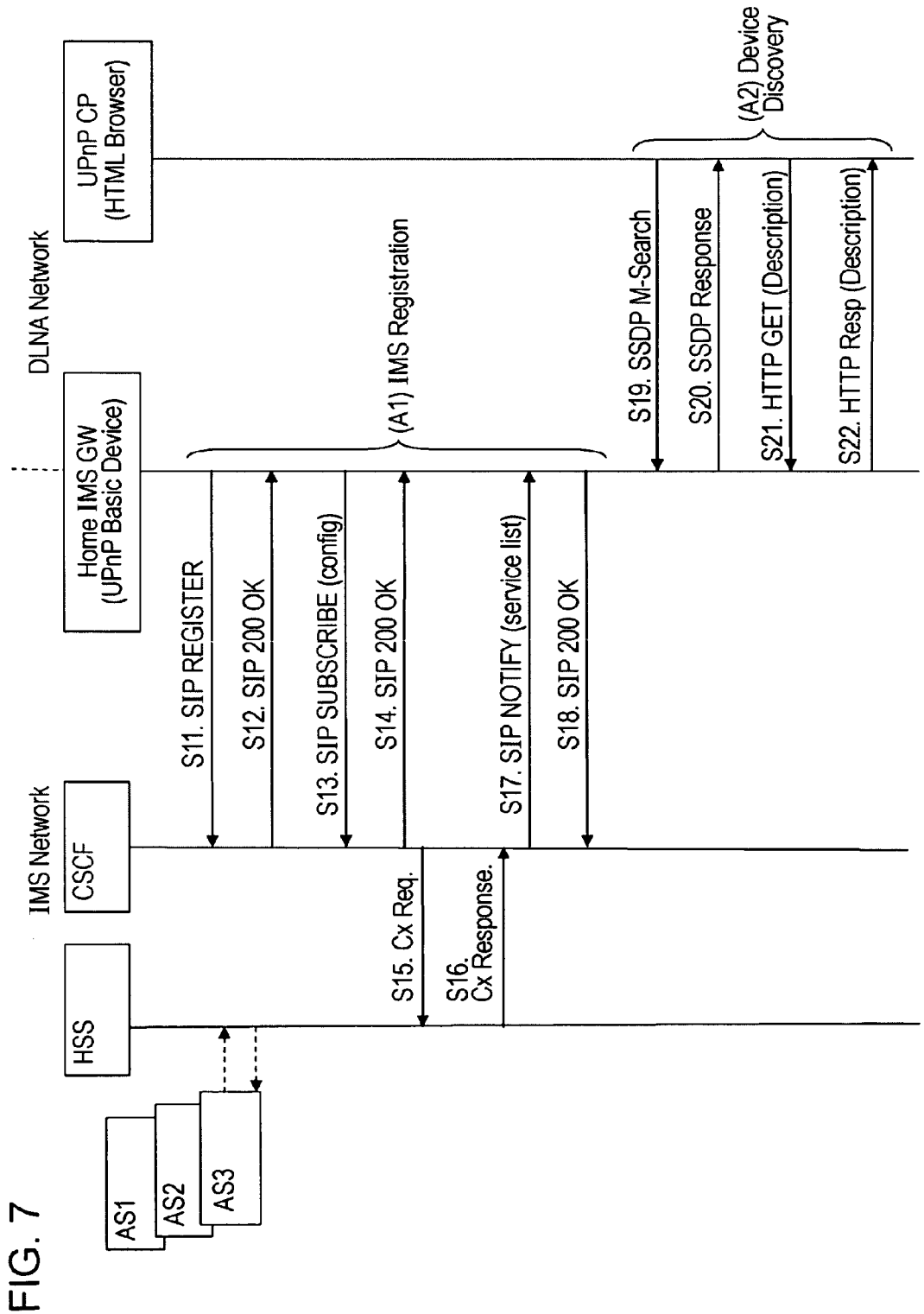
FIG. 7 is a diagram for explaining a sequence of a procedure for subscribing to an AS (IPTV).
Figure 8:
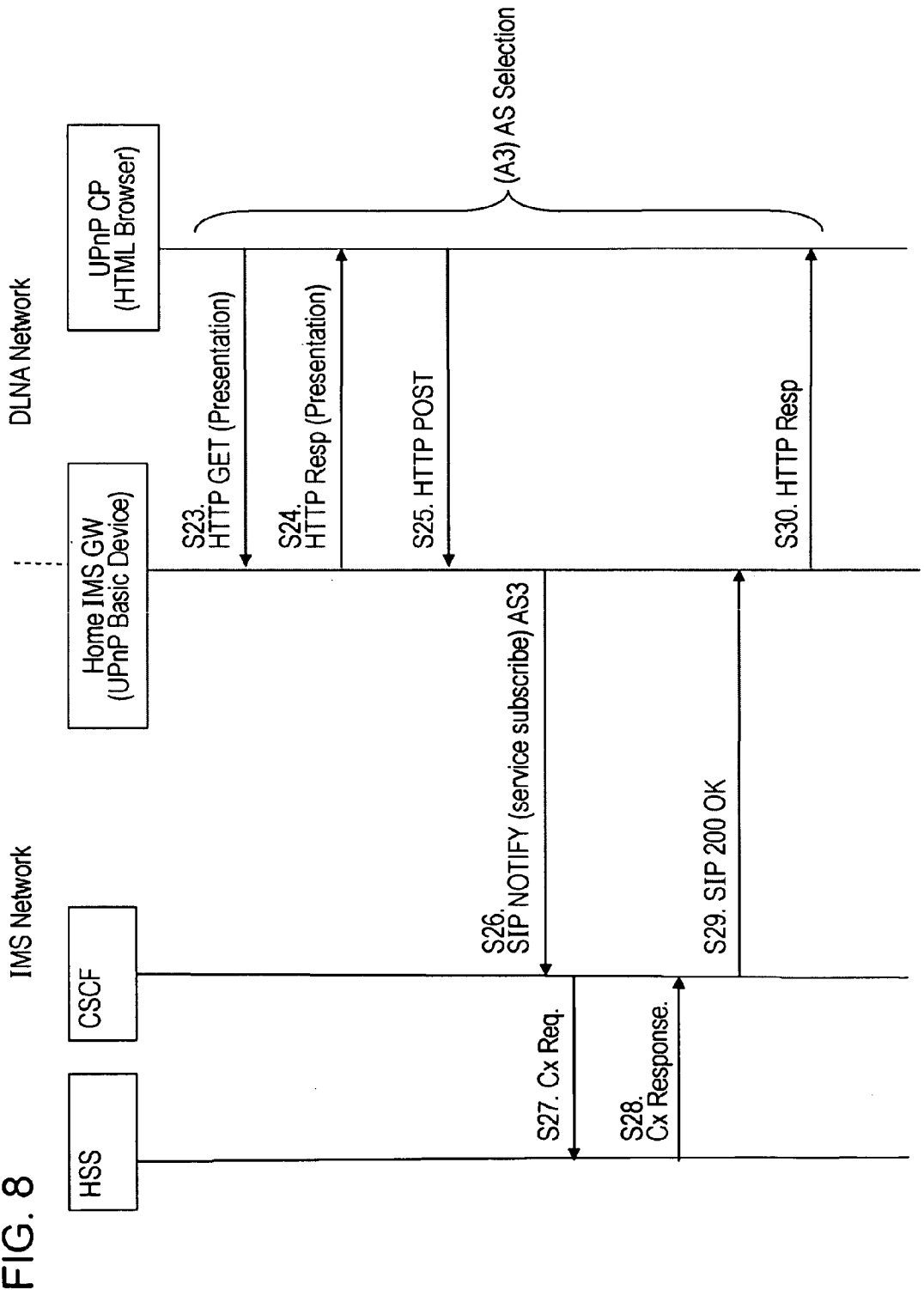
FIG. 8 is a diagram for explaining a sequence of a procedure for subscribing to an AS (IPTV).

(A) Sequence of procedure for subscribing to AS (IPTV) (FIGS. 7 and 8)
  (A1) IMS registration process
  (A2) Device discovery process
  (A3) AS (IPTV) selection process
(B) Sequence of usage of content provided by AS (IPTV) (FIGS. 9 and 10)
  (B1) Device Discovery Process
  (B2) Content list obtaining process
  (B3) Authentication and key exchange process
  (B4) Content streaming process First, with reference to FIGS. 7 and 8, the sequence of the procedure for subscribing to an AS (IPTV) will be described. FIGS. 7 and 8 show the following components from the left side:

(1) Three IPTV services AS1, AS2, and AS3 as application servers that execute content providing services supporting IPTV in an IMS network (2) HSS having databases for management of user IDs used in IMS, management of profiles of services that each user subscribes to, management of authentication information, management of whether use of each IMS service is allowed, and management of user movement (3) CSCF that performs user registration and session setting control on the basis of SIP (Session Initiation Protocol) in an IMS network (4) Home IMS gateway (5) HTML browser (user interface) as a UPnP control point Furthermore, [Cx], [SIP], [SSDP], and [HTTP] shown in individual steps indicate protocols applied to individual communications.

The sequence of the procedure for subscribing to an AS (IPTV), shown in FIGS. 7 and 8, can be divided into the following three phases:
(A1) IMS registration process
(A2) Device discovery process
(A3) AS (IPTV) selection process
Hereinafter, each of the processes will be described.
(A1) IMS Registration Process In the IMS registration process, which is the first phase, first, in step S11, the home IMS gateway sends an IMS user ID preset to the home IMS gateway to a CSCF of the IMS network, and in step S12, the home IMS gateway receives an acknowledgement of registration and performs registration to the IMS network. Then, in step S13, configuration information (config) is presented to the CSCF, and in step S14, an acknowledge response is received.

In step S15, the CSCF issues a request for available service information registered in association with the IMS user ID to the HSS having a database for managing user profile information and obtains the available service information (step S16), and in step S17, the CSCF sends the obtained list of available services to the home IMS gateway. In step S18, the home IMS gateway sends an acknowledgement of receipt to the CSCF.

The home IMS gateway obtains a list of available services as described above and stores it in a memory. The home IMS gateway generates an HTML document from the list of IPTV services obtained as described above, and prepares for the subsequent setting of AS by the HTML browser.

(A2) Device Discovery Process

The second phase is the device discovery process. At the initial stage, the AS to use is not specified by the user. Thus, at this stage, the home IMS gateway has not mapped the AS (IPTV) as a DLNA DMS, so that the DMP as a content playing device in the home network cannot interpret the AS (IPTV) as a DMS and receive content.

As described earlier, when selection of an AS (IPTV) is executed, the home IMS gateway becomes an HTTP server, and by using the scheme of Presentation defined in UPnP DA, it connects to UPnP Control Point having an HTML browser thereon and the user selects a desired IPTV service from an HTML screen displayed by using a browser function. The (A2) device discovery process shown in FIG. 7 is a sequence of this process.

The user who executes selection of an AS (IPTV) discovers that the home IMS gateway is connected on the home network by the process according to the device discovery protocol defined in UPnP from UPnP Control Point, for example, a PC or the like having a browser function, i.e., by sending SSDP M-Search in step S19 and receiving SSDP M-Response as a response thereto in step S20. Steps S21 and S22 are steps of requesting and receiving specific device information.

(A3) AS (IPTV) Selection Process

FIG. 8 shows the sequence of the AS (IPTV) selection process that is executed subsequently. In this phase, the user views the AS (IPTV) service list obtained in the first phase by the home IMS gateway from the UPnP Control Point, such as a PC, and executes service (AS) selection.

First, in steps S23 and S24, on the basis of HTTP GET to the home IMS gateway as an HTTP server, an HTML document is obtained and an HTML page is displayed. In the screen, an AS (IPTV) service list is displayed.

The user selects an AS (IPTV) from which the user desires to receive a service or selects content from the list, and then, in step S25, the request information is input to the home IMS gateway, and in step S26, the home IMS gateway issues a request for subscription to the service to CSCF of IMS. In step S27, on the basis of the service subscription request at the home IMS gateway, the CSCF executes registration of information corresponding to the service subscription request to the HSS as registration information associated with the user. Upon completion of the service subscription registration process, in step S28, a notification of a process completion response is sent from the HSS to the CSCF, is sent from the CSCF to the home IMS gateway in step S29, and is further sent to an apparatus having a user interface, such as a PC that is UPnP Control Point and acknowledged by the user in step S30.

Note that in the (A3) AS (IPTV) selection process, there are cases where, for example, a charging process or the like is performed. In this case, input and communication of information needed for the charging process are executed.

As described above, (A) the sequence of the procedure of subscribing to an AS (IPTV) is composed of the following three processes:
(A1) IMS registration process
(A2) Device discovery process
(A3) AS (IPTV) selection process
By completing these processes, the process of subscribing to an AS (IPTV) is completed.

Upon completion of the AS (IPTV) subscription procedure, the home IMS gateway executes mapping so that the selected AS (IPTV) becomes a DLNA DMS, thereby making setting such that the DMP as a content playing device in the home network can interpret the selected AS (IPTV) as a DMS and receive content. That is, by using UPnP Device Proxy Manager and so forth shown in FIG. 6, the home IMS gateway generates an instance of UPnP Media Server corresponding to the selected AS (AS3 in the example), and records the instance in a memory.

Through the mapping process, the AS (IPTV) as an IMS application server existing outside the home network is dealt with similarly to a DMS (DLNA Media Server) similar to a content providing server in the home network, and it becomes possible to use the AS (IPTV) from a DMP (DLNA Media Player), which is a content playing device in the home network.

Hereinafter, with reference to FIGS. 9 and 10, a sequence of usage of AS (IPTV) content provided by a DMP, which is a content playing device in the home network, will be described.

Figure 9:
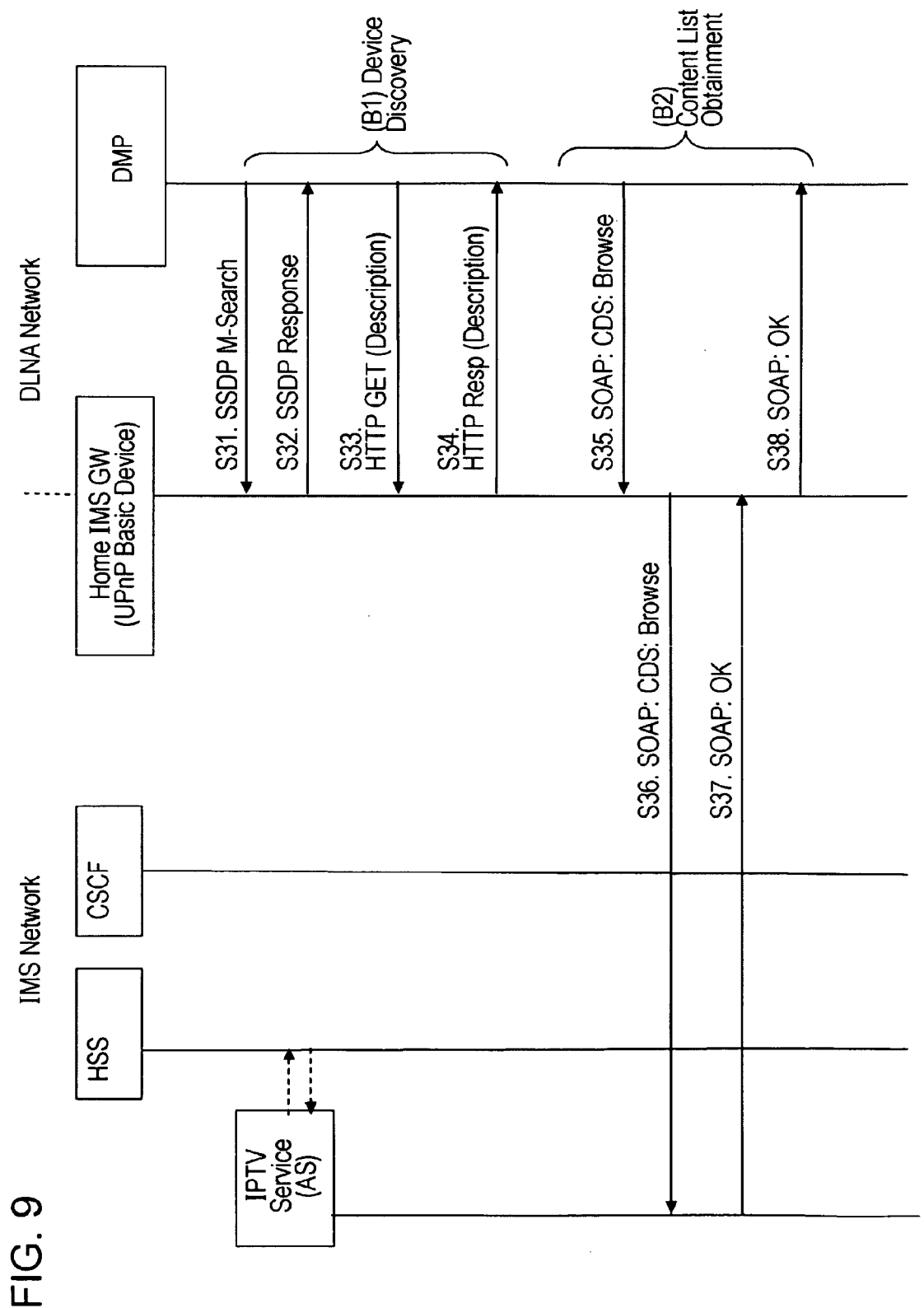
FIG. 9 is a diagram for explaining an example of a sequence of using content provided by an AS (IPTV).
Figure 10:
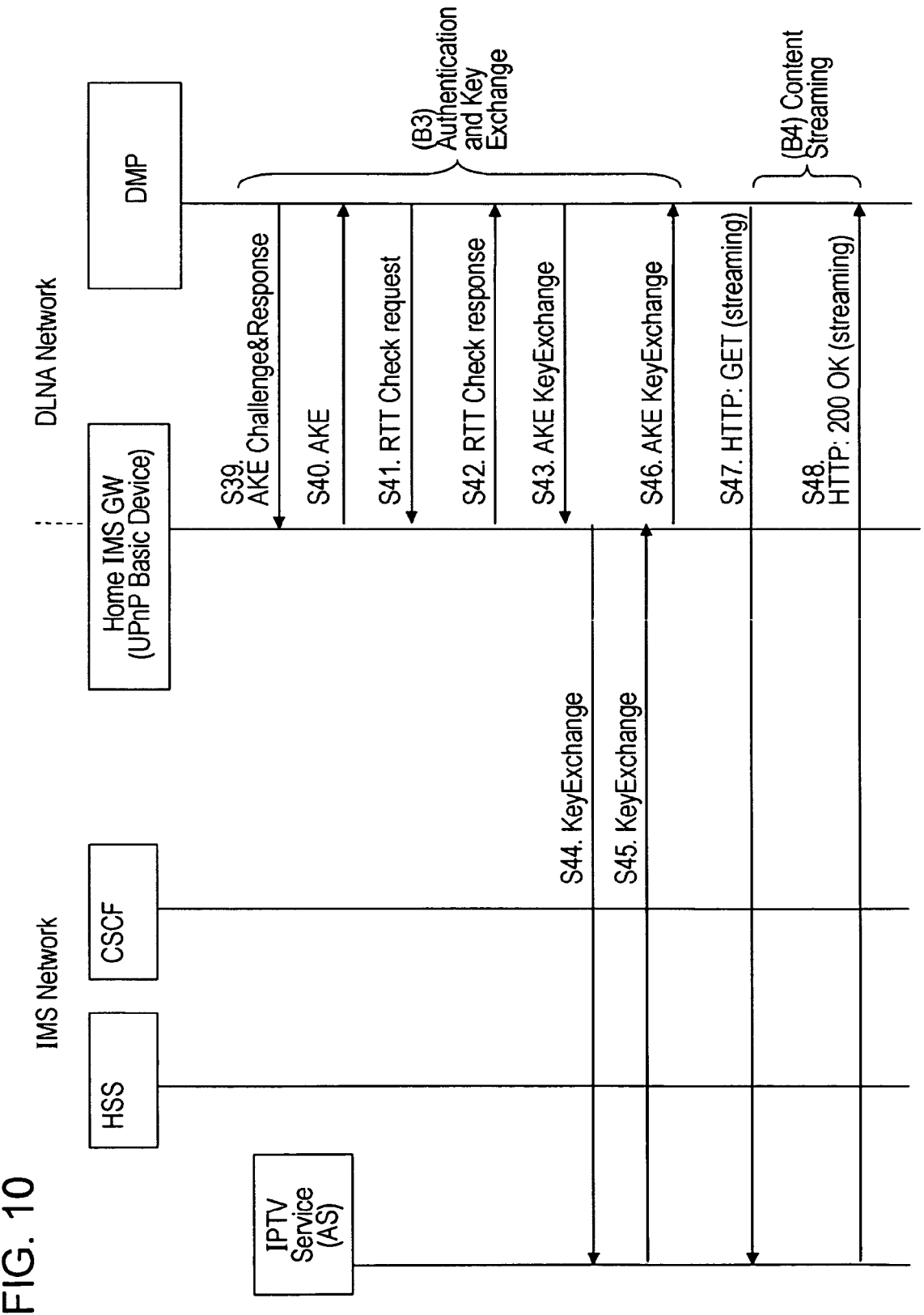
FIG. 10 is a diagram for explaining an example of a sequence of using content provided by an AS (IPTV).

FIGS. 9 and 10 show the following components from the left side:
(1) IPTV service (AS) (content providing entity)
(2) HSS having databases for management of user IDs used in IMS, management of profiles of services that each user subscribes to, management of authentication information, management of whether use of each IMS service is permitted or not, and management of user movement
(3) CSCF that controls user registration and session setting on the basis of SIP (Session Initiation Protocol) in an IMS network
(4) Home IMS gateway
(5) DMP (DLNA Media Player), which is a content playing device in a home network.

Note that (1) IPTV service (AS) is either an IPTV service alone or a combination of an IPTV service and an AS, and either mode is possible. Furthermore, [SSDP], [HTTP], [SOAP], and [AKE] shown in individual steps indicate protocols applied to individual communications.

The sequence of usage of AS (IPTV) provided content, shown in FIGS. 9 and 10, can be divided into the following four phases:

(B1) Device discovery process
(B2) Content list obtaining process
(B3) Authentication and key exchange process
(B4) Content streaming process Hereinafter, each of these processes will be described.

(B1) Device Discovery Process

The first process is the device discovery phase. By the AS subscription sequence described earlier with reference to FIGS. 7 and 8, the home IMS gateway has already mapped an AS (IPTV) as a DLNA DMS, and it has been made public to each device DLNA device in the home network that the AS (IPTV) can be used as a DLNA DMS. That is, all the DMPs connected to the home network, which are content playing devices, can obtain AS (IPTV) information as DMS from the home IMS gateway by the device discovery sequence defined in UPnP DA.

The device discovery sequence is a process of steps S31 to S34.

The DMP, which is a content playing device, discovers the AS (IPTV) set as a DMS, by the process according to the device discovery protocol defined in UPnP, i.e., by sending SSDP M-Search to the home IMS gateway in step S31 and receiving SSDP M-Response from the home IMS gateway as a response thereto in step S32. Steps S33 and S34 are steps of requesting and receiving specific device information.

Note that in the device discovery process, the home IMS gateway provides information based on the UPnP Media Server instance corresponding to the AS (IPTV), generated by the home IMS gateway in the mapping process, i.e., server information corresponding to the AS (IPTV), to the DMP, which is a content playing device. By receiving this information, the DMP interprets the AS (IPTV) as being a content providing server (DMS) in the home network.

(B2) Content List Obtaining Process

The second process is a process of obtaining a content list from the AS (IPTV) set as a DMS. As in the example already shown in the AS subscription sequence, it is assumed that the home IMS gateway has already established a session with the IMS network. In a case where a session is not established or is disconnected, a reconnection is performed using a request for obtaining content or the like as a trigger. By establishing a session with the IMS network, information of the AS for which subscription has been completed has already been obtained.

In step S35, the DMP issues a Browse action of UPnP Content Directory Service to the AS (IPTV) set as a DMS that has been discovered in the first phase. Upon receiving the Browse action from the DMP, in step S36, the home IMS gateway relays this request and transfers it to the IPTV (AS).

The IPTV (AS) interprets the content of the Browse action, generates a list of video content from a backend electronic program information storage server (EPG server) or the like, and sends a response to the DMP via the home IMS gateway (steps S37 and S38). For example, in a case where the content list has a hierarchy, a plurality of Browse actions are issued. Note that as defined in UPnP Content Directory Service, a content list is represented by an XML document called DIDL-Lite, conforming to XML Schema, and resource information (URI) of video data of each content indicates video content provided by a backend Video Server of AS.

Note that as described earlier, such setting is possible that the home IMS gateway does not execute the process of relaying a content list request from a DMP, and a content list request is issued directly from a client device (DMP) to an external server such as an AS (IPTV service). For this purpose, URLs specified by [controlURL] and [eventSubURL] of device information [Device Description] defined in UPnP Device Architecture are set to be a URL of an external server, not the home IMS gateway. By the home IMS gateway providing device information [Device Description] having such URL setting to a client device, an external server such as an AS (IPTV service) is set as a counterparty to which the client subsequently issues a content list request or various types of requests with reference to the device information.

(B3) Authentication and Key Exchange Process

The third phase is authentication and key exchange. In DLNA, in a case where copy-protected content is transmitted, the content is encrypted according to DTCP-IP and transmitted. Also in streaming from a video server of an AS (IPTV), encryption conforming to DTCP-IP is performed to send encrypted content.

A key applied to content encryption is generated by an authentication and key exchange (AKE) process according to definition of DTCP-IP. As shown in FIG. 6, the home IMS gateway has a function of DTCP-IP AKE Proxy, and at the time of content reception, a DMP, which is a content playing device, performs authentication and key exchange with the home IMS gateway having a DMS that the DMP recognizes as a content providing service entity.

The setting of a content resource URI set in a list obtained in the (B2) content list obtaining process is such that it includes an IP address of an AS video server. An address as a subject of the authentication and key exchange process needed to execute obtaining of content, i.e., the AKE process, is set to be the home IMS gateway. That is, the DMP performs authentication and key exchange with the home IMS gateway in which a DMS instance recognized as a content providing service entity is registered.

Note that although the subject of execution of authentication and key exchange at the DMP is often an entity that sends encrypted content, i.e., an IP address of an AS video server included in a content resource URI, in the configuration of the present invention, the subject of the AKE process executed by the DMP at the time of a request for obtaining content included in the content list provided to the DMP in the (B2) content list obtaining process is set to be the home IMS gateway.

This becomes possible, for example, by including, in metadata associated with content, metadata with which setting is such that the subject of AKE is the home IMS gateway. The configuration may be such that the setting of content list that the home IMS gateway receives from the IPTV service (AS) is a list set in advance as described above or such that metadata is added or changed at the home IMS gateway. Alternatively, the configuration may be such that at the time when the home IMS gateway provides a content list to the DMP, a notification that the subject of AKE is the home IMS gateway is executed.

The authentication and key exchange process is executed according to an authentication and key exchange (AKE) process sequence defined in DTCP-IP.

In the configuration of the present invention, through the processes of steps S39 to S46 shown in FIG. 10, i.e.;

S39: AKE Challenge&Response
S40: AKE
S41: RTT (Round Trip Time) Check request
S42: RTT Check response
S43: AKE Key Exchange
S44: Key Exchange
S45: Key EXchange
S46: AKE Key Exchange the authentication and key exchange between the DMP and the home IMS gateway are completed.

In the course of the authentication and key exchange process, in order to confirm that the home IMS gateway, which is the subject of AKE, is in the proximity of the DMP, confirmation of TTL (Time To Live) of an IP packet and confirmation of a response time are executed as RTT measurement in steps S41 and S42.

Furthermore, steps S44 and S45 are processes that are characteristic of the configuration of the present invention, and these are processes of passing a key shared between the home IMS gateway and the DMP in the AKE sequence to the IPTV service (AS) so that the key applied as an encryption key is shared between the IPTV service (AS) as a content providing entity and the DMP as a content using entity. By adding the processes of steps S44 and S45, the IPTV service (AS) as a content providing entity and the DMP as a content using entity can share the encryption key. Here, the IPTV service (AS) is a legitimate service that is allowed to share the key, and steps S44 and S45 are performed by secure communication.

(B4) Content Streaming Process

The last, fourth phase is a content streaming process. In step S47, the DMP, which is a content playing device, applies a resource URL obtained in the preceding (B2) content list obtaining process, and issues a content request based on HTTP GET to request HTTP streaming.

The video server of the IPTV service (AS) encrypts content data using the key shared with the DMP in the preceding AKE phase, and in step S48, starts streaming transmission of content to the DMP, which is a DLNA device in the home network.

The DMP, which is a content playing device in the home network, decrypts the data received from the IPTV service (AS) by applying the encryption key shared with the IPTV service (AS) in the preceding AKE phase to decode the data, and thereby executes content playing.

(B3) Authentication and Key Exchange Process (B4) Content Streaming Process

The process configuration of the present invention is a process conforming to streaming playing by DTCP-IP defined in DLNA, except in that in the third and fourth phases, an IP address used by the AKE module is applied is set to be the home IMS gateway, which is an entity different from the server as a content providing entity.

Figure 11:
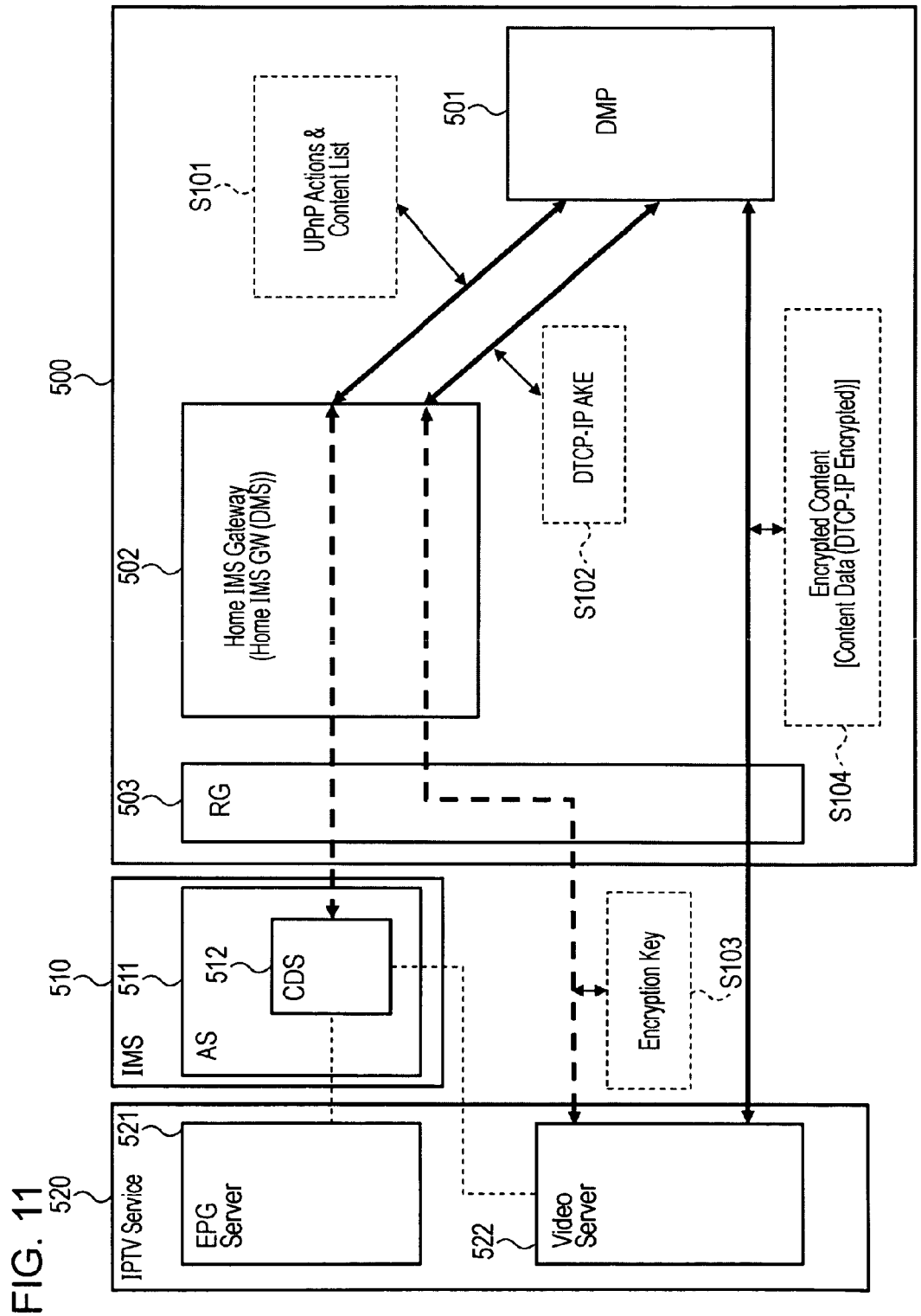
FIG. 11 is a diagram for explaining an overview of data communication in a content using process.

An overview of data communication in the content using process described with reference to FIGS. 9 and 10 will be described with reference to FIG. 11. In FIG. 11, as devices in a home network 500, a DMP 501 as a content playing device, a home IMS gateway 502, and a residential gateway (RG) 503 are shown. Furthermore, as a configuration outside the home network 500, an IP multimedia subsystem (IMS) 510 and an IPTV service 520 are shown.

As described earlier with reference to FIG. 3, the IP multimedia subsystem (IMS) 510 is the base of wireless communication infrastructure for cellular phones, which is being developed by 3GPP (3rd Generation Partnership Project), which is a project for standardizing 3rd generation mobile communication systems. With a functional element called CSCF (Call Session Control Function) as a core, it is configured by functional components such as a home subscriber subsystem (HSS) and an application server (AS). FIG. 11 shows an application server (AS) 511. The application server (AS) 511 includes a CDS (Content Directory Service) 512 as a directory service executing section that performs processes such as registration of a function of a service providing server.

The IPTV service 520 has an EPG server 521, which is a server that provides EPG (Electronic Program Guide), which is a program information guide such as a content list, and a video server 522, which is a server that provides video content, and it implements a content list providing service and a content providing service to the DMP 501, which is a user terminal, by cooperation between the respective servers and the CDS 512 of the AS (IPTV) 511.

A basic process flow in a case where the DMP 501, which is a content playing device in the home network 500, obtains content from the IPTV service 520 outside the home network will be described. Through the AS subscription sequence described earlier with reference to FIGS. 7 and 8, the home IMS gateway 502 has already mapped the IPTV service (AS) as a DLNA DMS.

First, in step S101, the DMP 501 executes device discovery as a UPnP action to obtain information of an AS (IPTV) set as a DMS from the home IMS gateway 502. In the device discovery process, the home IMS gateway 502 provides the DMP 501, which is a content playing device, with information based on a UPnP Media Server instance corresponding to the AS (IPTV), generated by the home IMS gateway 502 in the mapping process. By receiving this information, the DMP 501 interprets the AS (IPTV) as being a content providing server (DMS) in the home network.

Furthermore, the DMP 501 issues a Browse action of Content Directory Service of UPnP to the AS (IPTV) set as a DMS. Upon receiving the Browse action from the DMP 501, the home IMS gateway 502 relays the request to the AS 511 (CDS 512). The AS 511 (CDS 512) obtains a list of video content provided by the EPG server 521 of the IPTV service 520, and the home IMS gateway 502 sends a content list to the DMP 501 as a response.

Note that as described earlier, in the content list, as metadata, a content URL applied to obtaining of content, and subject device information of the authentication and key exchange (AKE) process executed as a presupposition of content obtaining are recorded, and the subject device information of the key exchange process (AKE) is set to be the home IMS gateway 502. Alternatively, the setting may be such that, without using content metadata, the home IMS gateway 502 notifies the DMP 501 that the subject device of the key exchange (AKE) process is the home IMS gateway 502.

Prior to receiving content, in step S102, the DMP 501 executes the authentication and key exchange (AKE) process according to the definition of DTCP-IP. The DMP executes the process considering the home IMS gateway 502 as a subject of execution of authentication and key exchange. Note, however, that in the authentication and key exchange (AKE) process, in step S103, the home IMS gateway 502 provides the key applied as a content encryption key to the video server 522 of the IPTV service 520 as a content providing entity. By this process, at the time of completion of the authentication and key exchange (AKE) process, the video server 522 of the IPTV service 520 as a content providing entity and the DMP as a content using entity share the key.

Then, in step S104, the DMP 501, which is a content playing device, issues a content request based on HTTP GET by applying a resource URL obtained in the content list obtaining process, thereby requesting HTTP streaming to the video server 522. The video server 522 of the IPTV service 520 encrypts content data by applying the key shared with the DMP 501 in the preceding AKE phase, and sends it to the DMP 501. The DMP 501 executes a decrypting process on the data received from the IPTV service 520 by applying the shared encryption key, and executes content playing.

As described above, with the configuration of the present invention, it becomes possible for the DMP as a content playing apparatus in the home network to receive content from a content providing server outside the home network and to play the content.

In order to enable this process, the home IMS gateway provided in the home network executes a process of executing communication with the content providing server, mapping the content providing server as a virtual home network device, i.e., generating an instance in which server information of the external server is recorded and storing the instance in a storage unit, and in response to reception of a device discovery request according to the UPnP definition from the content playing apparatus in the home network, providing server information corresponding to the content providing server based on the instance to the content playing device as information of from which the service can be received.

Furthermore, in a case where a content obtaining request from the content playing apparatus, i.e., a request for obtaining content provided by the content providing server, is received, the home IMS gateway transfers this request to the content providing server so that the content providing server sends the content to the content playing apparatus, thereby enabling reception and playing of content at the content playing apparatus.

Furthermore, since the configuration is such that, regarding the authentication and key exchange demanded to be executed as a content sending condition defined in DLNA, the process (AKE) as defined is executed between the content playing apparatus and the home IMS gateway, and the home IMS gateway sends the generated key to the content providing server, it becomes possible for the content providing server and the content playing apparatus to share the key generated in the authentication and key exchange process. Similarly to the content sending process executed by the DMS in the home network, content on which encryption has been performed is sent from the content providing server to the content playing apparatus, so that secure content transmission and reception is achieved.

Note that this content transmission method can also be applied to Home to Home content transmission. Instead of the video server 522 of the IPTV service 520 in FIG. 11, by causing a home server of another home to provide a similar service, it is possible to transmit content of that home. In such non-commercial content transmission, there are cases where transmission is performed without performing encryption.

Hereinabove, an embodiment regarding a home IMS gateway for causing a DMP, which is a content playing device conforming to the DLNA guideline shown in FIG. 4, to receive an IPTV service has been described. As described earlier with reference to FIG. 4, in the DMS, which is a content providing server defined in DLNA, a UPnP media server is implemented, and on the UPnP Media Server, a main Content Directory Service is implemented, so that it is made possible to obtain a content list and metadata by applying it. That is, by using the Content Directory Service, the DMP, which is a content playing device defined in DLNA, obtains a content list streamed by the DMS, which is a content providing server defined in DLNA. The embodiment described with reference to FIG. 9 is an embodiment in which the content list obtaining process by the UPnP Content Directory Service is executed by applying SOAP and GENA message communication defined in UPnP DA. Next, an example of a process in which a scheme of Presentation defined in UPnP DA is used will be described.

[Example of a Process in which a Scheme of Presentation Defined in UPnP DA is Used]

The embodiment described below is an embodiment in which the home IMS gateway 212 shown in FIG. 3, which is an information processing apparatus of the present invention, becomes an HTTP server, and connects to UPnP Control Point having an HTML browser thereon by using a scheme of Presentation defined in UPnP DA, and the user selects a desired IPTV service from an HTML screen displayed using a browser function and receives the service.

That is, it is an example of a process in which by applying the scheme of Presentation defined in UPnP DA described earlier, a process of providing HTML data describing a service screen including, for example, a content list, content information, and so forth, from the home IMS gateway 212 to a DMP, which is a content playing device, for example, the TV (DMP) 213 shown in FIG. 3, is executed, the service screen formed of the HTML data is displayed on a display on the side of the DMP, which is a content playing device, the user selects content on the basis of the display data, and receives the IPTV service. That is, for example, by using a PC or TV having a browser function, set as a DLNA device in the home network, a list owned by the home IMS gateway 212 is presented on the display, and an IPTV service is selected to receive the service.

In this embodiment, on the content playing device, i.e., for example, the TV (DMP) 213 shown in FIG. 3, an HTML browser for implementing the Presentation function defined in UPnP DA is implemented. In this embodiment, although the UPnP Content Directory service is not used, for the streaming playing function, the content playing device is implemented on the basis of the DLNA media transfer definition and the DTCP-IP content protection definition.

The sequence of using content provided by an AS (IPTV) is divided into the following four phases.

(B1) Device discovery process
(B2a) Service screen obtainment
(B3) Authentication and key exchange process
(B4) Content streaming process Among the above phases, the processes in the individual phases (B1), (B3), and (B4) are the same as the processes described earlier with reference to FIGS. 9 and 10 in the embodiment. In the processes described with reference to FIGS. 9 and 10, the (B2) content list obtaining process in steps S35 to S38 described with reference to FIG. 9 is executed. In this embodiment, in which the scheme of Presentation defined in UPnP DA is used, the (B2a) service screen-obtaining process is executed instead of the (B2) content list obtaining process.

Figure 12:
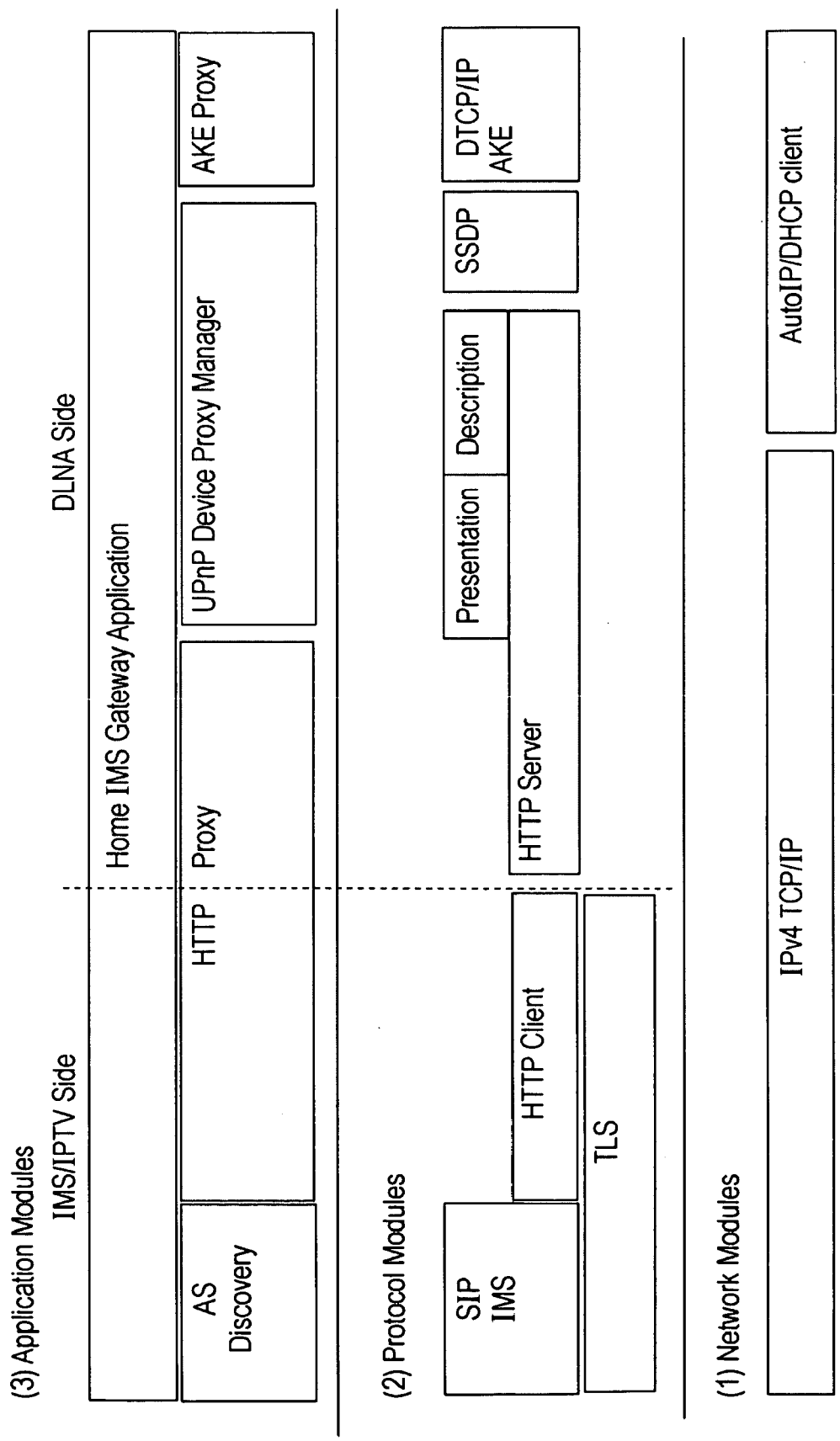
FIG. 12 is a diagram for explaining an example configuration of software modules of a home IMS gateway.

FIG. 12 shows an example configuration of software modules of the home IMS gateway 212 for executing the (B2a) service screen obtaining process. In this embodiment of service screen operating method, in order to obtain a service screen by using the function of an HTML browser, the SOAP and GENA software modules described with reference to FIG. 6 are not implemented, and furthermore, instead of the UPnP Message Proxy described with reference to FIG. 6, an HTTP Proxy that relays HTML data between an HTTP server and an HTTP client is implemented.

With reference to the sequence diagram shown in FIG. 13, (B1) Device discovery process
(B2a) Service screen obtaining process these sequences in this embodiment will be described.

The (B1) device discovery process is similar to the process described earlier with reference to FIG. 9. The DMP (e.g., the TV (DMP) 213 shown in FIG. 3), which is a content playing apparatus, executes the device discovery process by processing steps S31 to S34 according to the device discovery protocol defined in UPnP. By this process, the DMP as a content playing device discovers a content providing server (DMS) implemented on the home IMS gateway, and obtains a Presentation URL for obtaining HTML data provided by an HTTP server implemented on the DMS, by Device Description of the DMS according to the definition of UPnP DA.

In the (B2a) service screen obtaining process executed next, first, in step S201, the DMP as a content playing device sends an HTTP:GET request to the HTTP server of the DMS by using the Presentation URL obtained in the (B1) device discovery process.

In step S202, the HTTP Proxy implemented on the home IMS gateway transmits the HTTP:GET request received by the HTTP server from the DMP as a content playing device to the application server (AS) of the IPTV service.

The application server (AS) of the IPTV service generates, as HTML (HyperText Markup Language) data, a service screen including a content list by using content information obtained from the EPG server, and in step S203, it returns the HTML data representing the service screen to the home IMS gateway as an HTTP:OK response.

In step S204, the home IMS gateway transfers the response including the HTML data, received from the application server (AS) of the IPTV service, to the DMP as a content playing device by the HTTP Proxy.

The DMP as a content playing device generates and presents to the user a service screen formed of a content list and so forth by executing a drawing process in which an HTML browser is applied to the HTML data transferred via the home IMS gateway and sent by the application server (AS) of the IPTV service. The service screen includes a content list of the IPTV service, and the user selects content to be played from the content list.

The content selection process is executed as, for example, a process of selecting a content list displayed on the screen by a remote controller, switch, keyboard, or a pointer such as a mouse. By the content selection process, a resource URL of content included in the HTML data is identified. By using the URL corresponding to the selected content, the subsequent processes, i.e.:

(B3) Authentication and key exchange process
(B4) Content streaming process these processes described earlier with reference to FIG. 10 are executed. By these processes, the DMP as a content playing device performs content playing. That is, the client apparatus inputs content selection information of the user regarding the content list included in the service screen, and on the basis of the content selection information, the client apparatus identifies a URL corresponding to the selected content, i.e., a resource URL of content included in the HTML data, and executes an authentication and key exchange process and a content streaming process based on the URL.

Figure 13:
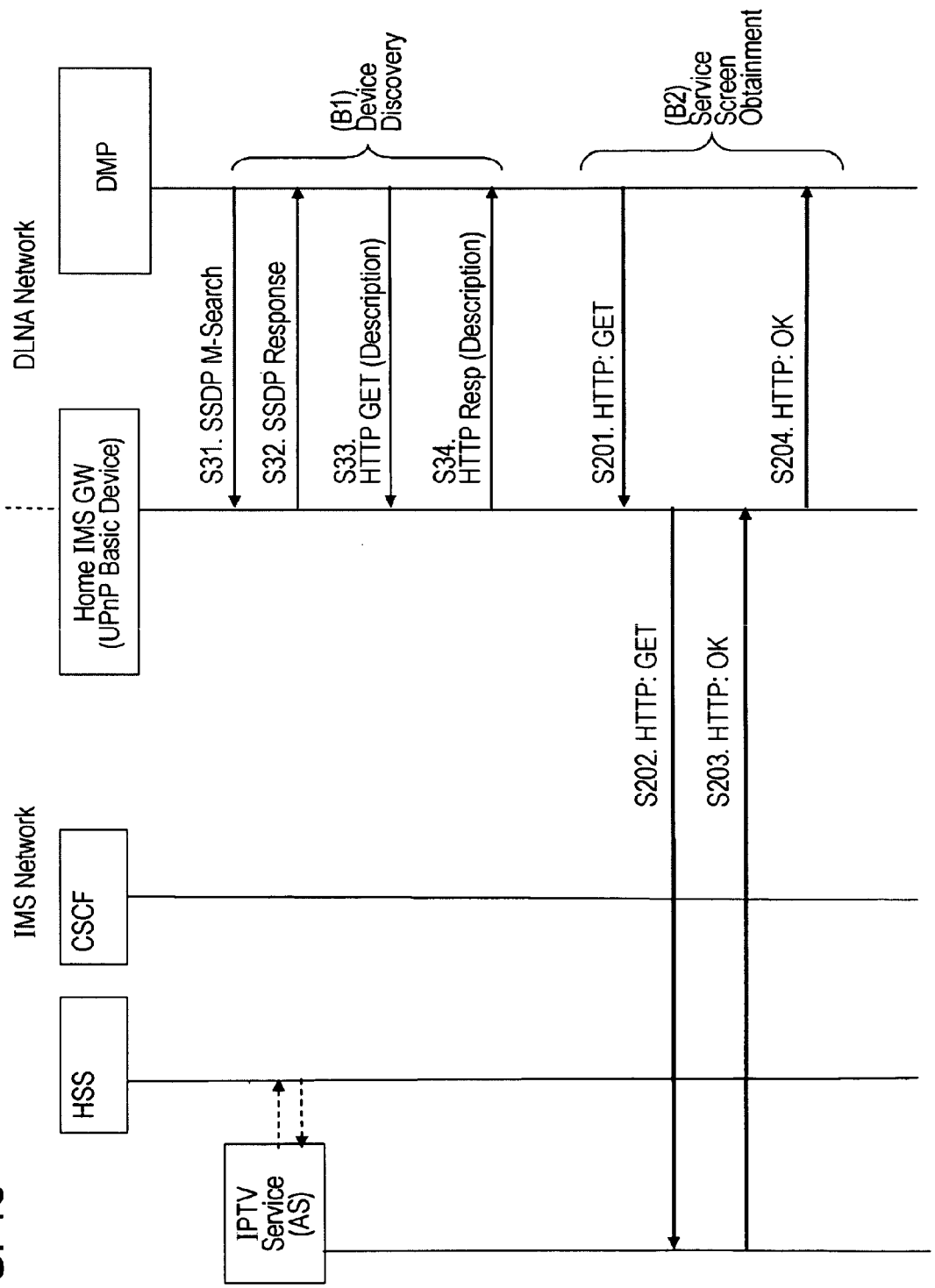
FIG. 13 is a diagram for explaining an example of a sequence of using content provided by an AS (IPTV).

Note that although the service screen obtaining process executed in steps S201 to S204 is a one-time process in the sequence diagram shown in FIG. 13, the service screen can take on a structural menu configuration represented by a plurality of items of HTML data, and it becomes possible to execute reobtaining of the service screen on the basis of user's operation of an HTML browser. That is, the configuration can be such that a process equivalent to the process of steps S201 to S204 is repeatedly executed. It is possible to provide various service screens from an AS of an IPTV service to a DMP, and the user on the DMP side can select arbitrary content from content lists presented on various service screens.

Furthermore, in a case where a content providing process provided by an IPTV service is a video on demand service, or in a case where confirmation of charging on user's purchase of a content viewing right is executed, HTML data representing a confirmation screen is transmitted from an AS of an IPTV service to the DMP via the home IMS gateway.

The user can operate the service screen displayed on a display of the DMP and receive services provided by various IPTV services while executing interactive processes.

Figure 14:
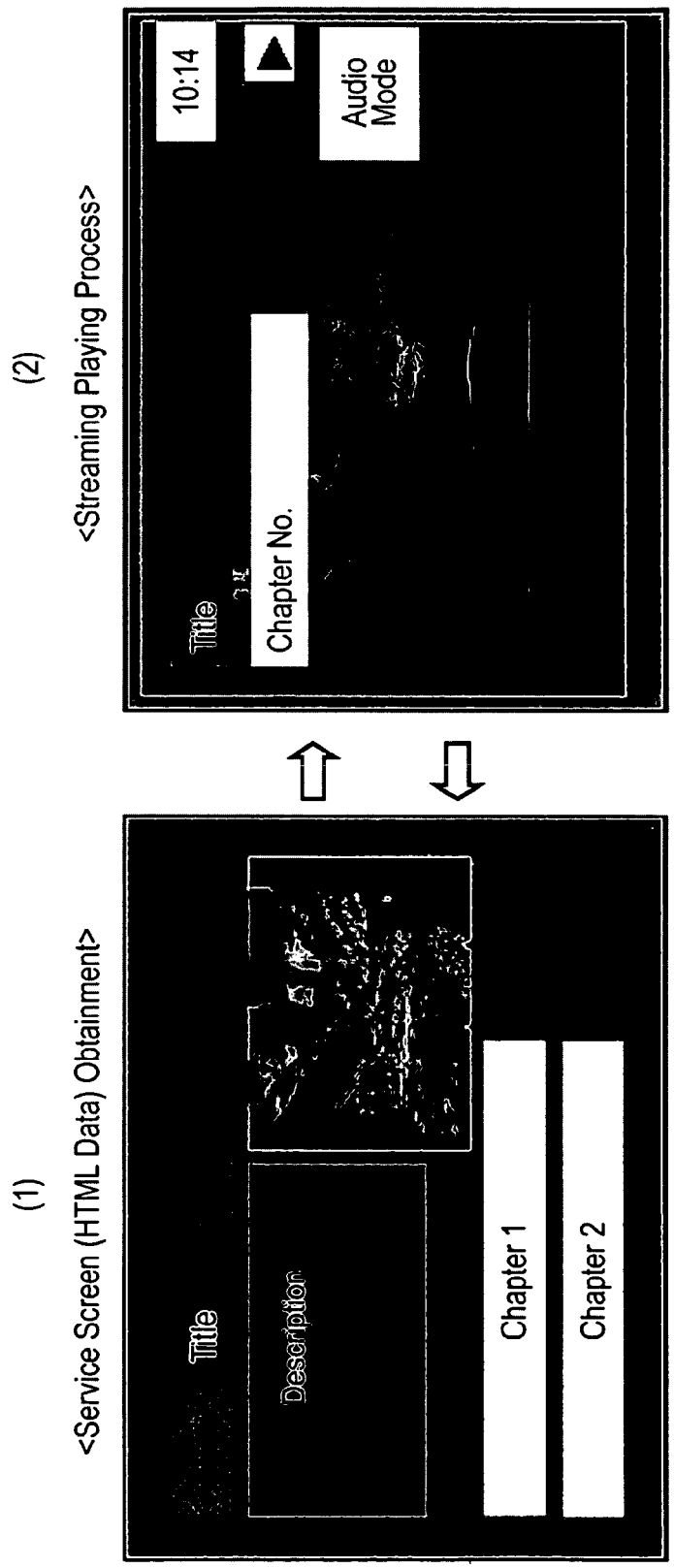
FIG. 14 is a diagram showing an example of a service screen provided by an AS (IPTV) and a screen display on occasion of a streaming playing process.

FIG. 14 shows an example of a service screen and a streaming playing screen provided from an AS of an IPTV service to a DMP and displayed on a display of the DMP.

FIG. 14 (1) is an example of a service screen displayed on the display of the DMP in the (B2) service screen obtaining process in steps S201 to S204 described in the sequence diagram of FIG. 13.

FIG. 14 (2) is an example of a screen displayed on the display of the DMP at the time of the subsequent content streaming process. That is, it is an example of a screen displayed on a content playing apparatus in a case where the (B4) content streaming process described with reference to FIG. 10 is being executed.

Note that the two screens shown in FIG. 14, i.e.;
(1) Service screen
(2) Content streaming screen can be switched by user's operations at appropriate timing, and the service screen presenting and content streaming processes can be executed repeatedly.

Note that although the embodiment described here has been described as an example of a process in which the scheme of Presentation defined in UPnP DA is used, for example, a similar process can be also executed in a configuration in which the scheme of an HTML Browser defined in the CEA-2014 standard is used.

The CEA-2014 standard will be described briefly. The CEA-2014 standard is a standard of Web-based protocols and frameworks, and it is a standard for remote user interfaces that use UPnP networks and the Internet. The CEA-2014 standard is a standard that defines a mechanism needed for providing a user interface under the control of a remote device connected via, for example, a network or the like. The basic process of the device that provides the user interface is a process conforming to the UPnP Device Architecture (v1.0), which is a definition regarding UPnP networks and home UPnP. The CEA-2014 standard allows a remote display process of a user interface provided to a home UPnP device by an Internet service of a third party, and defines various UI functions used in TV, mobile phones, and portable devices. Note that the CEA-2014 standard is configured as a standard including definitions corresponding to specific specifications of CEA-2027-A, which is a UI standard of home networks.

In a device on which an HTML Browser defined in the CEA-2014 standard is implemented, by obtaining a service screen using the HTML Browser, a process similar to the process described with reference to FIG. 13 is achieved. Note that in this case, the UPnP Device class of the home IMS gateway becomes a remote UI server, and HTML data according to an HTML browser profile defined in CEA-2014 is used.

[2. Description of Functions Applied to an IPTV Service]

Hereinabove, description has been given regarding a configuration that allows viewing of content provided by an external server outside a home network, such as an IPTV service, by using an existing DLNA device in an open Internet connection environment that does not depend on infrastructure such as an access line or a gateway to the Internet. Hereinafter, functions used for receiving an IPTV service from an external server by a device in a home network will be described regarding the individual items listed below:

2-A. Functions of IPTV service receiving client
2-B. Functions of IMS (IP Multimedia Subsystem)
2-C. Functions used in network configuration

[2-A. Functions of IPTV Service Receiving Client]

First, functions of an IPTV service receiving client will be described. As described earlier with reference to FIG. 3, in the home network 210, the following devices exist:

Residential gateway (RG) 211, which is a network connecting device for connecting a device in a home network to the IP broadband network 221, and which is used as a bridge;

Home IMS gateway 212 that executes a process for allowing a device in the home network 210 (e.g., a content playing device such as the TV (DMP) 213) to use a service provided by a server outside the home network; and Digital media player (DMP) TV 213, which is a client device that receives and plays content.

These devices may be configured either as physically separate individual apparatuses or as a single apparatus.

That is, various settings are possible regarding the device configuration of the home network 210. However, in such various device configurations, it is necessary that functions needed to receive an IPTV service are provided in one of the apparatuses.

A single information processing apparatus or a combination of a plurality of information processing apparatuses as a client connected in a home network basically includes a communication unit that executes a communication process via a home network, and a data processing unit that executes a process of receiving a content providing service provided by an external server existing outside the home network, by using mapping information in which the external server is set as a virtual home network device. Hereinafter, functions that are needed or effective for the information processing apparatus connected in the home network to receive an IPTV service, i.e., functions of an IPTV service receiving client, will be described.

The function needed for the IPTV service receiving client to receive an IPTV service is an IPTV terminal function. The IPTV terminal function is a function needed at a logical end point of the IPTV service. For example, in the example configuration shown in FIG. 3, each of the RG 211, the home IMS gateway 212, and the TV (DMP) 213 executes a part of the IPTV terminal function. By each of these devices executing a part of the IPTV terminal function according to their individual roles, it becomes possible to receive a service provided from an external server and to present it at a device in the home network, for example, the TV (DMP) 213 shown in FIG. 3. Note that although not shown in FIG. 3, furthermore, a process of providing a service from the external server to another home network device, and maintaining, printing, displaying, or the like is implemented.

Figure 15:
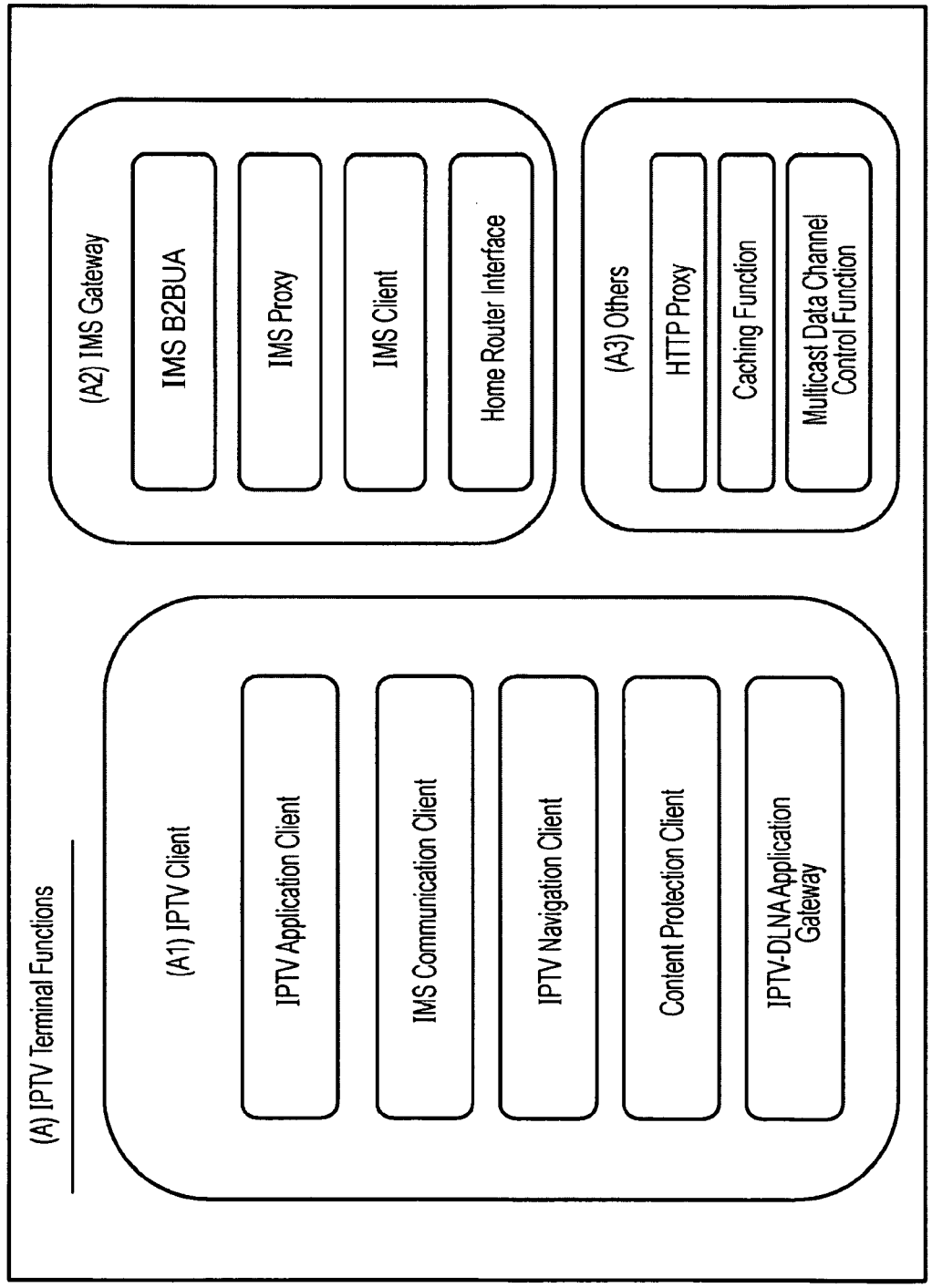
FIG. 15 is a diagram for explaining components of an IPTV terminal function, which is a function needed for receiving an IPTV service.

FIG. 15 shows constituent elements of the IPTV terminal function, which is a function needed for receiving an IPTV service. As shown in FIG. 15, (A1) IPTV client
(A2) IMS gateway
(A3) Others the IPTV terminal function can be divided into these individual components. Hereinafter, functional elements included in these components will be described.

(A1) IPTV Client

An IPTV client is a component that serves to receive an IPTV service reliably at an IPTV device, for example, the TV (DMP) 213 shown in FIG. 3. As shown in FIG. 15, IPTV application client
IMS communication client
IPTV navigation client
Content protection client
IPTV-DLNA application gateway the IPTV client includes these subcomponents as functional elements. These functional elements (subcomponents) will be described below.

The IPTV application client is a component that receives a media signal and sends it to a display system. For example, the IPTV application client receives a command from a user via a remote controller or the like, and executes a process according to the command. Specifically, for example, the IPTV application client performs display of an EPG (Electronic Program Guide), or a channel specification or changing process using the EPG, and so forth.

The IMS communication client is a set of IMS applications used for distributing message information such as messages or video data, and other service information based on IMS, not related to IPTV, and so forth.

The IPTV navigation client is used to download an EPG (Electronic Program Guide), a content list corresponding to VoD (Video on Demand), and other metadata, and to display these using a special GUI for content selection.

The IPTV navigation client executes a process such as integrating other metadata from sources such as a broadcast TV or a DLNA home network.

The content protection client executes protection of content provided by an IPTV service, for example, an encryption process for protecting the copyright of a content owner, a process of managing an encryption key, and so forth.

The IPTV-DLNA application gateway executes a process of, for example, receiving a medium and an EPG (Electronic Program Guide) from an IPTV client, converting it into a format usable at a DLNA device, and sending an EPG (Electronic Program Guide) or the like via a network, and so forth.

The IPTV-DLNA application gateway acts as an SIP (Session Initiation Protocol) client, and executes a registration process for other home devices connected to the home network. For example, it executes registration of family members or devices.

(A2) IMS Gateway

Next, functional components of the (A2) IMS gateway shown in FIG. 15 will be described. In the configuration shown in FIG. 3, this corresponds to functions of the home IMS gateway 212. The home IMS gateway 212 is a component that connects a device in a home network to an IMS network. It executes conversion among various signal protocols as needed to execute relaying of messages between devices in the home network and apparatuses outside the home network.

As shown in the figure,
IMS B2BUA
IMS proxy
IMS client
GBA client
Home router interface the home IMS gateway includes these functional elements (subcomponents). These functional elements (subcomponents) will be described below.

The IMS B2BUA functions as an inter-working unit between a pure SIP client and an IMS system, and it executes processes such as conversion between SIP messages and IMS messages and message transfer.

The IMS proxy simply sends a message without performing message conversion like B2BUA, and executes a process of determining a route, a process of mapping between an IP address (local and global) and a port number, and so forth.

The IMS client executes a client registration process (IMS registration process) by applying identification information or the like of a client. Furthermore, it performs support for processes such as an authentication process and IPSec security connection setting with CSCF.

The home router interface function provides routing functions, such as providing a NAT function. For example, it obtains a P-CSCF address by an SIP server DHCP option [DHCP-SIP] or by DNS lookup based on an SRV record, and executes a process of opening and closing a port for control signals defined in UPnP and a port for unicast media stream, and so forth.

(A3) Others

The IPTV terminal function includes, (A1) IPTV client (A2) IMS gateway in addition to these components described above, as functional elements (subcomponents) of (A3) Others shown in FIG. 15, HTTP proxy Caching function Multicast data channel control function These functional elements (subcomponents) will be described below.

The HTTP proxy is an intermediary program that executes a process according to protocol definition of [HTTP] to act both as a server and a client for the purpose of issuing a request on behalf of another client (HTTP client). For example, the HTTP proxy can interrupt into HTTP GET sent to the outside, and cache and use requested data that can be referred to by a URI. Furthermore, the HTTP proxy acts as an HTTP client, and executes requested data searching based on a URI, and so forth.

The caching function is used to cache data received by the client by unicast download or multicast. The caching function executes a caching process of temporarily recording data such as Web pages (EPG and other IPTV menu), images, and metadata.

For example, the caching function is used to minimize interaction wait time of the user, to minimize the amount of unicast download from an IPTV application and control function, and so forth. In a case where direct access by the client is allowed and the IPTV client and the caching function are physically remote within the same network, for example, the caching function can issue a notification from the caching function to the IPTV client using the GENA protocol according to definition of DLNA regarding an event such as occurrence of new cache data.

The multicast data channel (MDC) control function is a function that performs intermediation between the caching function and applications installed on the client, and it includes a multicast data channel (MDC) inserting function. The MDC inserting function receives a content request to MDC from various applications, and distributes content by multicasting on a multicast channel.

The multicast data channel (MDC) control function identifies requests from various applications by tags. For example, it becomes possible for a browser executed on the client side to obtain EPG by issuing a request with specification of an EPG page tag. The MDC control function filters reception MDC, and sends MDC objects together with applied tags to individual applications.

Note that the multicast data channel (MDC) control function includes an MDC proxy, and in a case where the MDC proxy has registered a specific number of requests regarding certain objects such as EPG pages, it can request the MDC control function to include the EPG page in the MDC. That is, it is possible to distribute the same data to a plurality of clients by multicast, and it becomes possible to exclude the necessity of a data request by a unicast channel from each client, so that processing becomes efficient.

[2-B. Functions of IMS (IP Multimedia Subsystem)]

Next, functions of an IMS (IP Multimedia Subsystem) used for receiving an IPTV service from an external server by a device in a home network will be described. That is, the functions are functions of the IMS network 230 shown in FIG. 3.

As described earlier, IMS is based on IP technologies, and is highly compatible with Internet infrastructure of fixed communication systems. IMS is constituted by functional elements such as a home subscriber subsystem (HSS) and an application server (AS), with a functional element called CSCF (Call Session Control Function) as a core, the CSCF being based on SIP (Session Initiation Protocol) defined in RFC-3261 of the IETF (The Internet Engineering Task Force).

The IMS network 230 shown in FIG. 3 includes the CSCF 231, the HSS 232, and the AS (IPTV) 233 as these functional elements, and it provides a service to the cellular phone 260 via the mobile phone network 240.

The CSCF 231 performs user registration and session setting control based on the SIP (Session Initiation Protocol). Furthermore, according to setting of a user profile registered in the HSS 232, it executes activation of service processes needed. The HSS 232 has a database for management of user IDs used in the IMS, management of profiles of services that each user subscribes to, management of authentication information, management of whether use of each IMS service is allowed, and management of user movement. The AS 233 is a server that executes processes of individual services. The AS 233 is activated by the CSCF 231 in accordance with the status of service subscription of each user and provides services to the user.

As described above, in the IMS, for example, a user with a registered user ID accesses the CSCF 231 by using a client apparatus to perform registration of the terminal (client) and control of setting of a session, services needed are activated according to setting of a user profile registered in the HSS 232, and the AS 233 actually executes processes of individual services.

In an IPTV viewing service, an AS of the IPTV service set in the IMS network 230 is used. The AS (IPTV) 233 shown in FIG. 3 corresponds to the AS that executes the IPTV service. The AS (IPTV) 233 actually executes services for the user terminal in cooperation with the IPTV service 250 as an entity that executes the IPTV service, i.e., as an entity that provides content.

The IPTV service 250 includes the EPG server 251, which is a server that provides an EPG [Electronic Program Guide], which is a program information guide such as a content list, and the video server 252, which is a server that provides AV content. A content list providing service and a content providing service for the user terminal are implemented by cooperation between the respective servers and the AS (IPTV) 233 of the IMS network 230.

As described with reference to FIG. 3, main parts of the functions of the IMS (IP Multimedia Subsystem) include the CSCF (Call Session Control Function) 231, the home subscriber subsystem (HSS) 232, and the application server (AS) 233. The CSCF 231 performs user registration and session setting control based on SIP (Session Initiation Protocol), and executes activation of service processes that are needed according to setting of a user profile registered in the HSS 232. The HSS 232 has a database for management of user IDs used in the IMS, management of profiles of services that each user subscribes to, management of authentication information, management of whether use of each IMS service is allowed, and management of user movement. The AS (IPTV) 233 executes services for the user terminal in cooperation with the IPTV service 250 as an entity that executes the IPTV service, i.e., as an entity that provides content.

Figure 16:
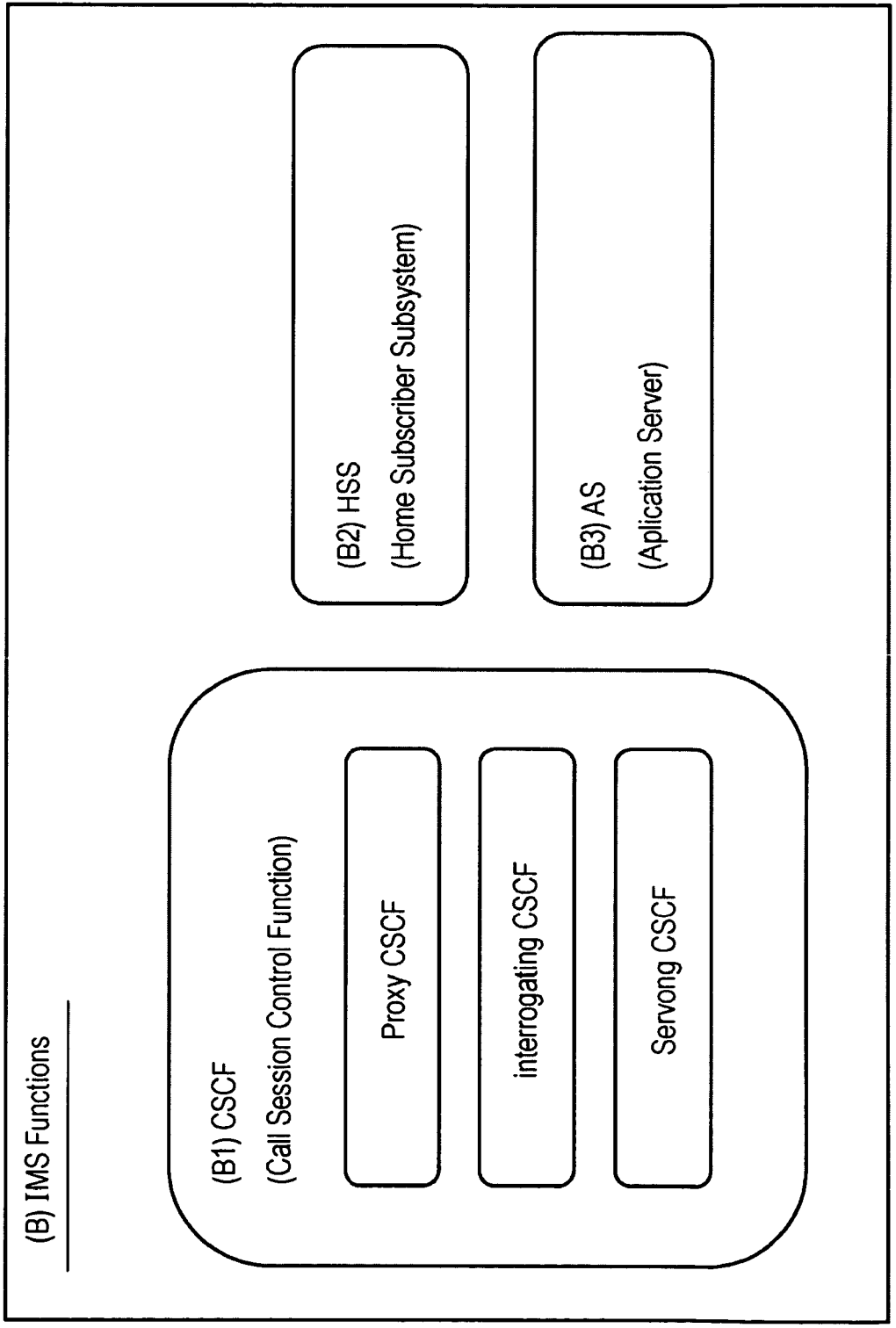
FIG. 16 is a diagram for explaining CSCF, HSS, and AS, which are main functions of an IMS (IP Multimedia Subsystem).

FIG. 16 is a diagram showing the main functions of the IMS (IP Multimedia Subsystem):

(B1) CSCF (B2) HSS (B3) AS

The functions of these (B1) CSCF, (B2) HSS, and (B3) AS will be described below individually.

(B1. CSCF)

As shown in FIG. 16, CSCF (Call Session Control Function) are divided into three logical entities, i.e., Proxy CSCF, Interrogating CSCF, and Serving CSCF.

The Proxy CSCF serves as, for example, a client as an IMS terminal in a home network, for example, the first point of entry to an external network from the home IMS gateway 212 shown in FIG. 3. The Proxy CSCF uses a key obtained from the Serving CSCF in order to establish an IPSec security relationship with a client as an IMS-terminal in the home network, for example, the home IMS gateway 212 shown in FIG. 3.

Regarding each SIP message protected by IPSec communication coming from a terminal, for example, the home IMS gateway 212 shown in FIG. 3, the Proxy CSCF verifies integrity and decodes the SIP message. For example, in a case where the message is encrypted, decryption is executed by decoding. Upon successful decoding, the Proxy CSCF executes a process of confirming a client identifier, and so forth.

The Interrogating CSCF executes, for example, a query to the HSS, and so forth, and obtains subscriber information (user profile, etc.) and supports the registration process. Furthermore, it executes processes regarding SIP messages and determination of a route for fee charging.

The Serving CSCF is a contact point with the home network, and it functions as an SIP registrar and functions as an SIP server that maintains association between a user's position and a recorded user SIP address. It performs a process of obtaining from the HSS an AKA verification vector (AV), which is data applied to client authentication, and a user profile/service profile, and so forth. The Serving CSCF executes a client authentication process using the IMS AKA protocol, and upon successful authentication, it provides a key included in the AKA authentication vector (AV) to the Proxy CSCF.

Furthermore, the Serving CSCF checks all SIP messages with the IMS terminal, for example, the client, and determines the route for the messages. This process can be executed as a process in which a trigger rule/event based on the user service profile obtained from the HSS is considered.

(B2. HSS)

The home subscriber subsystem (HSS) maintains a list of client (user) information relating to IMS subscriber information, user profiles, and so forth. At a client, as a plurality of items of identification information, a private user identity (IMPI) and a public user identity (IMPU) are set, and user information is recorded and managed in association with at least either of these items of identification information.

For example, a subscriber profile of an IPTV service is associated with IMPI, which is client (user) identification information, and includes a service profile associated with each client. The service profile includes one or more public user identities (IMPU), core network authentication information (option), one or more items of filter criterion information, and so forth.

The Serving CSCF described earlier, by using these filter criteria owned by the HSS, determines whether it is appropriate to define a route to an AS (Application Server), whether this is requested for certain SIP requests, and so forth, and performs filtering. Note that information applied to the filter is saved and reported for each AS regarding each user. For example, regarding IPTV, the HSS maintains information regarding an entity that provides the IPTV service and a service identifier, and executes filtering on the basis of these.

Furthermore, the HSS also performs generation of an AKA authentication vector (AV), which is used during a legitimate IMS registration procedure.

(B3. AS)

Another element of the main functions of the IMS (IP Multimedia Subsystem) is an IMS application server (AS).

The IMS application server (AS) has the following IPTV functions:

Service Discovery Function

This is a function for determining the position of an access point for an IMS AS that provides an IPTV service.

nPVR (Network Personal Video Recording) Function

This is a function for recording received data on behalf of a user, and a function for charging a fee relating to the nPVR function, permission, and providing other services.

Join Function

This is a function that resides on a communication path to execute various services, fee charging, and so forth.

Control Function

This is a function for termination of SIP traffic, setup adjustment of a media stream, recording of information set by an end user, set in logging, and so forth, charging of fee from an IPTV service, processes for permission and other services, a process of delegating these services and functions to an external device connected to an IMS network, and so forth.

[2-C. Functions Used in Network Configuration]

Figure 17:
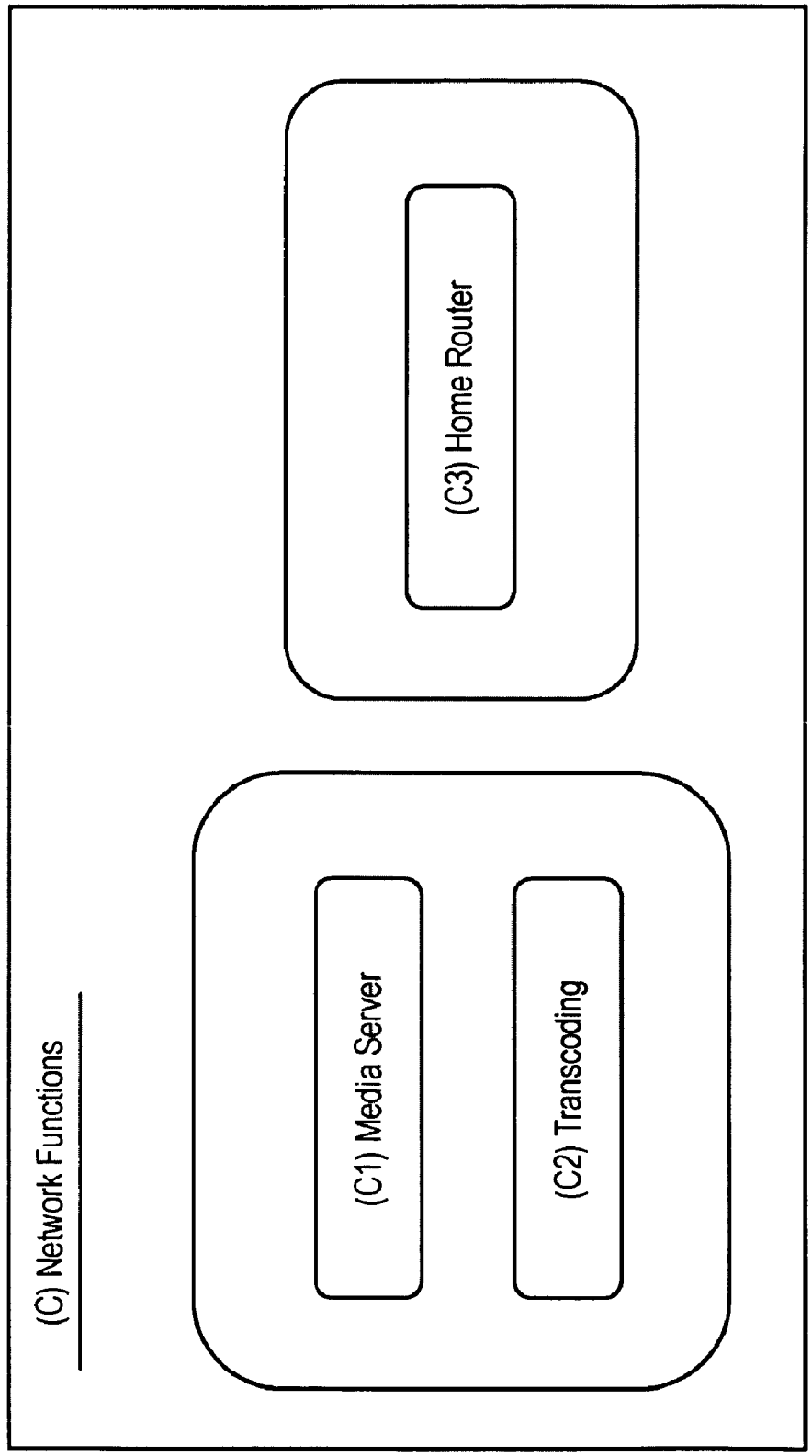
FIG. 17 is a diagram for explaining functions used in a network configuration in order to receive an IPTV service at a device in a home network.

Next, functions used in a network configuration for receiving an IPTV service from an external server at a device in a home network will be described. As shown in FIG. 17, the functions used in a network configuration include these functional elements:

(C1) Media server
(C2) Transcoding function
(C3) Home router

These functions can be disposed on a network in a distributed manner. For example, the (C1) media server and (C2) transcoding function may be configured in the IPTV service 250 in FIG. 3 or may be set as an independent configuration in another network connecting device. In the configuration of FIG. 3, the (C3) home router is provided in a device in the home network 210, for example, it is provided in the home IMS gateway 212. Hereinafter, processes of these functions will be described:

(C1) Media server
(C2) Transcoding function
(C3) Home router
Furthermore,
(C4) Details of communication process via a network will be described.

(C1. Media Server)

The media server is a most important component of the media layer. For example, the media server executes saving and output of VoD (video on demand) content, storage of content for network personal video recording (nPVR) executed as a client-specific content recording process at each client, and so forth. Furthermore, for example, when a trick play, such as slow play, fast forward, rewind, or skip chapter, is performed in VoD (video on demand) or the like, the media server executes media stream processing as needed. The VoD (video on demand) content is input from a content management system to the media server.

(C2. Transcoding)

The transcoding function is, for example, a function for executing conversion and encoding of data corresponding to SD (Standard Definition), which is a standard image quality, and HD (High Definition), which is a high image quality. For example, a client performs negotiation with an IPTV service providing server regarding a manner of coding a stream, and so forth, by using normal SIP SDP negotiation in an SIP session setup, so that it is possible to receive data coded in a form suitable for the client. The transcoding function needs to execute coding in consideration of a manner of coding usable on the network and also of a bandwidth available on a stream path, and to execute a process in consideration of suitability of a screen size, resolution, and so forth of the client.

(C3. Home router)

In many cases, a home network is connected to a distribution network via a home router that provides a NAT/NAPT (Network Address Translation/Network Address Port Translation) function. The home router can be classified into two profiles of full support and restricted home routers. For example, in order to receive an IPTV service, UPnP IGD
IP multicast pass through, IGMP, proxy, and IGMP SNOOPING
QoS (Quality of Services) support with priority including mapping from DSCP to layer 2 priority tag (802.1p, WMM)
Relay according to parameters by DHCP server function
these abilities are preferably supported in the configuration.

(C4. Details of Communication Process Via a Network)

Next, details of network communication using the functions described above, i.e.;

(C1) Media server
(C2) Transcoding function
(C3) Home router will be described.

(Communication and Session Setup)

In a communication process via a home router, for example, NAT (Network Address Translation) or NAPT (Network Address Port Translation) is used. NAT is used to convert a private address into a global address, and NAPT is used to convert many network addresses into TCP/UDP ports. These processes may be executed by a home router, or by a NAT/NAPT router on a network.

For example, an SIP message between an IMS client, such as the home IMS gateway 212 in the home network 210 shown in FIG. 3, and the proxy CSCF in the CSCF 231 in the IMS network 230 is transferred using IPsec. In a case where a NAT/NAPT router exists between these, a UDP capsule of an IPsec ESP packet [ESP] is used.

In order to support multicast streaming distribution via the home router, the NAT/NAPT router also has IGMP (Internet Group Management Protocol) proxy and IGMP snooping functionality. In a case where the home router has a NAT/NAPT route determining functionality, it is managed by the IMS gateway. For the IGMP snooping function to operate properly, an IGMP membership report must be generated by a device that wishes to receive IP multicast packets. For example, an IGMP membership report of multicast streaming is generated by an IPTV client, not by the IMS gateway.

(Use of SNTP (Simple Network Time Protocol))

In order to set a timestamp and start recording, or the like, a client in an IPTV system, for example, the home IMS gateway 212 or the TV 213 shown in FIG. 3, requires an accurate time, for example, in units of 0.1 seconds. In the IPTV system, a client implements a Simple Network Time Protocol client [SNTP]. The SNTP client can receive time signals via a defined multicast channel.

(Protocols)

The media protocol used for media (program) communication in an IPTV service must provide transport and control functions of real-time audio/video streaming of the media plane, and, for example, the following protocols are used.

MPEG-2TS

All media streaming of IPTV broadcast TV and VoD service conforms to MPEG transport stream (MPEG-2TS). For media synchronization, MPEG timestamps are used.

RTP (Real-Time Transport Protocol)

MPEG-2TS packets are transported according to the RTP protocol conforming to RFC 3550 and RFC 2250.

RTCP (Real-Time Control Protocol)

RTCP can be applied to both a media server and a client as an option. It is assumed that the RTCP protocol conforms to RFC 3550 regarding either unicast or multicast. In order to achieve compatibility, it is presupposed that all the media servers and clients implement both support for RTCP and no support for RTCP. For example, although a media server can send a sender report, a client cannot respond by a receiver report. Furthermore, RTCP information can be disregarded by SDP before streaming.

FEC (Forward Error Correction)

Although loss of a packet in an IPTV network does not occur so frequency compared with the current Internet, in a case where data transmission at a high bitrate (e.g., HD streaming) is executed, robust transport is needed, and as a criterion of packet loss rate, for example, "the packet loss rate per two-hour content is less than or equal to 1" is used. The two-hour HD content includes approximately 10M-IP packets, and thus it is required that the packet loss rate be less than or equal to 10 to 7.

In order to maintain audio/video quality, in a case where the packet loss rate is greater than the above definition, it is possible to recover packet loss. IPTV employs forward error correction (FEC) to perform error correction. Note that in order to achieve compatibility, FEC is sent using an IP port different from that for the original RTP stream. The FEC transport format is based on RFC 2377 and its extension. The FEC information is described by SDP so as to support another version in the future.

RTSP (Real-time Streaming Protocol)

In order to implement playing control including trick play, for example, slow playing, fast forward, rewinding, skip chapter, or the like, all media servers and clients support RTSP (RFC 2326). For the purpose of RTSP transport, TCP is used. In a case of multicast, RTSP is not used.

In an IPTV system, a client establishes a media session by the SIP protocol, and after the session setup, RTSP is used for playback control.

(Format and Distribution of Media Content)

For a media codec of video content, MPEG-2 Part 2 and MPEG-4 Part 10 (also known as AVC or H.264) are used. Distribution of media such as a TV program can be managed by a dedicated media server after setting of a session between a client and a server, and transcoding or encoding of distribution data is also executed via a network for media distribution.

(Data Sending and Receiving Process by Unicast Streaming)

For example, at a time of VoD (Video on Demand) or EPG obtaining, according to a request from a client, a unicast stream is set up by browsing. For example, in a case where a user on the client side selects a VoD title, by the IPTV control function on the client side, SIP-invite identifying a stream is sent from the client to a media server having desired content (e.g., the IPTV service 250 shown in FIG. 3) using a protocol such as RTSP.

When the preparation for starting a session is ready, the IPTV control function of the client responds to SIP invite of the client, and the stream is started by RTSP PLAY from the client directly to the media server or via the IPTV control function acting as an RTSP proxy.

The unicast stream is used, for example, in nPVR (network Personal Video Recording) or VoD (Video on Demand). An IPTV unicast stream encapsulates MPEG-2 or MPEG-4 Part 10 frames as an MPEG-2 transport stream, and is then set as RTP packets. The RTP packets are transferred by UDP/IP.

(Data Sending and Receiving Process by Multicast Streaming)

Multicast streaming is usually used to implement viewing of TV broadcast. The following two options are available for saving multicast resources.

(a) Resource request issued from SIP SDP by Proxy CSCF (b) Resource request from IGMP, issued by an IP edge (IP edge device is the first IP node between a home network and an IP backbone network and located at an upstream edge of an access and total network.

In the above scenario (a), when the user first starts viewing of TV from a specific IPTV provider (browses an EPG in order to check which channels are available), for example, the home IMS gateway 212 or the TV 213 as a client shown in FIG. 3 executes SIP invite to, for example, the AS 233 of the IMS network 230 shown in FIG. 3 or the IPTV control function of the IPTV service 250 to obtain available resources from the network. In a process of receiving from an external server a content list corresponding to content that can be provided by the external server, the client executes a process of obtaining a content list corresponding to a channel selected according to a provided profile, on the basis of a user profile or client profile provided to the external server.

A resource ID, which is an identifier of an available resource, is written in EPG metadata. Upon assignment of a resource, in order to join the relevant multicast group, the client sends an IGMP-join message defined in IGMP (Internet Group Management Protocol). The multicast group to join is found by searching the EPG by a linking mechanism. In the process of receiving from an external server a content list corresponding to content that can be provided by the external server, the client executes a process of obtaining a content list corresponding to a channel selected according to a provided profile on the basis of a user profile or client profile provided to the external server.

For example, when switching between different channels belonging to the same IPTV service provider having the same resource ID is performed by the user on the client side, sending of an additional SIP message is not executed. This is because unnecessary concealing by channel switching/zapping is to be avoided. Channel switching is executed by sending IGMP-leave for the previous channel and IGMP-join for the new channel. However, when the user has switched to a channel with different resource requirements, the client sends SIP UPDATE to the IPTV control function in order to report change in session parameters and to enable the proxy CSCF to modify resource allocation. Upon modification of the resources, the client sends an IGMP-join message for the new multicast group. As described above, the client executes sending of an SIP message according to SIP (Session Initiation Protocol) in a case where channel switching involves switching of service provider, and does not execute sending of an SIP message in channel switching between content provided by the same service provider.

In the above scenario (b), with the exception that an SIP update message is not needed during channel switching between channels with different resource requirements, the channel switching operation is the same. Furthermore, all resource requests are executed by an IP edge device as results of IGMP reports. In a case where resources are not sufficient due to channel switching, multicast join is not performed. In the scenario (b), the purpose of an SIP session is service monitoring rather than resource management.

The client includes a function of restricting IGMP channels that the user is allowed to join, for example, according to a subscriber profile owned by the HSS 233 shown in FIG. 3. Furthermore, as an option, an access node of the network can execute verification for permission of a subscriber to join certain channels. The basics of the communication mechanism of a multicast stream are the same as those of unicast, but the source and destination addresses in the IP layer are set according to the media server and the multicast group.

The process of switching between multicast distribution content and unicast distribution content, executed on the client side, will be summarized. At a time of receiving multicast distribution content provided by an external server, for example, the IPTV service 250 shown in FIG. 3, a data processing unit of a client apparatus sends an IGMP-join message as a message conforming to IGMP (Internet Group Management Protocol) to the external server or management server, and stops reception of the multicast distribution content, and in a case where reception of unicast distribution content is to be started, the data processing unit executes a process of sending an IGMP-leave message as a message conforming to IGMP to the external server or management server.

Furthermore, the data processing unit of the client executes a process of receiving multicast distribution content in TV broadcast reception, and executes a process of switching to unicast distribution at a time of execution of VoD (video on demand). Furthermore, at a time of an nPVR (network Personal Video Recording) process executed as a user-specific content recording process, the data processing unit executes a process of switching to unicast distribution. Furthermore, also at a time of execution of a trick play as a special content playing process, the data processing unit executes a process of switching to unicast distribution. Note that as a process of receiving a content list corresponding to a user profile or client profile, the data processing unit of the client executes a process of switching to unicast distribution.

(Management of Quality of Services)

Figure 18:
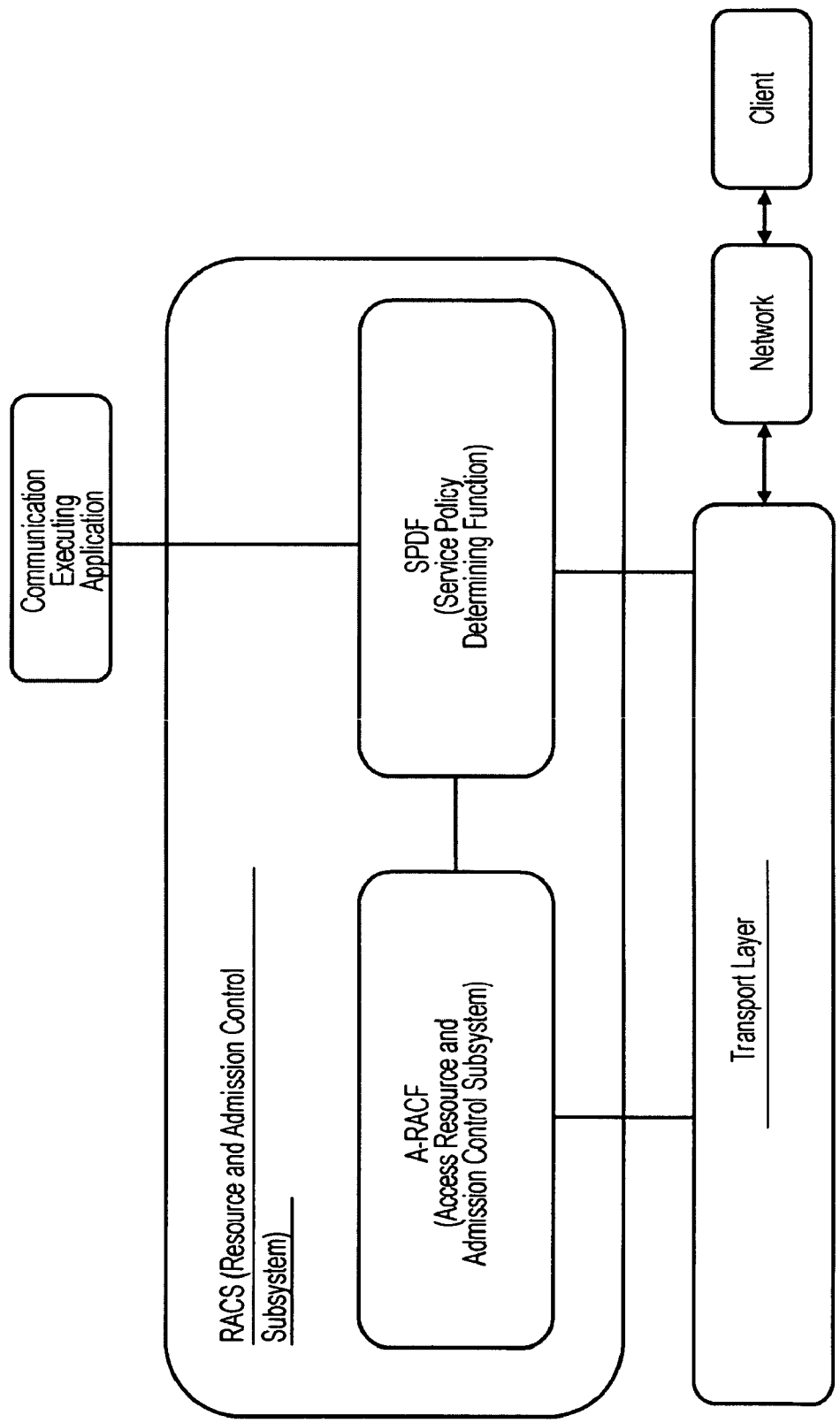
FIG. 18 is a diagram for explaining a process of managing quality of communication data.

In an IPTV system, except inside the home network, it is possible to manage quality of services in all network segments. Traffic management is executed in communication via the network in the network configuration shown in FIG. 3. A process of managing quality of communication data will be described with reference to FIG. 18. As shown in FIG. 18, IPTV QoS (Quality of Services) control/management is executed on the basis of RACS (Resource and Admission Control Subsystem). RACS is in charge of policy control, resource saving, and admission control. This enables the service to request transport resources via RACS. The current range of RACS includes mutual connection of a plurality of networks used in the IPTV system. The RACS architecture includes SPDF (Service Policy Determining Function) and A-RACF (Access Resource and Admission Control Function).

A communication executing application (e.g., the proxy CSCF of the CSCF 231 of the IMS network 230 shown in FIG. 3) maps application layer QoS information (e.g., parameters defined in SDP) to QoS information sent to SPDF. The SPDF can serve as a logical entity of the proxy CSCF or another physical node, and information needed for this process is obtained from an SIP invite message sent from the client when the user requests a multicast channel or a unicast session.

A-RACF located in the access network receives requests from SPDF, and on the basis of the requests and policy information saved in A-RACF, A-RACF can either accept or reject the requests to transport resources under the control thereof. This includes an IP edge and an access node, and finally a response is generated and provided to the application.

(Failure of Resource Saving and Failure Report)

RACS is in charge of resource saving. Hereinafter, failure of resource saving and a failure reporting process will be described. In a case where RACS fails in resource saving, i.e., upon the SPDF receiving a saving failure report from the A-RACF, as a process of reporting a communication error code, the SPDF returns Experimental-Result-Code AVP together with the following value to the proxy CSCF, which is the communication executing application.

In a case of failed resource saving,

INSUFFICIENT_RESOURCES

In a case of failed change of resource saving,

MODIFICATION_FAILURE

The proxy CSCF, which is the communication executing application, must map the received error code to an SIP error code, and return it to the terminal (client), i.e., must reject SIP INVITE or SIP UPDATE. Note that for the purpose of [SETUP] of this process, a "Precondition Failure" SIP status code can be used.

(Ordering of Communication Data)

For example, the priority ordering of communication data in the home network can be performed on the basis of priority marking. This approach conforms to the DLNA guideline. For example, a rule of mapping between types of communication data (traffic types) and priorities (priority [DLNA]) is set, and the priority of communication data is determined on the basis of this rule.

[3. Specific Process Examples of IPTV Services]

Next, specific process examples of IPTV services will be described in order, individually regarding the following two items:

3-1. Specific process example of communication process 3-2. Specific process examples of various services

[3-1. Specific Process Example of Communication Process]

In an IPTV service, a medium as content, such as a program, is distributed via an IP network, and IMS is used for identity (identifier) management, authentication, permission, and so forth. The IPTV system uses IMS in order to ensure that data communication is handled by a reliable, authenticated, and permitted method. In the IPTV service, SIP is used at a time of distribution of a media stream, and SIP is also used to execute other functions. An advantage of using IMS is that all SIP messages automatically pass through the IMS proxy. This means that the content and headers of messages can be used for automated interaction, such as setting of a correct quality of services.

The IPTV architecture is designed so that mutual connection is allowed also with DLNA communication converted into SIP. In other parts of the system, for example, when it interacts with components of the content management function, the IPTV application function receives SIP signal communication from the IPTV control function, and converts it into another protocol (HTTP or the like). The processes are executed mainly by the IMS application server (AS).

Hereinafter, as three specific deployment examples of IPTV service, 3-1-1. Deployment scenario 1

3-1-2. Deployment scenario 2

3-1-3. Deployment scenario 3 these three types of deployment scenarios will be described. Furthermore, 3-1-4. Network connecting process of client 3-1-5. Network disconnecting process of client 3-1-6. Service discovery process of client these will be described.

Although the deployment scenarios 1 and 2 described below seem to be very similar, they are actually very different. A main difference is that although it is assumed in the scenario 1 that each terminal has its own private IMS identifier (identity), in the scenario 2, terminals share the same private IMS identifier. Although this is not seen from the user's viewpoint, this makes a big difference for an operator regarding the method of network management and a processing method for subscription. Note that the scenarios described below are not mutually exclusive but are complementary, and can occur simultaneously in the same network. (3-1-1. Deployment Scenario 1: Case where Each Client is Configured as an IMS Terminal)

First, with reference to FIG. 19 and subsequent figures, a process example in a case where each client is configured as an IMS terminal will be described.

Figure 19:
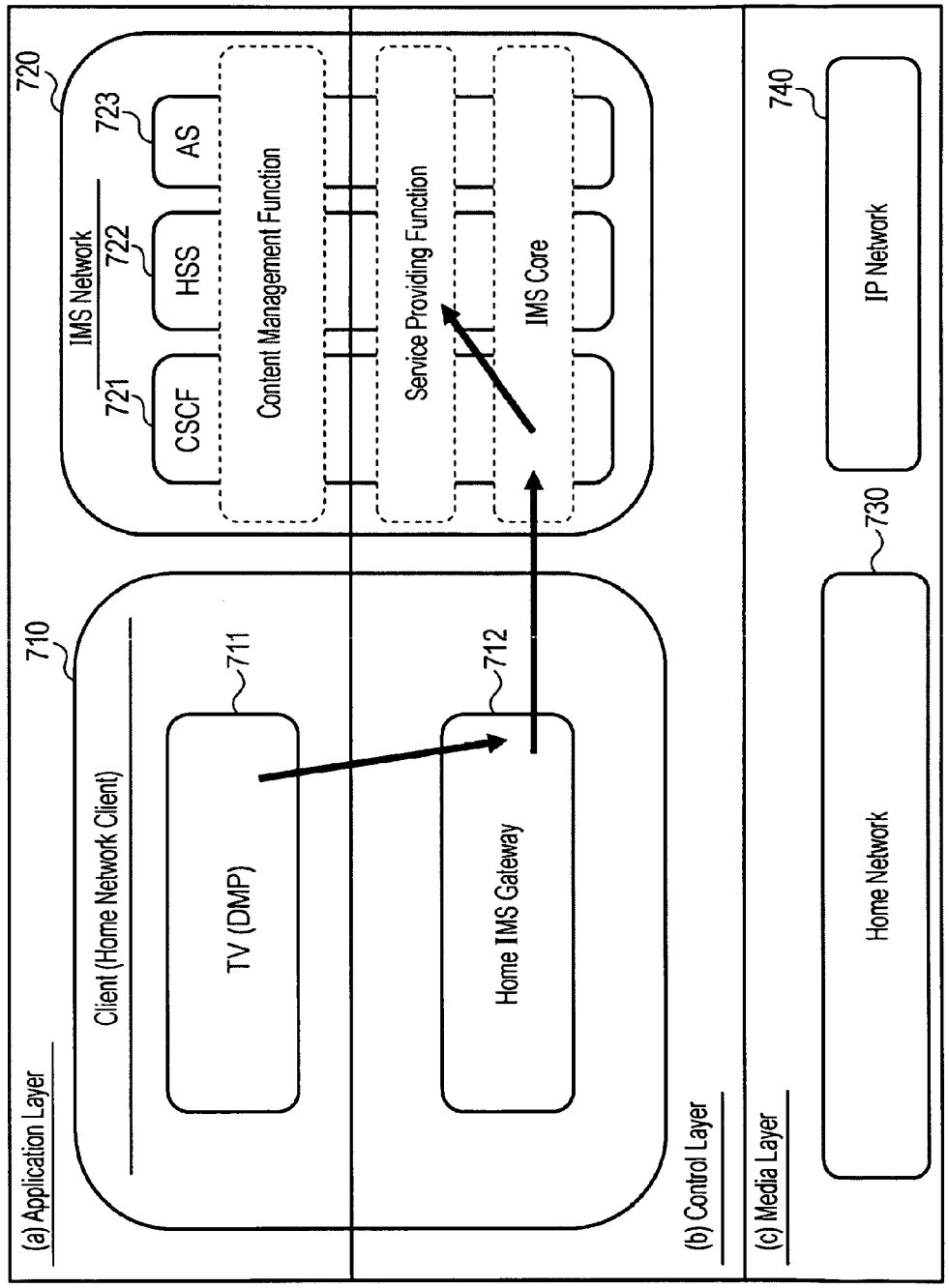
FIG. 19 is a diagram for explaining a communication sequence executed by a client in order to receive an IPTV service.

FIG. 19 shows a client (home network client) 710, an IMS network 720, a home network 730, and an IP network 740. The client (home network client) 710 includes a TV (DMP) 711 and a home IMS gateway 712 as configurations for receiving an IPTV service, and as described with reference to FIG. 3, the IMS network 720 includes a CSCF 721, an HSS 722, and an AS 723. Furthermore, these are shown as divided into a control management function that executes content control, a service providing function that provides services, and an IMS core section that controls other processes such as a registration process and communication relaying. Various processes are executed separately in (a) application layer, (b) control layer, and (c) media layer as processes involving communication between the individual layers.

First, the deployment scenario 1 is a process example in a case where there is no physical boundary between the TV (DMP) 711 and the home IMS gateway 712 in the client (home network client) 710 and these apparatuses are integrated. FIG. 19 is an example of a process of registering a client. A registration request is sent from the TV (DMP) 711 as a client to the IMS core of the IMS network 720 via the home IMS gateway 712, and the service providing function executes the registration process.

Figure 20:
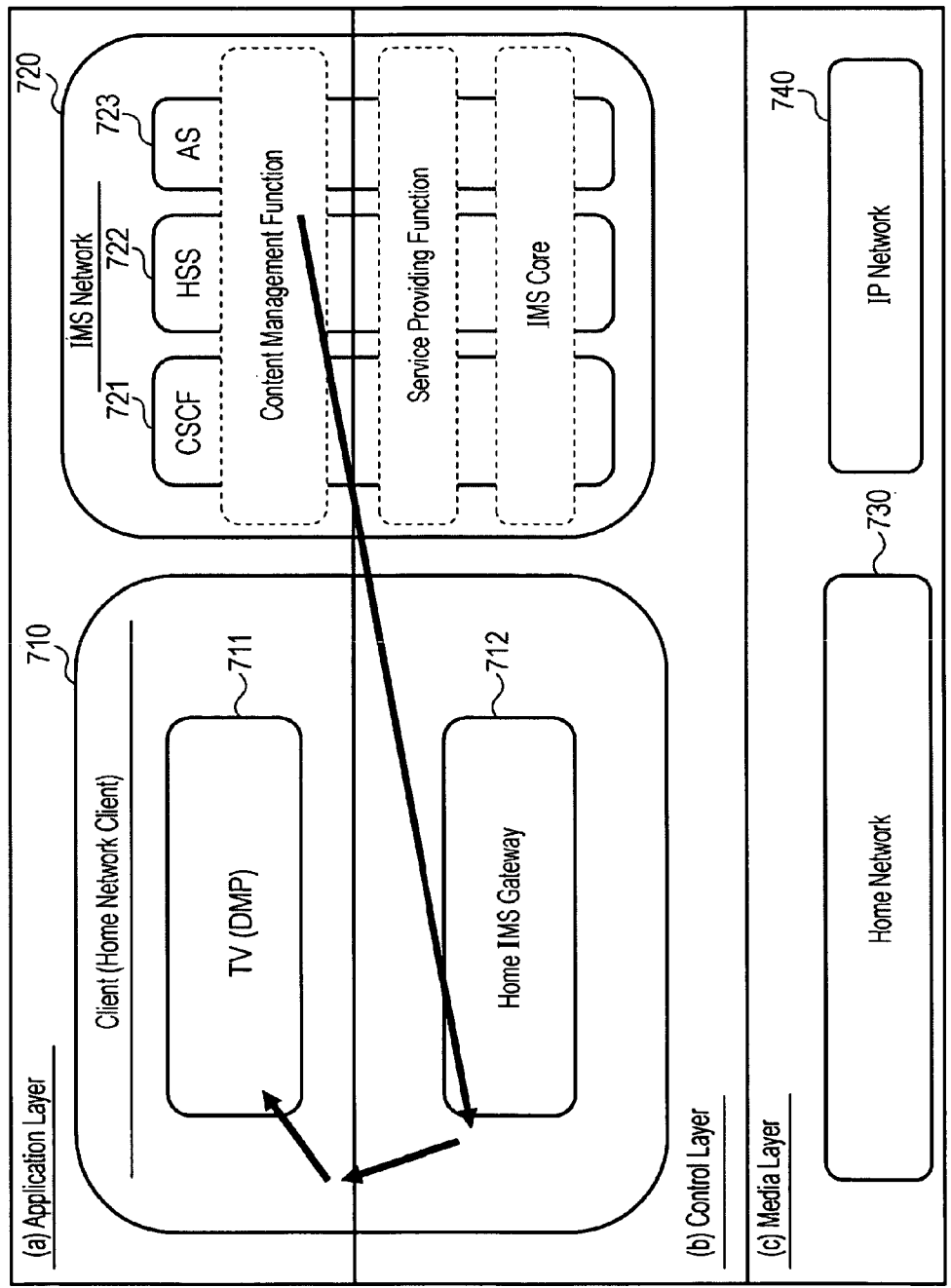
FIG. 20 is a diagram for explaining a communication sequence executed by a client in order to receive an IPTV service.

After the registration is performed, the TV (DMP) 711, which is a client, sends [SIP SUBSCRIBE] to the IPTV control function included in the content management function of the IMS network 720. Then, as shown in FIG. 20, the IPTV control function of the content management function provides the client with [SIP NOTIFY] including an address of a multicast data channel and a URL of EPG.

Figure 21:
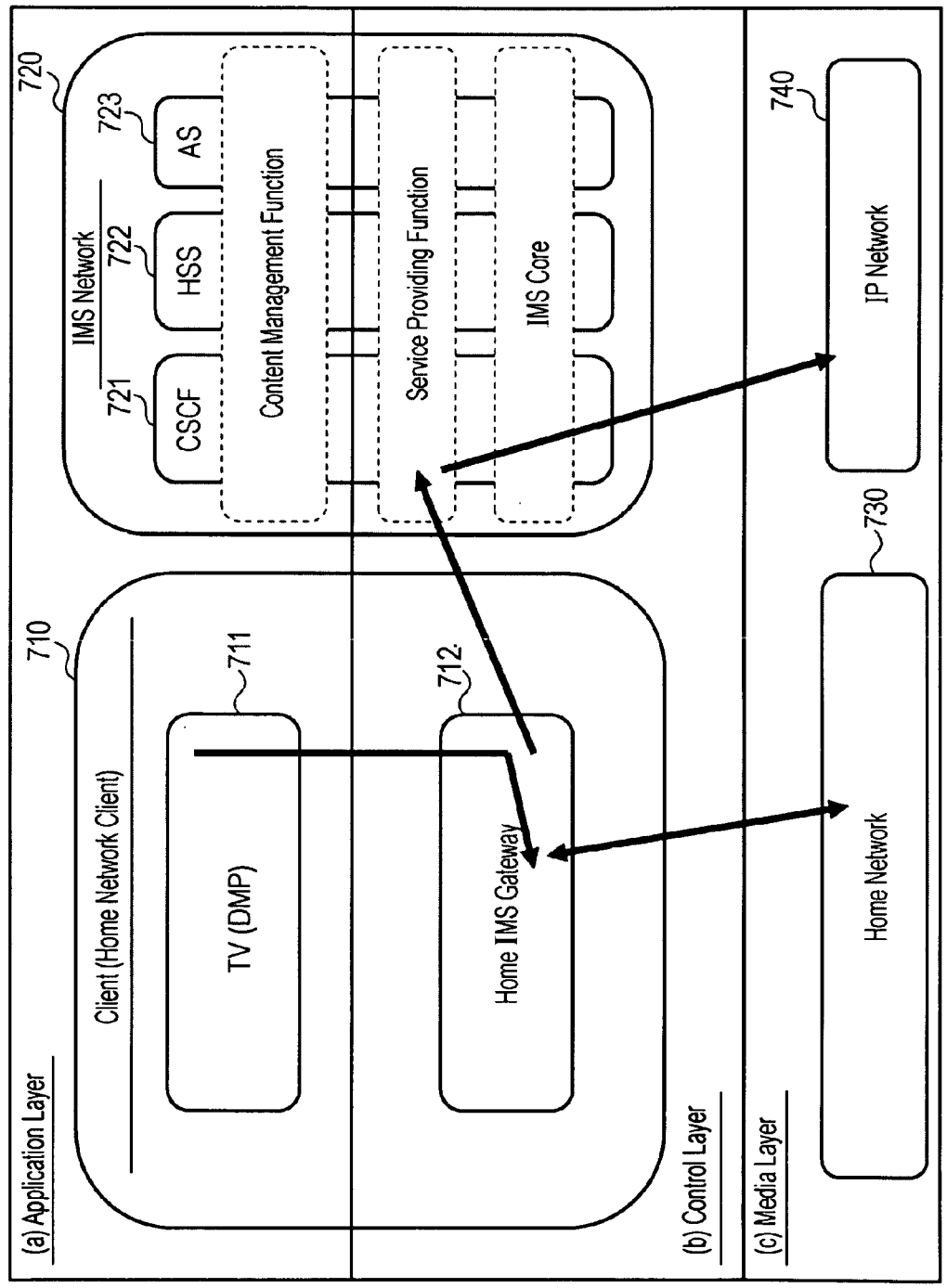
FIG. 21 is a diagram for explaining a communication sequence executed by a client in order to receive an IPTV service.

Upon receiving SIP NOTIFY, the TV (DMP) 711, which is a client, starts listening by the multicast channel. Furthermore, it downloads the first page of EPG and displays it (in a case where the configuration is such that the user starts with EPG), or downloads many pages depending on cases. After receiving EPG, the user selects a channel for viewing. At this time, [T SIP INVITE] is sent to the IPTV control function, and this function captures it and sets up a correct QoS. Then, the user starts viewing the channel, and performs switching among multicast channels. FIG. 21 shows a communication sequence in an occasion when the user has executed a channel selecting process.

When the user requests for a stream, QoS is managed by A-RACF (refer to FIG. 18) according to a request from a proxy CSCF that uses information picked up from [SIP Invite] or according to a request from an IP edge device that uses IGMP and knowledge of requirements of multicast streams. For an option at a time when the proxy CSCF requests for access resources, when the user performs switching between channels in a group of channels having the same resource requirements, an SIP message is not sent to the IPTV control function. However, for example, when the user switches to a pay-per-view channel or switches to a channel in a group having different resource requirements, the IPTV control function must receive a notification since P-CSCF can change necessary conditions of resources. In an option in which an IP edge device requests for access to resources, an SIP message is needed only when the user switches to pay-per-view.

(3-1-2. Deployment Scenario 2: Case where a Client is an SIP Client but Not an IMS Client)

Figure 22:
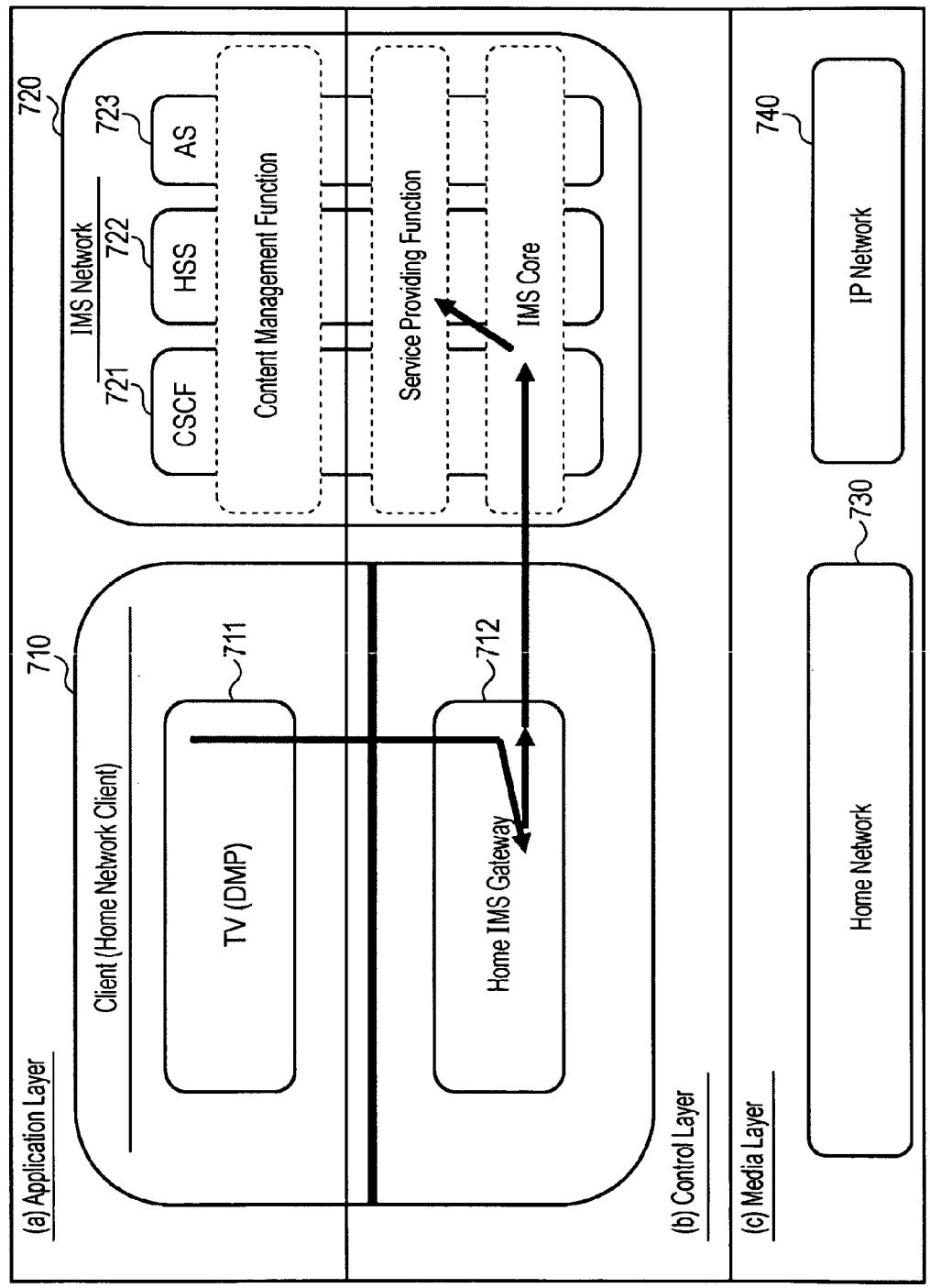
FIG. 22 is a diagram for explaining a communication sequence executed by a client in order to receive an IPTV service.

Next, in the deployment scenario 2, a case will be described where there exists physical separation between the TV (DMP) 711, which is an IPTV client, and the home IMS gateway 712, and these apparatuses are separate apparatuses that are not integrated, as shown in FIG. 22. IPTV clients do not have separate ISIMs (IP Multimedia Services Identity Modules). ISIM of IMS GW is shared by all clients.

In this case, the home IMS gateway 712 is used as a proxy, and although the TV (DMP) 711, which is an IPTV client, is directly registered in the IMS core, the home IMS gateway 712 passes messages to the IMS core. Control information is passed through the home IMS gateway 712 by using SIP, and media are distributed directly from a media server (in a content provider domain) to the IPTV client. In order to access a service, IMS identification information (IMS PUID) is needed. The flow in this case is basically the same as the flow of the deployment scenario 1, and a main difference is that registration is performed through the home IMS gateway 712. The user obtains an EPG and a media stream similarly to the scenario 1.

(3-1-3. Deployment Scenario 3: Case of DLNA-IPTV Interconnection)

In a case where a home network uses DLNA, it is necessary to bridge SIP communication of an IPTV system and HTTP communication of a DLNA system, and to bridge IP (which uses DVB encapsulation) media distribution by the IPTV system and HTTP-based media distribution by the DLNA system. For this purpose, an IPTV-DLNA application gateway, which is a gateway that bridges two different systems, is provided.

Figure 23:
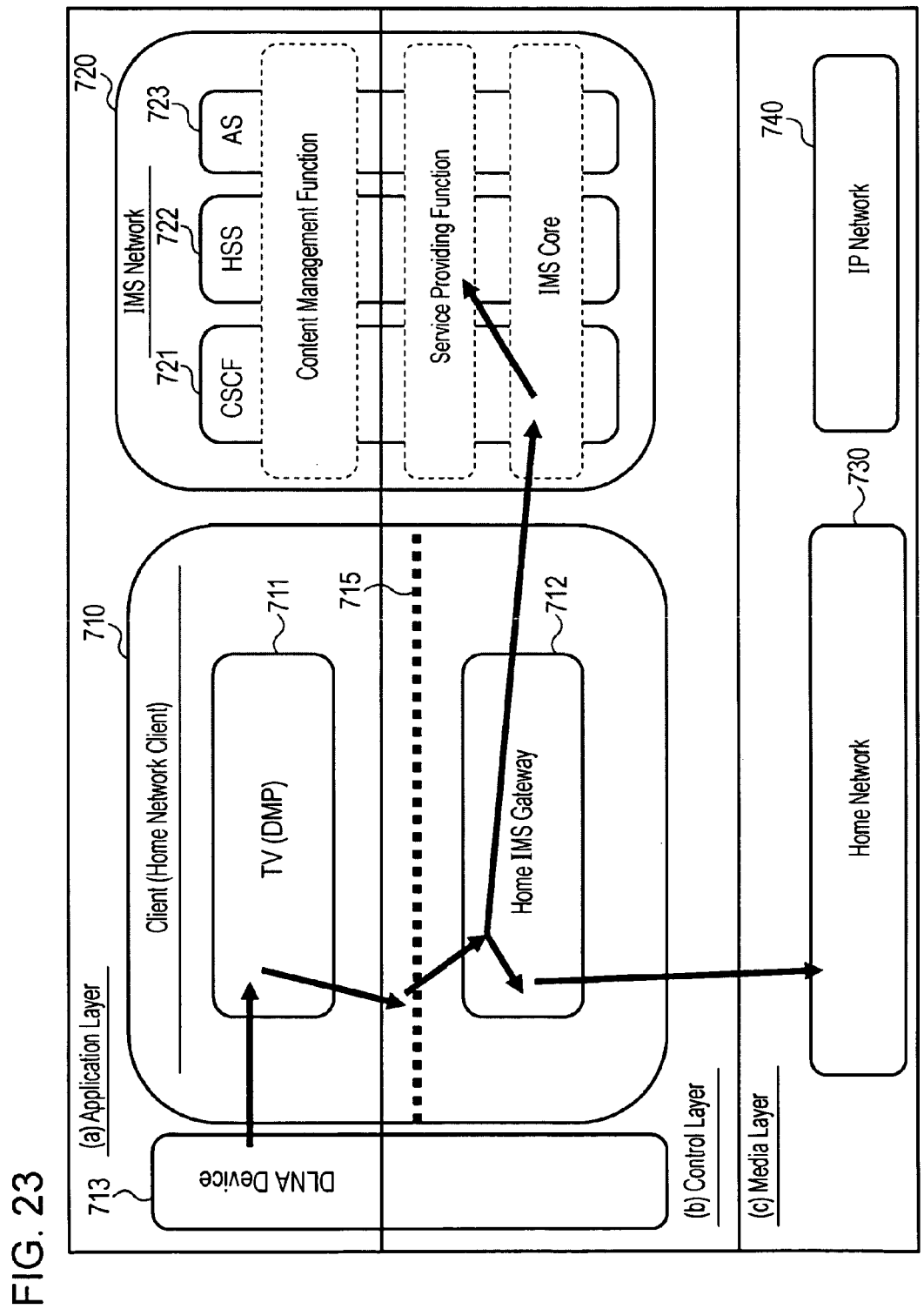
FIG. 23 is a diagram for explaining a communication sequence executed by a client in order to receive an IPTV service.

As shown in FIG. 23, when a DLNA device 713 requests a media stream from an IPTV service provider, the IPTV-DLNA application gateway connects to the home IMS gateway 712, and it is registered similarly as an SIP client not having an IMS client, similarly to the scenario 2. For example, in the example shown in FIG. 23, the TV (DMP) 711 functions as the IPTV-DLNA application gateway. The IPTV-DLNA application gateway can perform registration also when connecting to a network as an SIP client similarly to a case where there is no IMS client.

The deployment scenario 3 can be implemented by two methods. One is a method based on the deployment scenario 1, and the other is implemented as a process based on the deployment scenario 2. A dotted line 715 shown in FIG. 23 means that the TV 711, which is an IPTV client, and the home IMS gateway 712 may be either physically integrated or separable. Hereinafter, five use cases of the IPTV and DLNA application gateway will be described. From the viewpoint of the IPTV system, the IPTV-DLNA application gateway acts as an IPTV client.

The following specific process examples executed in the deployment scenario 3 will be described.

3-1-3a. 2BOX PULL
3-1-3b. 3BOX PULL
3-1-3c. Download
3-1-3d. 2BOX PUSH
3-1-3e. Upload (3-1-3a. 2BOX PULL)

In the 2BOX PULL scenario defined by DLNA, i.e., in a configuration where processes are executed by connecting a DMS (Digital Media Server) and a DMP (Digital Media Player) one to one, the IPTV-DLNA application gateway acts as a DLNA digital media server (DMS) that implements a UPnP AV media server (UPnP device). In response to a request by a DLNA digital media player (operated by the user), the IPTV-DLNA application gateway converts a media format and protocol of an EPG/VoD content list, program content, and so forth into a DLNA protocol.

(3-1-3b. 3BOX PULL)

In the 3BOX PULL scenario defined by DLNA, i.e., in a configuration where processes are executed by connecting a DMS, a DMP, and a DMC (Digital Media Controller), in the 3BOX PULL scenario, the IPTV-DLNA application gateway functions as a DLNA digital media server, similarly to the use case of 2BOX PULL. However, there is a difference from the 2BOX PULL scenario. The user browses an EPG/VoD content list by operating the DLNA digital media controller (DMC), and causes a digital media renderer to play video content.

(3-1-3c. Download)

In a download process, similarly to the 2BOX PULL use case, the IPTV-DLNA application gateway functions as a DLNA digital media server. A difference from 2BOX pull is that a download controller (+DN+) downloads video content provided by the DMS. Although it is not possible to output content to the IPTV-DLNA application gateway, instead, content is downloaded in response to a request (e.g., for a VoD service).

(3-1-3d. 2BOX PUSH)

In the 2BOX PUSH use case defined by DLNA, i.e., in the 2BOX PUSH use case where processes are executed by connecting a controller having a content distribution function and a digital media renderer (DML) having a playing function one to one, the IPTV-DLNA application gateway functions as a DLNA Push controller (+PU+) that implements a UPnP control point for a UPnP AV renderer.

Generally, the user operates a client device to browse a content list corresponding to EPG/VoD of an IPTV service, and can cause the DLNA digital media renderer to play selected video content by a method in which the DLNA Push controller controls the DLNA media renderer in order to transmit video streaming provided by the DLNA Push controller of the IPTV-DLNA application gateway.

(3-1-3e. Upload)

In an upload process, the IPTV-DLNA application gateway functions as a DLNA upload controller (+UP+) that implements a UPnP control point for a UPnP AV server (UPnP device). Generally, the user can operate a client device to browse an EPG/VoD content list of an IPTV service. The DLNA digital media server saves selected video content provided by the DLNA upload controller of the IPTV-DLNA application gateway.

(3.1.4. Network Connecting Process of Client)

Next, an example of a network connecting process of a client for receiving an IPTV service will be described with reference to FIG. 24 and subsequent figures.

Figure 24:
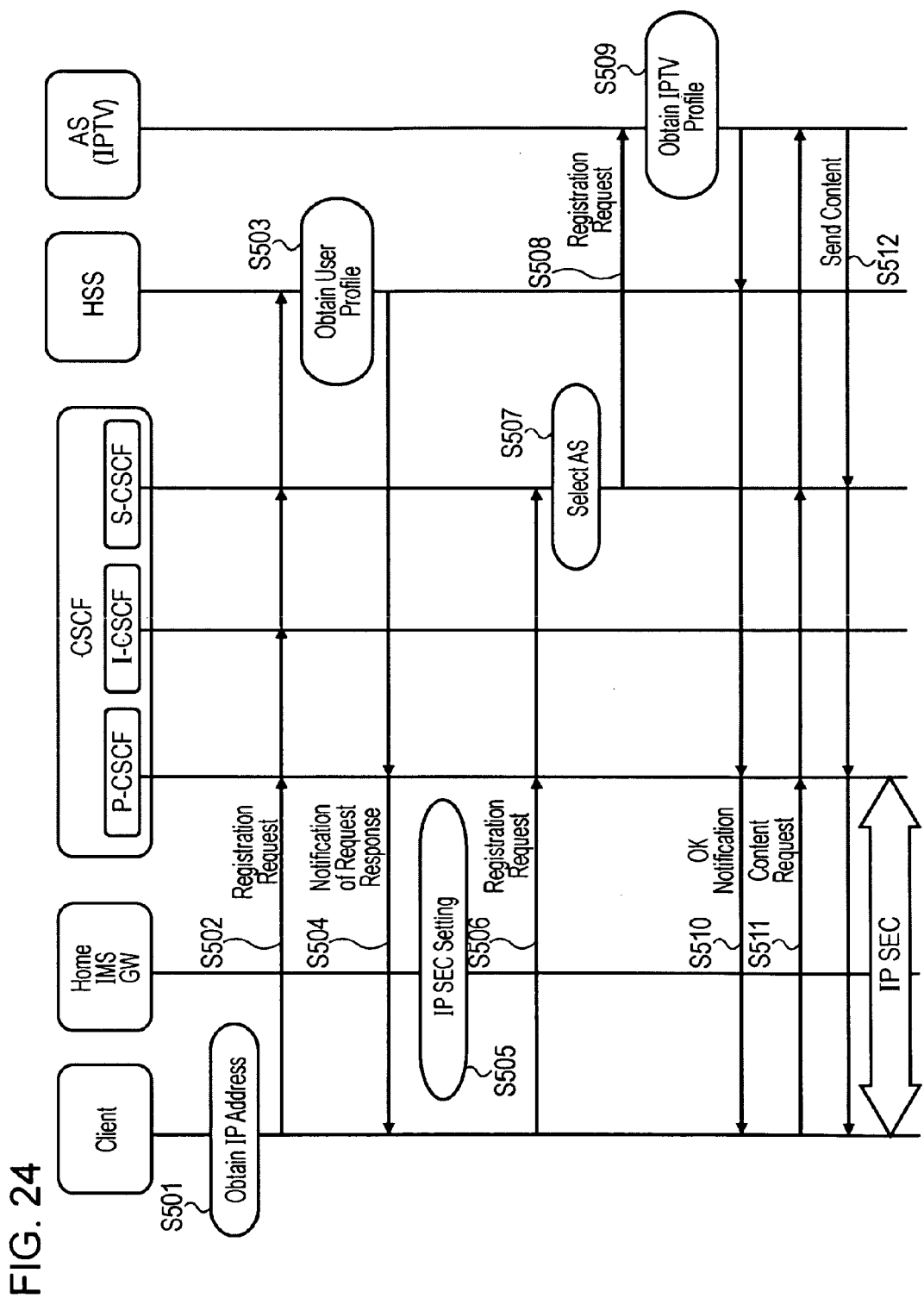
FIG. 24 is a diagram for explaining a network connecting process sequence of a client for receiving an IPTV service.

FIG. 24 is a sequence diagram showing an example of a network connecting process of a client. From the left, a client corresponding to, for example, the TV (DMP) shown in FIG. 3, a home IMS gateway, and furthermore, CSCF, HSS, and AP (IPTV), which are components of an IMS network, are shown. Note that regarding CSCF of the IMS network, the proxy CSCF (P-CSCF), the interrogating CSCF (I-CSCF), and the serving CSCF (S-CSCF), described earlier, are shown individually.

First, the client obtains an IP address in step S501, and outputs a registration request in step S502. The registration request is sent from the home IMS gateway to the proxy CSCF (P-CSCF), the interrogating CSCF (I-CSCF), and the serving CSCF (S-CSCF) of CSCF, which are components of the IMS network. In step S503, S-CSCF executes obtainment of a user profile from the HSS, and in step S504, notification of a request response to the client is performed.

Then, in step S505, setting is made such that IPSec communication is allowed between the client and the proxy CSCF (P-CSCF) of CSCF, which is a component of the IMS network, and the subsequent communication is executed according to IPSec. In step S506, the client outputs an IPTV service registration request, which is received by the serving CSCF (S-CSCF) of CSCF, which is a component of the IMS network. In step S507, an AS selection process is performed, and in step S508, a registration request is issued to the selected AS.

The AS (IPTV) obtains an IPTV profile in step S509, and issues a registration completion notification to the client in step S510. On the basis of reception of the registration completion notification, the client outputs a content obtaining request to the AS in step S511, and obtains content from the AS in step S512.

Figure 25:
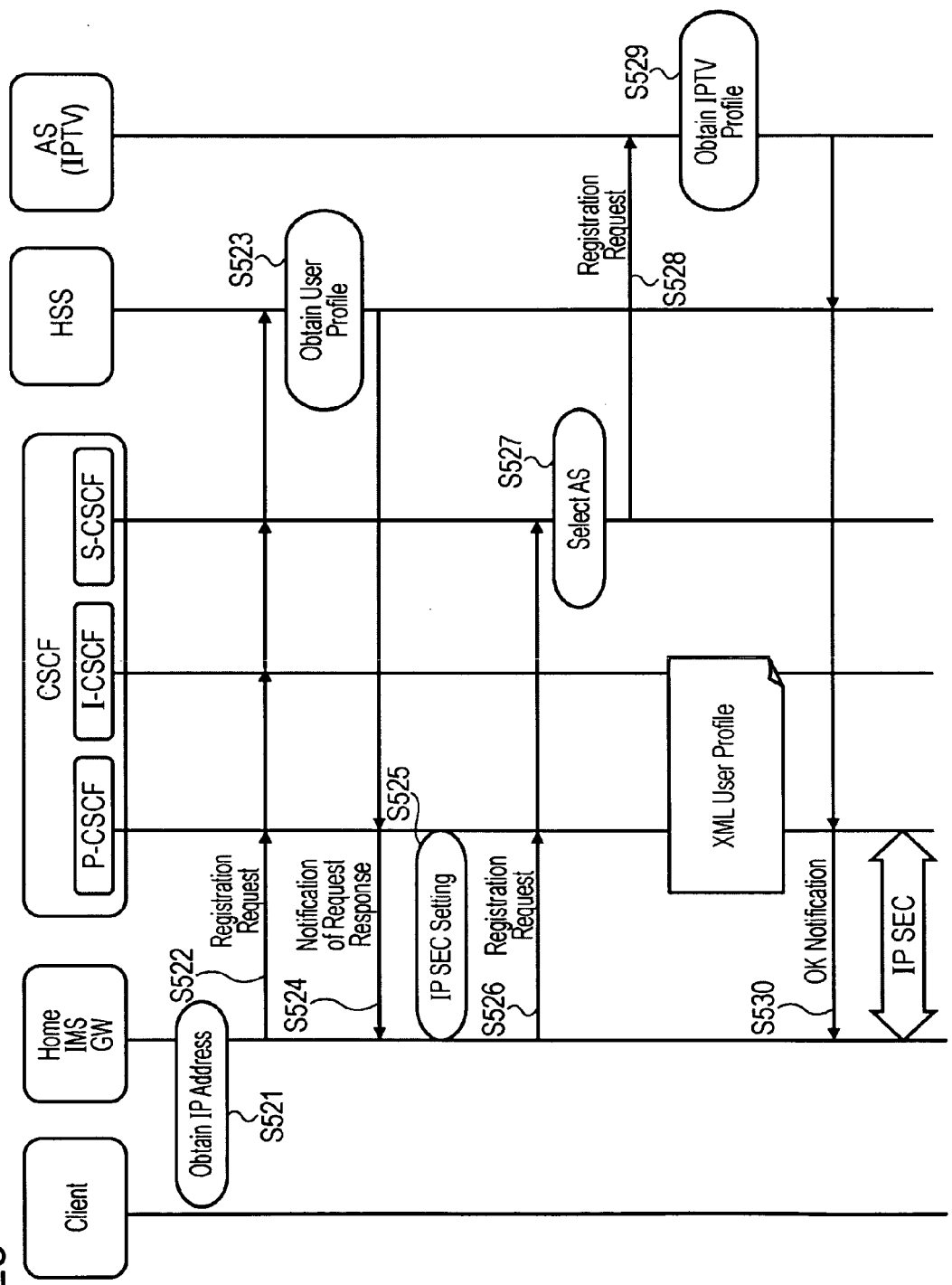
FIG. 25 is a diagram for explaining a network connecting process sequence of a client for receiving an IPTV service.

FIG. 25 is a sequence diagram of a case where a registration process by the home IMS gateway, not the registration process by the client, is executed. First, the home IMS gateway obtains an IP address in step S521, and outputs a registration request in step S522. The registration request is sent from the home IMS gateway to the proxy CSCF (P-CSCF), the interrogating CSCF (I-CSCF), and the serving CSCF (S-CSCF) of CSCF, which are components of the IMS network. In step S523, S-CSCF executes obtainment of a user profile from the HSS, and in step S524, notification of a request response to the home IMS gateway is performed.

Then, in step S525, setting is made such that IPSec communication is allowed between the home IMS gateway and the proxy CSCF (P-CSCF) of CSCF, which is a component of the IMS network, and the subsequent communication is executed according to IPSec. In step S526, the home IMS gateway outputs an IPTV service registration request, which is received by the serving CSCF (S-CSCF) of CSCF, which is a component of the IMS network. In step S527, an AS selection process is performed, and in step S528, a registration request is issued to the selected AS.

The AS (IPTV) obtains an IPTV profile in step S529, and issues a registration completion notification to the home IMS gateway in step S530.

Figure 26:
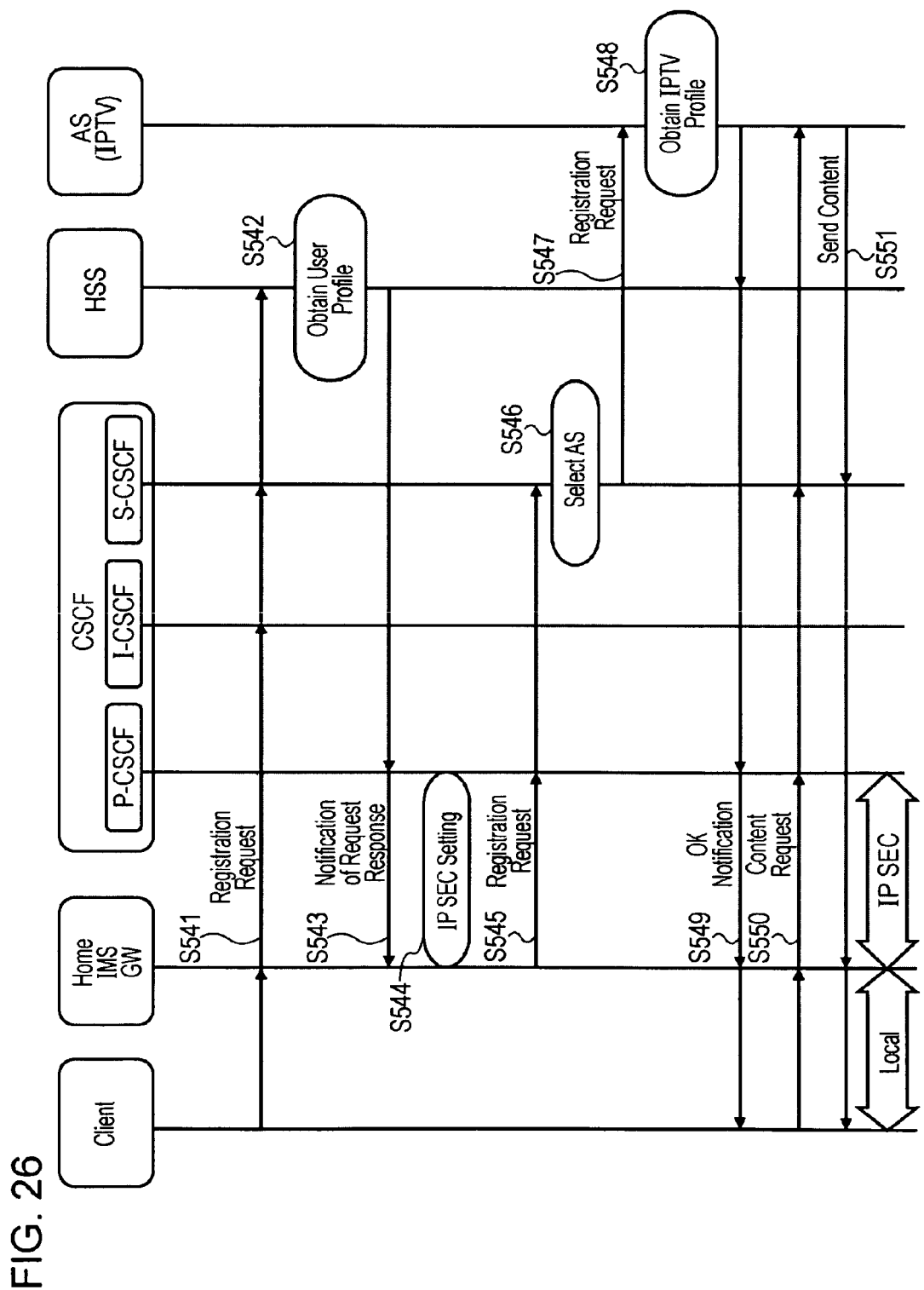
FIG. 26 is a diagram for explaining a network connecting process sequence of a client for receiving an IPTV service.

FIG. 26 is an example of a sequence in a case where communication between the client and the home IMS gateway and communication between the home IMS gateway and the IMS network are executed individually. First, in step S541, the client sends a registration request to the home IMS gateway. The client address in this case is an address (@home) in the home network. Upon receiving the registration request from the client, the home IMS gateway converts it into a global address (@op.com) and outputs the registration request to the IMS network. The registration request is sent to the proxy CSCF (P-CSCF), the interrogating CSCF (I-CSCF), and the serving CSCF (S-CSCF) of CSCF, which are components of the IMS network. In step S542, S-CSCF executes obtainment of a user profile from the HSS, and in step S543, notification of a request response to the home IMS gateway is performed.

Then, in step S544, setting is made such that IPSec communication is allowed between the home IMS gateway and the proxy CSCF (P-CSCF) of CSCF, which is a component of the IMS network, and the subsequent communication is executed according to IPSec. In step S545, the home IMS gateway outputs an IPTV service registration request, which is received by the serving CSCF (S-CSCF) of CSCF, which is a component of the IMS network. In step S546, an AS selection process is performed, and in step S547, a registration request is issued to the selected AS.

The AS (IPTV) obtains an IPTV profile in step S548, and issues a registration completion notification to the home IMS gateway in step S549. This notification is sent from the home IMS gateway to the client via the home network. On the basis of reception of the registration completion notification, the client outputs a content obtaining request to the home IMS gateway in step S550. The home IMS gateway outputs this request to the AS, and obtains content from the AS and transfers the content to the client in step S551.

Note that in a case where setting is made such that it is possible to provide an IPTV service to the DLNA device 713 as described earlier with reference to FIG. 23, the home IMS gateway discovers an IPTV control function, receives EPG data, and then enables [IPTV DLNA app GW] for executing interconnection between the DLNA device and the IPTV service. In a case where [IPTV DLNA app GW] functions as a UPnP device, i.e., as a DLNA media server, IPTV DLNA app GW starts the SSDP (Simple Service Discovery Protocol) discovered by a UPnP control point [SSDP]. In a case where IPTV DLNA app GW functions as a UPnP control point, i.e., as a DLNA Push controller, IPTV DLNA app GW need not start SSDP of a UPnP device, and instead starts SSDP of the UPnP control point in order to discover a UPnP device.

Note that since the DLNA protocol, i.e., device discovery and device control in the UPnP device architecture, is based on sessionless communication, there is no concept of establishment of a session in which the UPnP control point performs communication with the UPnP device. While the digital media server, i.e., the UPnP device, is usable on the network, the digital media player and the digital media renderer, i.e., the UPnP control point, can anytime request a SOAP message for control regarding media streaming and for an HTTP request, and the DMS of IPTV DLNA app GW must respond to the request within, for example, 30 seconds even in the worst case.

IPTV DLNA app GW can maintain a session with the IMS core (CSCF) and the IPTV control function while the DMS of IPTV DLNA app GW is usable on the network. In a case where the session is terminated, IPTV DLNA app GW can reset a session when an SOAP request and an HTTP request from the DMP exist. In a case where IPTV DLNA app GW acts as a Push controller, i.e., as a UPnP control point, it is possible to know the length of period during which the session is maintained.

In a case where the channel of IPTV service is changed, an HTTP request for channel changing from the DLNA device is converted into IGMP (Internet Group Management Protocol). For example, it is converted into IGMP (Internet Group Management Protocol) by the IPTV-DLNA application gateway.

(3-1-5. Network Disconnection of Client)

Next, a process of disconnecting from an IPTV service will be described. At an IPTV service receiving client, it is possible to turn off a display and to disconnect the client from a network. This process of disconnecting from the IPTV service is executed, for example, according to the following sequence.

(Step 1)

The client stops media reception.

Note that in the case of multicast, IGMP leave is used to leave from a multicast stream relating to the channel that the user has been viewing.

(Step 2)

The client sends SIP BYE to the IPTV service providing entity to complete an SIP session relating to media reception.

Note that in the case of unicast, the IPTV service providing entity executes an RTSP TEARDOWN command to stop the RTP unicast flow, and closes the port in a case where the media server does not notice the SIP protocol.

(Step 3)

The client sends SIP SUBSCRIBE to the IPTV service providing entity by Expire 0 to notify IPTV AS that a switch off will occur on the client side.

(Step 4)

Upon expiration of the service period, the client sends SIP REGISTER to cancel registration of the client identifier. Note that for obtaining the registration information, data (GRUU: Globally Routable User Agent URI) received from the serving CSCF is needed.

(Step 5)

The client sends IGMP leave for the control channel.

(Step 6)

Disconnected from the IPTV service and IMS.

(Uncontrolled Disconnection from an IPTV Service)

In some cases, for example, in a case where a power failure occurs, disconnection is performed without executing the sequence described above. That is, in some cases, uncontrolled disconnection from an IPTV service is performed. In this case, it is necessary to stop a media flow of a program or the like being transmitted. However, in this case, a process must be executed in consideration of the following matters:

(a) Process of stopping the media flow (b) SIP dialog of the network

These will be described below.

(a) Process of Stopping the Media Flow

In a case where the client is receiving multicast media streams, the only method that can be used to stop the media streams is a default timeout of IGMPv3 (a group membership interval of 225 seconds according to [IGMP]).

In the case of unicast transmission, in most media unicast transport mechanisms, a process of receiving feedback information is performed, and a timeout time is set in the feedback information, so that a stopping process using the timeout time becomes possible.

(b) SIP Dialog of the Network

For all SIP states of the network, usually, the default expiration value is 3600 seconds. This state relates to SIP REGISTER, SUBSCRIBE, and INVITE. The timeout mechanism clears the state of the IMS core (in a case where a reconnection occurs before a timeout, the timer increases after a new registration).

The fact that the state of SIP is maintained to be active for one hour does not mean that traffic is sent for one hour. Actually, after the first NOTIFY that does not reach a destination, the IMS core is notified of the unavailability of a client, and clears the state accordingly.

(3-1-6. Service Discovery Process of Client)

A process in which discovery of IPTV service providers is performed in an IMS network will be described. IPTV service providers are discovered and presented to the user so that selection by the user is allowed, for example, as described below. Note that for this process, completion of IMS registration by the user is a presupposed condition.

The client first issues a request to the IMS provider to attempt discovery of IPTV service providers. In a case where this fails, it is possible to issue a request to an entity other than the IMS provider, for example, a root. The service provider discovery process starts with discovery of IPTV service providers that provide IPTV services.

There exist many models that can be used for discovering IPTV service providers in an IMS network. These are all based on the presupposition that application servers (ASs (IPTVs)) capable of providing services exist in the network, and that the IPTV service providers can be identified by PSIs, feature tags, or other SIP headers.

The step of discovering service providers is executed according to, for example, high-level description of "transport of an MPEG-2TS-based DVB service in an IP-based network". SIP is used as communication for user authentication, and an IMS trust model for boot-strapping information, such as P-Asserted-Identity, is used. An SIP request that uses DVB IP del that starts with a service IPTV can serve as an IPTV provider. For example, it is identified by that SP CANAL+ is a domain name, and it is possible to assign to a service a name corresponding to the service.

In a case where this fails, the process described below is executed.

In a case where an IPTV server has not been assigned when an IPTV application is started, the IPTV application uses an IPTV service bootstrap service or a default address.

The IPTV client sets control signal communication for IPTV SIP dialog, and defines a route in the IMS network CSCF. This also means that it is not necessary to know an accurate address of a service since it can be added later. In the IMS network, CSCF must understand that the IPTV SIP dialog is an IPTV dialog, and define the route in IPTV CF (Control Function). This allows IPTV CF to provide discovery information regarding the service provider and the service provided.

Information (e.g., SIP URI or the like) regarding the IPTV service provider is provided to the user by using the SIP dialog, and when the user has discovered IPTV service providers, these providers are presented to the user. The user can then receive EPGs (or VOD and nPVR content lists or the like) provided by the IPTV service providers.

(Service Discovery by UPnP)

Next, a service discovery process by UPnP will be described.

The IPTV client obtains an IP address of the proxy CSCF from the DHCP option of SIP, or uses a default IP address of the proxy CSCF, written on an ISIM (IP Multimedia Services Identity Module) card of an IMS operator.

Alternatively, the IPTV client discovers a home IMS gateway by using a UPnP discovery mechanism. The home IMS gateway implements a UPnP IMS GW service, which is a UPnP service. In order to discover the UPnP IMS GW service, the IPTV client performs a process in which SSDP is used, such as sending SSDP:M-Search or receiving SSDP. Upon discovering the UPnP IMS GW service, the IPTV client issues a request for obtaining an IP address and port of IMS B2BUA of IMS GW. Then, the IPTV client starts an SIP session with the IMS core via the home IMS GW, and discovers IPTV services.

For example, a process sequence in the case of service discovery by a DLNA device, described with reference to FIG. 23, is as follows. The UPnP control point of the DLNA device can discover DMS by IPTV DLNA app GW in the case of 2BOX PULL, DOWNLOAD, and 3BOX PULL described earlier. The service discovery of IPTV services is executed by the home IMS GW by the method that is the same as the method described earlier. Methods of deploying a plurality of IPTV services vary among vendors. For example, IPTV DLNA app GW can use a plurality of DMSs individually corresponding to IPTV services. To each DMS, a name as a UPnP device, which allows the corresponding IPTV service to be identified, is set so that the user can select an appropriate DMS for the IPTV service.

In the case of 2BOX PUSH and UPLOAD, the IPTV-DLNA application GW controls the UPnP device of the DLNA device so that it is not necessary to implement a UPnP device with which the IPTV-DLNA application GW is discovered.

[3-2. Specific Process Examples of Various Services]

Next, various services executed in IPTV services will be described. The following items will be described in order.

3-2-1. TV broadcasting
3-2-2. nPVR (network Personal Video Recording)
3-2-3. VoD (Video on Demand)
3-2-4. Content filtering and personalization
3-2-5. Interaction with TV
3-2-6. Profile management
3-2-7. Process for matching with device capabilities (3-2-1. TV Broadcasting)

In IPTV services, in addition to channel switching, EPG browsing must be provided to the user as quickly as TV broadcasting. In order to minimize the user metadata waiting time of EPG metadata transmission, EPG metadata regarding programs during a certain period (e.g., 8 days) is preloaded on the client, and in order to minimize transactions per second and the necessary bandwidth in the EPG distribution system, service information, i.e., TV channel information and EPG, i.e., TV program information, is distributed via a multicast data channel. The IPTV content browser and IPTV navigation application of the client, described with reference to FIG. 15, searches for EPG metadata by using the MDC control function.

The EPG metadata is also distributed by unicast. Although EPG metadata corresponding to basic programs corresponding to programs provided by IPTV services, or EPG metadata of statistically popular programs, or the like is distributed by multicast, high-level EPG metadata with rich information, such as other program information or thumbnail images, can be obtained through searching by using unicast.

EPG metadata provided by IPTV service providers is distributed regularly through a single multicast data channel. The multicast channel control function of the client, described with reference to FIG. 15, filters tagged EPG metadata, such as channel subscription, according to the client configuration, and saves the filtered EPG metadata in a memory. The IPTV service browser and IPTV navigation application uses the MDC control function to search for EPG data. The cycle time of transmission of EPG-metadata varies depending on the information types.

Service information including multicast channel addresses of TV channels and EPG metadata regarding content (programs) currently being broadcast and next content is sent frequently, for example, at intervals of 2 seconds. EPG metadata corresponding to programs on the current day is sent, for example, at intervals of 30 seconds.

Since the schedule of TV programs of broadcasting TV services is determined in advance, it suffices for the client to search for new EPG metadata for future programs once a day. However, in order to notify the client of changes in program schedule that occur occasionally, such as urgent news or extra innings of a baseball game, updating of EPG metadata is also distributed regularly, for example, at intervals of 2 seconds, through the multicast data channel. In order to receive the updating of EPG metadata, the client monitors the multicast data channel for the EPG metadata when receiving a media stream via the multicast channel.

The EPG metadata distributed through the multicast data channel is data including basic information regarding programs, which is program information. In order to obtain detailed information regarding programs and related information regarding programs, linked to the basic information of programs, the client can use a unicast request to an EPG server. The program information is composed of text, video, audio, and so forth, and interaction with the user in presentation of these programs can be implemented by bilateral unicast communication. In an EPG or program information menu, it is possible to set a subscreen on a display of the client displaying the menu and to display a preview video stream.

Note that EPG can be personalized for each user or client, i.e., EPG can be presented with a specific EPG setting corresponding to the user or client. For example, personalization of EPG for each channel can be implemented similarly to configuring EPG according to channel subscription regarding a user profile. Depending on the user profile, program information regarding particular channels is not displayed. Also regarding the display order of channels regarding the EPG menu, personalization according to the user profile, i.e., a process corresponding to each user, is allowed.

Switching of TV Broadcasting Channels

When an IPTV service is provided, packet buffering is performed at the client in order to perform a playing process smoothly, such as removal of jitter caused by the network. The client stores data received from an IPTV service providing server in a buffer until the data reaches a certain threshold, and then executes a process for playing, such as decoding. Furthermore, in some cases, transmission and reception of intra-frames are executed by multicast forwarding for reconstruction of images.

Furthermore, in order to avoid consumption of bandwidth, on occasion of channel switching, a process of concluding an old channel for which the previous viewing has been finished is executed. This process can be executed by IGMP leave, which is a process similar to IGMP join. On occasion of this process, checking is performed at all IGMP aware nodes, comparison with a list of nodes that receive old multicast data is executed, and in a case where a certain node is to stop reception of multicast data, a process of cutting out the node from a multicast tree is performed.

In order to execute decoding and playing of a received video stream at the client, it is necessary to collect much information from the received stream. These information is sent using a particular frequency. Particularly, to start display of new video forwarding movie, a decoder must wait until intra-frames arrive in the video stream. The intra-frames are configured as frames including sufficient information in itself so that complete video can be reconstructed. Depending on the encoding type, usually, these are sent at intervals of 0.5 to 5 seconds.

There exist various types of delay that can occur in data communication in IPTV services. For example, a process of SIP interaction on occasion of setting a new stream can become a factor that causes a delay. For example, a process regarding SIP INVITE, which is executed in the SIP interaction process, is a conceivable factor that can cause a delay. Thus, a measure for avoiding delay is to reduce the SIP interaction process. Specifically, it is effective to make setting such that an SIP dialog occurs only when the characteristics of multicast streams change between multicast channels. According to this idea, a configuration is employed in which when the client tunes in to an ordinary broadcasting channel, an SIP session is established by requesting multicast transmission having stream characteristics, and setting is made such that other changes in multicast channels require only IGMP interaction, which does not involve SIP intervention, and it is switched to an SIP dialog only when the characteristics of received streams differ. Furthermore, SIP INVITE and IGMP join for the new channel are sent. Regarding delay that occurs in IGMP setup, it is possible to make improvements by allowing use of multicast channels at a point as close as possible to the end user. However, this results in consumption of a larger bandwidth in the access network.

An improvement should also be made regarding delay of intra-frames needed to start decoding of an MPEG stream. It is possible to overcome delay of intra-frames by a configuration in which intra-frames are obtained by a pull mechanism from a point relatively close to the client in the network or by providing intra-frames to the client by an out-of-band mechanism.

(3-2-2. nPVR (Network Personal Video Recording))

Next, nPVR (network Personal Video Recording), which is a service available in IPTV services, will be described.

Recording of nPVR

Content recording by nPVR (network Personal Video Recording) can be started by various methods. This varies depending mainly on IPTV service providers.

A simplest method of recording a program, such as a program, is to select a program on EPG and to press a recording button by a remote controller owned by the user. Furthermore, a configuration in which a time, day, length, and so forth of recording by the user are input may be used.

Alternatively, setting may be such that all the programs provided to the client are recorded. This means that the IPTV service provider records all and saves it on a server for a predetermined period. In this way, the user is not bothered with recording, and is allowed to view a past nPVR EPG that seems similar to an ordinary EPG.

What must be supported by the IPTV architecture is an interface for identifying a program to be recorded and an identification mechanism for achieving this with EPG. The same link mechanism as that for TV broadcasting is used if possible, and in command communication for a recording process, an RTSP RECORD command, an SIP INVITE to nPVR including recording details, or the like can be used.

For example, trick play is a process used in a case where the user requests personal recording regarding content that is being received and played in an IPTV service. For example, the client presses a pause button by a remote controller to execute an nPVR recording function, and then freezes the picture to execute IGMP leave from the multicast channel. Furthermore, the client saves content. Note that the configuration may be such that data saving is executed at a server. When the user wishes to view it again later, it is possible to execute nPVR searching and to perform playing by an RTSP PLAY command.

Regarding a content list (index) that can be used in nPVR, the content format and metadata that are the same as those for EPG and VoD can be used. The linking mechanism that is the same as that for TV broadcasting must be used, except that linking is performed by the IPTV control function in order to identify a unicast source, as in the case of VoD. Usually, searching for an nPVR content list is executed as HTTP GET. For a process of searching for nPVR content available to the client, the IPTV service provider provides a server-based searching function. The interface of the searching page completely depends on the service provider.

In a process of playing content recorded by nPVR, it is necessary to first select intended nPVR content. Searching is performed by clicking on a link in the nPVR content list. Content searching is executed as a unicast stream. That is, a stream starts when the user has pressed "play" or has clicked on the link in the content list.

The configuration of the client apparatus in a case where the nPVR (network Personal Video Recording) process executed as a user-specific content recording process is executed is, for example, as follows. An information processing apparatus as a client includes a data processing unit that executes a process of receiving a content providing service provided by an external server existing outside a home network, by using mapping information in which the external server is set as a virtual home network device, and the data processing unit controls the nPVR (network Personal Video Recording) process executed as the user-specific content recording process regarding content provided by the external server.

The data processing unit executes a process of receiving multicast distribution content when receiving TV broadcasting provided by the external server, and executes a process of switching to unicast distribution on occasion of the nPVR (network Personal Video Recording) process executed as the user-specific content recording process. Furthermore, in a case where reception of unicast distribution content is to be started, it sends an IGMP (Internet Group Management Protocol) leave message to the external server or a management server as a message according to IGMP.

Furthermore, regarding nPVR (network Personal Video Recording), the data processing unit of the client can request the external server or another network-connected server to execute content recording by using storage means of these servers. In this case, information needed for recording, such as recording content information and time information, is provided to these servers. Furthermore, in a process of receiving from the external server a content list corresponding to content for which nPVR (network Personal Video Recording) can be executed, the data processing unit of the client performs a process of obtaining a content list selected in accordance with a provided profile based on a user profile or a client profile provided to the external server. Furthermore, on occasion of execution of nPVR (network Personal Video Recording), the data processing unit of the client executes a process of outputting content selection information or recording time specifying information in EPG (Electronic Program Guide) to the external server or a management server. nPVR is executed by these processes.

Furthermore, the client is an information processing apparatus that receives content regarding IPTV provided via a public network, which is not a home network, and includes means for setting an external server connected to the public network as a virtual home network device; and control means for controlling a process of recording or playing content at the external server via the public network so that the external server functions as a personal video recorder that records or plays user-specific content. Furthermore, the control means of the client executes a process of controlling a process of playing content at the external server via the public network in order to implement unicast in which particular content is provided only to a particular user, and furthermore, it executes a process of controlling a process of recording or playing content at the external server via the public network so that the external server functions as a personal video recorder that records user content.

(3-2-3. VoD (Video on Demand))

VoD (Video on Demand) is a specification for distributing content in response to a request by a user on the client side. Basically, it is executed by unicast. It is possible to insert an advertisement to content (media) distributed by VoD and to perform searching based on the advertisement similarly to a broadcasting service or EPG.

Furthermore, it is possible to view on the client side a content list (index) that can be used for VoD. Setting is made such that the content list (index) is limited to content that the user is permitted to view, i.e., it is possible to browse a result of filtering. Although the filtering can be executed within the network, in that case, the VoD content list must be unicast, or the client can use multicast in order to preload a cache of the VoD content list. The VoD content list is obtained in a manner partially similar to obtaining EPG information.

Searching for available VoD content requires that the client can execute an operation for query to the network. The content searching is executed with content metadata.

In a case where content is played by VoD, from the VoD content list, the client must select a piece of available content that the user is permitted to view and output a content request. For example, if content in the content list is specified, a link to URI of the VoD service is activated, the IPTV control function processes the request. It is checked whether the user has already purchased the content, and in a case where the content has not been purchased, a charge for the content is checked. In other cases, the content request is rejected.

(3-2-4. Content Filtering and Personalization)

Next, content filtering and personalization executed in an IPTV service will be described. The content filtering is a content selecting process of providing an end user with only content suitable for the user on the basis of the IMS of the end user, the IPTV profile, and a set of channels that are subscribed to. The personalization is a process of selecting content to be provided to the user on the basis of the profile of the user. For example, it includes a process of distributing messages and advertisements with an individual as a target based on the user profile.

By the content filtering, for example, only channels for which the user has paid are displayed in an EPG or VoD list obtained by the user. The content filtering makes it possible to generate and display an EPG suitable for the profile of the logged-in user. The user profile is downloaded from a server storing the profile, for example, the HSS 232 of the IMS network 230 shown in FIG. 3, by using XCAP at the time of log-in, and is saved on the user apparatus. As for VoD, the content filtering is applied when a view of VoD provided by the server is generated or VoD metadata is received at the client. Note that the user profile may be stored at the client, which is an apparatus on the user side, and this user profile may be used.

The user profile information existing at the external server or the client apparatus is presented to the server that provides content, and the content providing server executes content personalization to select and edit content on the basis of the user profile and to generate and provide content corresponding to the user. Alternatively, the configuration may be such that these personalization processes are executed on the client side.

The content personalization includes a process of distributing messages and advertisements with an individual as a target based on the user profile. These data directed to a particular user are overlaid on the screen at the user apparatus, and is displayed in, for example, a PinP (picture in picture) mode. Personalization is executed by inserting an intended advertisement when a show enters into an advertisement pause while the user is viewing a broadcast show or VoD content. Interactivity can also be considered as a form of personalization based on the user profile. Information included in interactivity data is displayed by means that is the same as the means for personal messages or advertisements, i.e., by overlaying or by using a dedicated window. Personalization is distributed via a dedicated unicast channel, or by a much smaller multicast group targeting a profile set (information of location, age, sex, income range, etc.)

(3-2-5. Interaction with TV)

A description will be given regarding interaction with a TV program, for example, a process in which a user on the client side send an opinion or cast a vote while viewing an IPTV service. For interactivity with a television program, the user can send data from the user (for example, via SMS), such as a vote. For example, the vote is collected and used for creating feedback information regarding the program.

Note that there is also an existing digital broadcasting system in which interaction with TV programs is already supported by a mechanism that inserts a trigger in an MPEG-TS stream and that gives an interactive object, such as HTML or BML, at the timing of the trigger. Usually, an interactive object is embedded in an MPEG-TS stream together with a TV program. However, the digital broadcasting system may distribute an interactive object via a bilateral communication channel separated from distribution of the MPEG-TS stream.

A mechanism that uses a browser applied to an IPTV service is used for interaction with TV programs. For example, reference information to an XHTML document representing interaction with a program is embedded in metadata of program content. While the user is viewing the program, the interactivity system invokes the IPTV service browser for interaction with the program. The XHTML document is distributed via a multicast data channel and unicast communication. Feedback of interaction is implemented by an IPTV service browser based on unicast communication.

(3-2-6. Profile Management)

In an IPTV service, various profiles, such as a user profile of the client, are managed. For example, Service Profile Regarding a Service of an Operator, and a User Profile Profiles such as fee charging, a user identifier, an authentication vector used for an authentication process, and a service trigger are stored and maintained on the HSS 232 of the IMS network 230 shown in FIG. 3.

Profile of the User Himself/Herself

A profile of the user himself/herself is saved on a client apparatus on the user side.

In a case where the IPTV provider differs from the IMS provider, the IPTV provider can save a user profile specific to the IPTV in a database of its own.

IPTV Provider Profile

An IPTV provider profile as information regarding an IPTV provider can be saved on the client side, and is also saved in a database of the IPTV provider itself.

The user profile includes, for example, an SIP identifier, language, nationality, age (information provided by an operator and information provided by the user), an E-mail address, a phone number, interests and hobbies (hobby and preference information), IPTV-specific parameters, and so forth. The user profile is used for service personalization. Specifically, it becomes possible to set and provide data corresponding to the user (My . . . ) on the basis of preferences of the user. For example, it becomes possible to execute, by using the user profile, setting of a my channel, setting of a startup channel, and furthermore, a process of personally mapping a button to My VoD, My Pay TV, or channel, local control, and so forth.

The IPTV provider profile includes, for example,

Information regarding which user is allowed to access which channel

Subscriber profile used to determine what the user is permitted to view and what the user is not permitted to view and so forth.

On the client side, which is an end user, user management and user profile management are executed. The user management means that it is possible for the user to add the user to a domain, change the user, or delete the user. The user profile management means that the user can change information of the user profile.

The processing steps in a case where the end user of the client performs user management are as follows:

1. The end user provides new user information to an HTTP portal.

2. The information is sent by the HTTP portal to the IMS network 230 (refer to FIG. 3) that executes user management, whereby the HSS and IPTV database are updated.

The user profile management executed by the end user of the client is executed, for example, by the following processes:

1. New user profile information is input to the client apparatus.

2. The client sends data to a preset profile output destination, such as a server that manages the user profile information, for example, the HSS 232 or the IPTV service 250 of the IMS network 230 shown in FIG. 3, and a registration or updating process is executed on the side where the data is received.

3. Each server that has executed updating of the information notifies the client and other related servers of completion of the data updating.

4. The client downloads the updated user profile.

Note that the registration and updating of the user profile can also be executed through an IPTV service portal. In this case, the user profile is provided from the client to the IPTV service portal, and then the IPTV service portal sends these data to a user profile management server (e.g., the HSS 232 of the IMS network 230 or the IPTV service 250 shown in FIG. 3).

As described above, the data processing unit of the information processing apparatus as a client executes a process of receiving data from the external server as personalized data selected or edited on the basis of a user profile, which is user information registered in advance. The data processing unit of the client obtains a user profile stored in advance in a management server, for example, an HSS, and provides the user profile obtained to an external server such as a content providing server. Furthermore, the user profile updated at the client apparatus is sent to the management server, such as an HSS, and a process of updating the user profile stored in the management server is executed.

The data processing unit of the client executes a process of receiving, from an external server such as a content providing server, a content list, advertisement information, VoD (Video on Demand)-enabled content, or the like set as personalized data on the basis of the user profile, and displaying it on a display unit. Note that as described earlier, the user profile includes information regarding at least one of a language used, a nationality, an age, an address, a phone number, and hobby and preference information of the user.

(3-2-7. Process of Matching with Device Capability)

It is possible to set various apparatuses as clients, and processes that can be executed by individual clients differ depending on the clients. That is, the device capabilities of clients are various. In order to ensure interoperability between such various clients and IPTV services, a set of device capability profiles is specified to define capabilities requested for clients.

In order to play content distributed to a client favorably at the client, it is necessary to clarify the capabilities of the client. The client device capabilities include, for example, a screen size, a screen resolution, a size of an available memory, types of codecs supported, and so forth.

When a client device first registers a service, description of the CSCF 231 device of the IMS network 230 is downloaded, and the downloaded description and its URI are recorded in a database or a repository and shared with other entities, such as servers. Note that in a case where a global repository, such as a W3C DCI repository, can be used, the repository may be used.

In the process of matching AV content with a client device, in some cases, it is necessary to select a suitable content version. For example, matching of text content is implemented by using modification, combination, formatting (e.g., XSLT), or the like in accordance with a version. An entity that executes the matching process (e.g., a target server or a proxy that executes transcoding) executes a process of receiving device capabilities and matching the document according to a set of rules expressed in document metadata. This means that the content metadata must include rules regarding modification that must be applied, and also means that the service profile must include restrictions regarding applied transport, terminal, and so forth.

As described above, in a content providing system including a content providing server and a content receiving client, the data processing unit of the content receiving client executes a process of obtaining device information of the client, and sending and registering the device information to a database existing outside the home network, for example, a home subscriber subsystem (HSS) defined in an IP multimedia system (IMS). The content providing server executes a process of obtaining the device information of the client, registered in the HSS, and providing the client with content suitable for the device. Specifically, the device information includes at least one of a screen size, a screen resolution, a size of available memory, and types of codecs supported of the client. The content providing server executes a process of obtaining these device information and providing the client with content that can be played by the device.

The present invention has been described above in detail with reference to specific embodiments. However, obviously, it is possible for those skilled in the art to make modifications or alternatives of the embodiments without departing from the spirit of the present invention. That is, the present invention has been disclosed by way of examples, and the present invention should not be construed restrictively. The spirit of the present invention should be determined on the basis of the claims.

Furthermore, the series of processes described in this specification can be executed by hardware, by software, or by combination of hardware and software. When the series of processes is executed by software, the process can be executed by installing a program in which the processing sequences are recorded on a memory of a computer embedded in special hardware or on a general-purpose computer that is capable of executing various processes. For example, the program may be recorded in advance on a recording medium. Instead of installing the program from a recording medium to a computer, the program can be received via a network such as a LAN (Local Area Network) or the Internet and installed on an internal recording medium such as a hard disk.

The various processes described in this specification need not necessarily be executed in time series according to the description, and may be executed in parallel or individually as needed or in accordance with the processing ability of an apparatus that executes the processes. A system in this specification refers to a logical combination of a plurality of apparatuses, and is not limited to one in which the constituent apparatuses are disposed within the same case.

Industrial Applicability

As described hereinabove, according to the configuration of the present invention, it becomes possible for a DMP as a content playing apparatus, which is a client device in a home network, to receive content from a content providing server outside the home network and to play the content. That is, a home IMS gateway, which is an information processing apparatus according to the present invention, executes communication with a content providing server to map the content providing server as a virtual home network device, and in response to reception of a device discovery request from a content playing apparatus in a home network, the home IMS gateway provides the content playing device with server information of the content providing server as information of from which a service can be received. Furthermore, it becomes possible to execute a process in which device information of the client is obtained and registered in a database existing outside the home network, and the content providing server obtains the device information and provides the client with content matching the device.

The invention claimed is:

1. A content providing system comprising:
a content providing server having a first communication protocol; and
a content receiving client having a second communication protocol,
wherein the content receiving client includes:
a communication unit that executes a communication process via a home network; and
a data processing unit that executes a process of receiving a content providing service provided by the content providing server existing outside the home network by using mapping information in which the content providing server is set as a virtual home network device,
the data processing unit is configured to:
execute a process of obtaining device information of the client and obtaining user profile information comprising a user identification and user preferences, and registering the device information and the user profile information in a database existing outside the home network, and
execute communication between the content providing server and the content receiving client by performing a conversion between the first communication protocol and the second communication protocol, and
the content providing server is configured to:
execute a process of obtaining the device information of the content receiving client and obtaining the user profile information, registered in the database, and providing the content receiving client with content matching the device and the user profile information.

2. The content providing system according to claim 1, characterized in that:
the device information includes:
device information regarding at least one of a screen size, a screen resolution, a size of available memory, and a supported codec type of the client, and
the content providing server is configured to:
execute a process of obtaining the device information and providing the client with content that can be played by the device.

3. The content providing system according to claim 1, characterized in that:
the data processing unit of the content receiving client is configured to:
execute a process of sending the device information of the client to a home subscriber subsystem (HSS) defined in an IP multimedia system (IMS) and registering the device information, and
the content providing server is configured to:
execute a process of obtaining the device information of the client, registered in the home subscriber subsystem (HSS), and providing the client with content matching the device.

4. An information processing apparatus characterized by comprising:
a communication unit that executes a communication process via a home network; and
a data processing unit that executes a process of receiving a content providing service provided by an external server, having a first communication protocol and existing outside the home network having a second communication protocol, by using mapping information in which the external server is set as a virtual home network device,
and characterized in that the data processing unit is configured to:
execute a process of obtaining device information of the information processing apparatus and obtaining user profile information comprising a user identification and user preferences, and registering the device information and the user profile information in a database existing outside the home network, and
execute communication between the external server and the home network by performing a conversion between the first communication protocol and the second communication protocol.

5. The information processing apparatus according to claim 4, characterized in that:
the data processing unit is configured to:
execute a process of obtaining device information regarding at least one of a screen size, a screen resolution, a size of available memory, and a supported codec type of the information processing apparatus, and registering the device information in the database existing outside the home network.

6. The information processing apparatus according to claim 4, characterized in that:
the data processing unit is configured to:
execute a process of sending the device information of the information processing apparatus to a home subscriber subsystem (HSS) defined in an IP multimedia system (IMS) and registering the device information.

7. An information processing method executed in a content providing system including a content providing server having a first communication protocol and a content receiving client having a second communication protocol, characterized in that:
the content receiving client executes:
a communication step in which a communication unit executes a communication process via a home network;
a content receiving step in which a data processing unit executes a process of receiving content provided by the content providing server existing outside the home network by using mapping information in which the content providing server is set as a virtual home network device; and
a device information registering step in which the data processing unit executes a process of obtaining device information of the client and obtaining user profile information comprising a user identification and user preferences, and registering the device information and the user profile information in a database existing outside the home network, and
the content providing server executes a process of obtaining the device information of the client and obtaining the user profile information, registered in the database, and providing the client with content matching the device and the user profile information, and executes a process of communication with the content receiving client by performing a conversion between the first communication protocol and the second communication protocol.

8. The information processing method according to claim 7, characterized in that:
the device information includes:
device information regarding at least one of a screen size, a screen resolution, a size of available memory, and a supported codec type of the client, and
the content providing server executes a process of obtaining the device information and providing the client with content that can be played by the device.

9. The information processing method according to claim 7, characterized in that:
the data processing unit of the content receiving client executes a process of sending the device information of the client to a home subscriber subsystem (HSS) defined in an IP multimedia system (IMS) and registering the device information, and
the content providing server executes a process of obtaining the device information of the client, registered in the home subscriber subsystem (HSS), and providing the client with content matching the device.

10. An information processing method executed at an information processing apparatus, characterized by executing:
a communication step in which a communication unit executes a communication process via a home network;
a content receiving step in which a data processing unit executes a process of receiving content provided by an external server having a first communication protocol and existing outside the home network having a second communication protocol, by using mapping information in which the external server is set as a virtual home network device and executes a process of communication between the external server and the home network by performing a conversion between the first communication protocol and the second communication protocol; and
a device information registering step in which the data processing unit executes a process of obtaining device information of the information processing apparatus and obtaining user profile information comprising a user identification and user preferences, and registering the device information in a database existing outside the home network.

11. The information processing method according to claim 10, characterized in that:
the device information registering step is:
a step of executing a process of obtaining device information regarding at least one of a screen size, a screen resolution, a size of available memory, and a supported codec type of the information processing apparatus, and registering the device information in the database existing outside the home network.

12. The information processing method according to claim 10, characterized in that:
the device information registering step is:
a step of executing a process of sending the device information of the information processing apparatus to a home subscriber subsystem (HSS) defined in an IP multimedia system (IMS) and registering the device information.

13. A computer program for causing execution of information processing, executed at an information processing apparatus, characterized by causing execution of:
a communication step of causing a communication unit to execute a communication process via a home network;
a content receiving step of causing a data processing unit to execute a process of receiving content provided by an external server, having a first communication protocol and existing outside the home network having a second communication protocol, by using mapping information in which the external server is set as a virtual home network device; and
a device information registering step of causing the data processing unit to execute a process of obtaining device information of the information processing apparatus and obtaining user profile information comprising a user identification and user preferences, and registering the device information in a database existing outside the home network, and execute a process of communication between the external server and the home network by performing a conversion between the first communication protocol and the second communication protocol.

* * * * *